(12) United States Patent
Alali et al.

(10) Patent No.: US 11,469,596 B2
(45) Date of Patent: Oct. 11, 2022

(54) DEVICE FOR ACTIVE ELECTRICAL COMPENSATION

(71) Applicants: ENSEA—Ecole Nationale Supérieure de l'Electronique et de ses Applications, Cergy (FR); The University of Alabama in Huntsville, Huntsville, AL (US)

(72) Inventors: Mohamad Alaa Eddin Alali, Pontoise (FR); Yuri Shtessel, Owens Cross Roads, AL (US); Jean-Pierre Barbot, Saint Leu la Foret (FR)

(73) Assignees: ENSEA—Ecole Nationale Supérieure de l'Electronique et de ses; The University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 17/257,982

(22) PCT Filed: Jul. 2, 2019

(86) PCT No.: PCT/EP2019/067779
§ 371 (c)(1),
(2) Date: Jan. 5, 2021

(87) PCT Pub. No.: WO2020/007884
PCT Pub. Date: Jan. 9, 2020

(65) Prior Publication Data
US 2022/0200282 A1    Jun. 23, 2022

(30) Foreign Application Priority Data
Jul. 6, 2018   (EP) .................................... 18305899

(51) Int. Cl.
*H02J 3/01*   (2006.01)
*H02J 3/18*   (2006.01)
(Continued)

(52) U.S. Cl.
CPC ................. *H02J 3/01* (2013.01); *H02J 3/14* (2013.01); *H02J 3/1842* (2013.01); *H02J 3/381* (2013.01);
(Continued)

(58) Field of Classification Search
CPC .... H02J 3/01; H02J 3/14; H02J 3/1842; H02J 3/381; H02J 2300/28; H02J 2300/24; H02J 3/18; H02J 3/38; H02M 1/12
See application file for complete search history.

(56) References Cited

U.S. PATENT DOCUMENTS

2013/0030590 A1   1/2013 Prosser
2016/0329714 A1   11/2016 Li et al.

FOREIGN PATENT DOCUMENTS

CN   201813171 U   4/2011
CN   102299556 A   12/2011

OTHER PUBLICATIONS

European Search Report for Application No. 18305899.9 dated Feb. 26, 2019, 3 pages.
(Continued)

*Primary Examiner* — Robert L Deberadinis
(74) *Attorney, Agent, or Firm* — Lerner, David, Littenberg, Krumholz & Mentlik, LLP

(57) ABSTRACT

The invention relates to a current-compensating device able to be connected, in shunt configuration, between an electrical network and non-linear and linear electrical loads and downstream of at least one renewable-energy-generating power unit coupled to an energy-storing element, the compensating device including:
a power converting unit including at least one voltage inverter able to generate an AC current;
an output filtering unit, including one filter dimensioned to block the harmonic components due to the switching of the inverter;
(Continued)

a control unit comprising a unit for computing reference currents and a switch driving device that controls the switching of the inverter as a function of the identification of the currents by the unit for computing the reference currents.

20 Claims, 32 Drawing Sheets

(51) Int. Cl.
  *H02J 3/38* (2006.01)
  *H02J 3/14* (2006.01)
  *H02M 1/12* (2006.01)
(52) U.S. Cl.
  CPC ........... *H02M 1/12* (2013.01); *H02J 2300/24* (2020.01); *H02J 2300/28* (2020.01)

(56) References Cited

OTHER PUBLICATIONS

International Search Report for Application No. PCT/EP2019/067779, dated Oct. 22, 2019, 3 pages.
Mohamad A. E. Alali, et al., "A Lyapunov Approach Based Higher Order Sliding Mode Controller for Grid Connected Shunt Active Compensators with a LCL Filter", 2017 19th European Conference on Power Electronics and Applications (EPE'17 ECCE Europe), published Sep. 2017, pp. 1-10, IEEE.

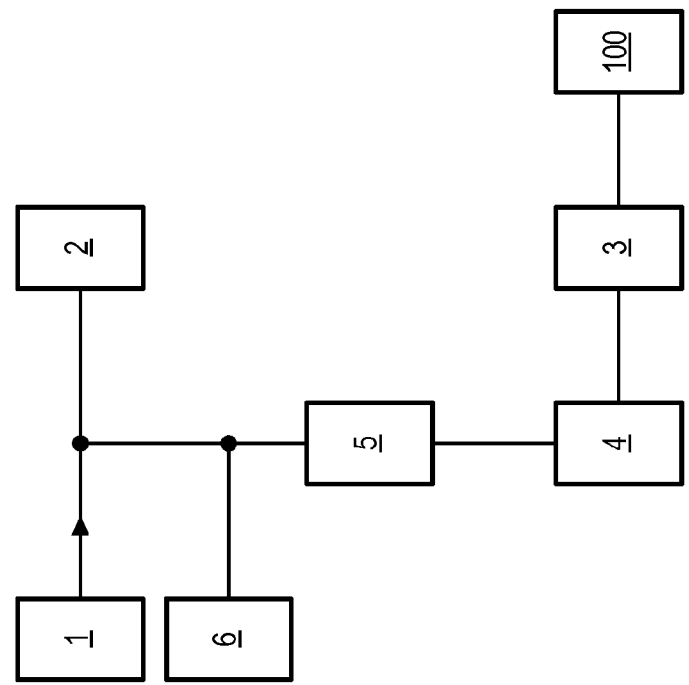
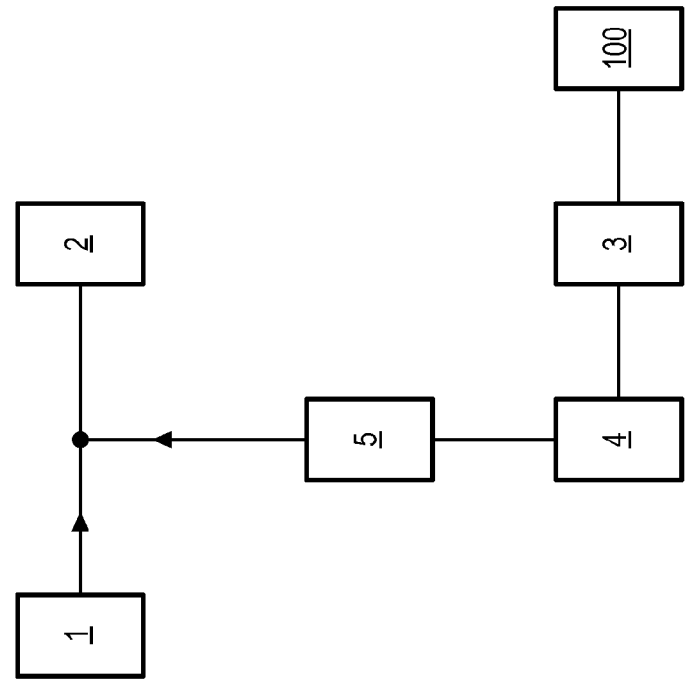

DEVICE FOR ACTIVE ELECTRICAL COMPENSATION

CROSS-REFERENCE TO RELATED APPLICATIONS

The present application is a national phase entry under 35 U.S.C. § 371 of International Application No. PCT/EP2019/067779, filed Jul. 2, 2019, published in French, which claim priority from European Patent Application No. 18305899.9 filed Jul. 6, 2018, all of which are incorporated herein by reference.

GENERAL TECHNICAL FIELD AND PRIOR ART

The invention relates to the general field of power electronics and its applications on electrical power distribution networks or on-board electrical power networks, smart buildings and micro-grids, and more specifically modules for filtering and compensating electrical networks with injection of power from renewable sources.

It is well known that the quality of the electrical signal delivered by the distribution network has a direct consequence on the performance of the systems powered by this network, as well as the lifetime of the items of electrical equipment that constitute the network or are connected to it.

In particular, harmonic distortion, a phase difference between the voltage and the amperage, i.e. the reactive power, and also current and voltage unbalance are factors used to express the quality of the energy travelling through this network.

The term "unbalance" is understood to mean a difference in the physical quantities of the signal between the different phases and/or amplitudes, for example the voltage or amperage levels.

The harmonic distortion rate is a measurement of linearity of signal processing, made by comparing the output signal of an apparatus with a sinusoidal input signal.

The non-linearity of the system distorts this sine wave. The output signal remains a periodic signal that can be analyzed as a sum of sine waves of frequencies that are multiples of the frequency giving the period, known as the fundamental frequency.

Each of these sine waves is a harmonic of order equal to the quotient of its frequency by the fundamental frequency. The harmonic distortion rate is the ratio of the root mean square values of the fundamental frequency to the others.

An apparatus including non-linear loads connected to an electrical network receives a power from the electrical network and reinjects a signal into the network, the signal reinjected into the network being degraded by the operation of the apparatus.

The term "non-linear load" is understood to mean a load based on electronic power components consuming active power over the power supply system (with or without reactive power) thus and most importantly reinjecting the distorting power (related to the harmonics) into the supply network. These harmonics can be of conventional order (5, 7, 11, 13, etc.) for 3-wire power supply systems: three-phase non-linear loads (widespread in industrial areas). In the case of single-phase non-linear loads installed in a 4-wire power supply system (3 phases and neutral) widely used in residential, commercial or administrative areas, third order harmonics and their odd multiples (3, 9, 15, etc.) will circulate in this network in addition to the conventional harmonics.

Moreover, the phase difference between the voltage and the amperage of the signal entails the appearance of a reactive power that drives, among other things, the reduction of the active power transmissible through the network.

The development of technology for producing energy, particularly from renewable sources, has led to the appearance of many individual production units, particularly in so-called positive-energy housing solutions.

When a power production unit, particularly in the case of renewable energy of solar or windpower type, is connected to the network, it is necessary to use one or more inverters or rectifiers-and-inverter pairs in order to manage and convert the power generated by the unit into DC current and DC voltage into an AC signal, before injecting it into the network.

The inverters, usually composed of electronic power switches with controlled opening and closing and double throw, such as an IGBT (Insulated Gate Bipolar Transistor) and GTO (Gate Turn-off Thyristor). By a set of switching operations controlled in an appropriate manner (generally a modulation of pulse width), the source is modulated to obtain an AC signal of the desired frequency.

The switching frequencies of the electronic power components of the inverters generally use high-frequency harmonic components in the signal injected into the network, which degrades the quality of the signal traveling through the network.

In an assembly as shown in FIG. 1a, comprising a general network 1, a non-linear and/or linear load 2, and a DC-energy-storing element 3 connected to an inverter 4, it is known to connect at the output of the inverter 4 a filter 5 configured to block the high-frequency switching components contained in the signal to be injected into the electrical network 1.

Thus, the high-frequency harmonics of the signal caused by the switching of the inverter 4, are not transmitted via the filter 5 to the network 1; only the desired signal is generated by the inverter 4 and injected into the network 1 or into the load 2.

Various structures of filter 5 have been proposed for this purpose.

A first-order filter, the most conventionally used; composed of a simple inductance with a practically negligible internal resistance, as shown in FIG. 1b, in particular, cannot be used to fulfil this function.

This is because, the higher the inductance of such a filter, the higher the ability of the filter to prevent the components due to switching from being injected over the network 1. However, the higher the inductance, the more the speed of variation of the amperage traveling through the filter is reduced and the more the filter will cause a phase difference between the desired actual amperage and the amperage to be injected into the network 1-load 2 assembly via the filter 5.

Conversely, a low value of the inductance allows the majority of the components due to switching to be injected into the network 1 and consequently to affect the electrical installations and equipment.

The proper dimensioning of the first-order output filter will therefore depend on the trade-off to be found between the dynamics and the efficiency of the device based on the inverter, especially when it operates as a shunt active filter with harmonic decontamination.

This trade-off is very difficult to strike without using an auxiliary passive filter 6 installed at the output of the output filter 5 or upstream on the network side, to filter the high-frequency components as shown in FIG. 1b.

However, this auxiliary filter 6 can cause undesirable second effects such as resonance with other passive elements installed on the electrical network 1.

These electrical resonance phenomena in some cases lead to voltage or amperage peaks greatly above the values permissible by the apparatuses connected to the network 1 and cause the destruction of these devices.

This auxiliary filter also gives rise to an active power consumption by its damping resistance. In addition, the filtering quality of these auxiliary filters degrades over time because of the aging of their passive components.

General Overview of the Invention

One aim of the invention is to "decontaminate" the current consumed by a non-linear load, by cancelling, on the network side, its harmonic content, the unbalanced content and also the reactive content of the current in the aim of improving the quality of the voltage on the electrical network side. This invention, having a 4-wire structure, is adapted to the harmonic spectrum containing the conventional orders (5, 7, 11, 13, etc.) of industrial areas as well as those of third order and their odd multiples (3, 9, 15, etc.) of residential, commercial or administrative areas.

Another aim is to maximize the active power producible by a unit for generating renewable energy as in FIGS. 1a, 1b.

Another aim is to optimize the energy consumption of a smart building.

Another aim is to optimize the energy production of a unit for producing conventional energy (from fossil fuel: petroleum, gas etc.) within a micro-grid.

Another aim is to optimize the management of the energy traveling between the production units (renewable and conventional) and the consumption units.

To achieve this, the invention makes provision for a current-compensating device of renewable-energy-generating shunt active filter type, able to be connected in shunt configuration between a given electrical network and a number of non-linear/linear electrical loads, and downstream of at least one renewable-energy-generating power unit coupled to an energy-storing element, the current-compensating device including:

a power converting unit, including at least one voltage inverter able to generate an AC current, mainly suitable for consumption and for disturbances respectively absorbed and generated by the non-linear and linear electrical loads, with a frequency band ranging from 50 to 2500 Hz;

an output filtering unit, including one filter of LCL type for each of the phases and one neutral, and connected: on the one hand downstream of the voltage inverter, and on the other hand in shunt configuration between the given electrical network and the non-linear/linear electrical loads, the LCL output filter being dimensioned to block the harmonic components due to the switching of the inverter;

a control unit comprising a unit for computing reference currents, the reference currents comprising:
at least one non-active disturbance current, having one or more harmonic currents and/or a reactive power and/or an unbalanced current and/or another,
at least one active current for recharging the storing element,
at least one active current corresponding to a point of maximum power of the renewable energy production device, intended to be injected at the connection point to cover, mainly, the active consumption of the non-linear and linear loads, within the limit of the predictable energy of the renewable-energy-generating power unit the control unit also comprising a switch driving device that controls the switching of the inverter via a non-linear controller with continuous control as a function of the identification of the currents by the unit for computing the reference currents, the inverter switching control being done in such a way as to allow to pass through the output filtering unit:
a part or all of the non-active disturbance currents: the harmonic currents, as well as the reactive and unbalanced currents at the fundamental frequency and other, in the non-linear/linear electrical loads, to satisfy the non-active energy consumption of the non-linear/linear electrical loads, while decontaminating the electrical network of these non-active disturbance currents;
an active current corresponding to a point of maximum power available within the renewable-energy-generating power unit, to satisfy the active energy consumption demand of the non-linear/linear electrical loads.

The invention can be optionally but advantageously completed by the following features, taken alone or in combination:
the control unit is further configured to control the switching of the inverter in such a way as to inject a part of the active current onto the network then devoid of the non-active disturbance current when the production of the renewable-energy-generating power unit is greater than the power consumed by the non-linear/linear electrical loads;
the control unit includes a sliding mode controller;
the control unit includes a first-order sliding mode controller, having a second or third-order adaptive sliding surface;
the control unit includes higher-order sliding mode controllers, having a first or second-order adaptive sliding surface;
the sliding mode controller is of continuous control type;
the control unit includes at least one of the five following continuous control sliding mode controllers:
the first is associated with a Sign function approximated as a sigmoid function with a second-order adaptive sliding surface,
the second is associated with a method of artificial increasing of the relative degree associated with a Sign function with a third-order adaptive sliding surface, followed by an integrator;
the third is associated with three Sign functions with a first-order adaptive sliding surface,
the fourth is associated with two Sign functions with a second-order adaptive sliding surface,
the fifth is associated with one Sign function (acting directly and via its integral term on the control) with a second-order adaptive sliding surface,
the switch driving device includes a device for modulating the pulse width, wherein the control is modulated, in order to make the inverter operate at an adapted fixed switching frequency, on one side, at a nominal operation of the electronic power components of the inverter and easy, on the other side, to filter by the LCL;
the control unit includes a regulating controller of proportional integral type or other type to regulate the DC voltage of the capacitor (the capacitive storing element 3 upstream of the inverter 4), while providing the tracking of the maximum active power of the renewable energy production device 100;

the compensating device includes a loop for regulating the DC voltage across the terminals of the capacitive storing element that supplies at the controller output the maximum power (and not the maximum current as usually chosen in the prior art), the voltage across the terminals of the capacitive storing element being equal to the voltage of the maximum power of the renewable-energy-generating power unit 100;

the unit already including/comprising a regulating controller, which can be the regulating controller, of the voltage across the terminals of the storing unit for a pure active filter, this same voltage regulating loop is used, if the renewable-energy-generating power unit is present, to supply at the output of the regular the active maximum power of the unit. Therefore, only the unit for extracting the voltage of the maximum power of the unit is, via the unit, to be added to the unit for identifying the non-active disturbance currents to form the overall identification unit;

the device further includes a unit for computing reference currents configured to determine the disturbance current circulating in the load;

the device further includes a unit for computing the reference currents configured to compute the voltage of the point of maximum active power of the renewable energy production device; the algorithm for computing the maximum power point is integrated into the algorithm for identifying the disturbance currents; the loop for tracking the maximum power point covers, in addition to the maximum active power of the unit, the power losses in the device, via the regulation of the DC voltage across the terminals of the capacitive storing element;

the device includes a loop for regulating the DC voltage across the terminals of the capacitive storing element supplies at the output of the controller a maximum power, the voltage across the terminals of the capacitive storing elements being equal to the voltage of the maximum power of the unit;

the algorithm for computing the maximum power point is integrated into the algorithm for identifying the disturbance currents;

the regulation of the DC voltage across the terminals of the capacitive storing element is configured to cover, in addition to the maximum active power of the unit, the power losses in the device.

According to another aspect, the invention makes provision for an electrical system comprising a power supply network, non-linear/linear electrical loads, at least one renewable-energy-generating power production unit, and a compensating device according to the invention.

Optionally but advantageously, the invention can be completed by the following features, taken alone or in combination:

the renewable-energy-generating power production unit is:
  chosen from the following list: one or more photovoltaic panels, a wind turbine or turbines, a fuel cell or cells, or others
  coupled, directly (without a chopper or any other electronic power devices) to a capacitive storing element in the case of DC production, or via an AC/DC power rectifier in the case of AC production from a renewable source;

the network is chosen from the following list: the mains electrical network, a local electrical micro-grid run as an island or connected to the mains electrical network, or an on-board electrical network;

the system further includes a smart building, and wherein the control unit is connected to a centralized control unit of the smart building, the control unit compares the maximum available power of the renewable energy production device with the total load of the smart building;

the control unit is configured to optimize the consumption of the different apparatuses operating within this smart building by distributing the loads corresponding to the non-linear/linear electrical loads in at least two operating modes:

a first (priority) distribution mode, the so-called adaptive consumption mode wherein the control unit drives the decentralized management unit of the smart building in such a way as to adapt the consumption of the smart building with the production of the renewable-energy-generating power unit, so that the total load curve of the smart building has a bulk/maximum simultaneity factor corresponding to the operation of all the loads of the building at the same time, within the limit of the renewable energy producible, a second distribution mode, the so-called modulated consumption mode wherein the control unit drives the decentralized management unit of the smart building in such a way as to modulate the consumption of the apparatuses of the smart building to tend to a total load curve of the smart building that is substantially constant as a function of time, or adapted to the state of generation of the mains electrical network.

a third distribution mode adapted to the production of the smart electrical network is provided for during its operation.

the system further includes:
  a local network connected to the network, and
  units for producing power from a conventional (fossil fuel) source, and
  a semi-decentralized management system, and
  a plurality of renewable-source power production units connected to the local network, by a compensating device, each compensating device being connected to the semi-decentralized management system to which it communicates information about the production of energy, present and future, of each of the power production units, and
  a plurality of consumption sources corresponding to the non-linear/linear electrical loads, each of the consumption sources being connected to the local network and equipped with a compensating device, connected to the semi-decentralized management system to which it communicates information about the instantaneous consumption and the future consumption as a function of the scheduled operation of the consumption sources;
  a plurality of production units and linear/non-linear loads of the positive-energy smart buildings, which provide self-consumption and wherein any surplus of energy is stored or exchanged with the other smart buildings or delivered to the local network via the control unit of the compensating device, in coordination with the semi-decentralized management system in the event of an exchange with the local network;

the semi-decentralized management system is further configured to provide the economical distribution of the conventional energy production units;

the semi-decentralized management system is further configured to intervene on the decentralized units of the smart buildings, via the control units of the compensating devices, to make them tip into a modulated consumption mode;

the semi-decentralized management system is further configured to drive the distribution over the local network of the power coming from the network if the total estimated production does not cover demand.

According to another aspect, the invention makes provision for a method for determining a setpoint signal implemented by a compensating device according to the invention, the method including the following steps:

processing the measurements of the voltage of the network and of the current traveling in the non-linear/linear loads in such a way as to identify the non-active harmonic currents, reactive and unbalanced and other;

processing the measurements of the voltage and of the current of the renewable energy production device to determine the point of maximum power operation thereof;

generating a setpoint (this is a current) configured to cancel the non-active disturbance current composed of the harmonic, reactive and unbalanced currents, etc. of the current traveling over the electrical network, while containing the current corresponding to the point of maximum power of the renewable energy production device.

According to another aspect, the invention makes provision for a method for modelling the electrical operation of an industrial site including a plurality of controlled machines distributed over one or more production lines.

Optionally but advantageously, in such a method, the machines with their controls, based, among others, on electronic power converters, are modelled by current sources, representing the total consumption (active, reactive and harmonics etc.) of the machines, measured by the energy quality analyzer installed at the intake of each production line.

More precisely, the modeling steps are as follows:

1—installing a measuring device that is a spectrum analyzer/energy quality analyzer, at the intake of each production line of the site being studied, and which supplies all the electrical quantities of the network, namely: the active, reactive and apparent powers, the power factor, the fundamental components of the current and of the voltage, the total harmonic distortion rate (THD) of the current and of the voltage, the individual harmonic distortion rate of the current and of the voltages, etc., 2—modelling the active and reactive powers by a shunt R-L branch or by a single current source that represents the fundamental current, with an angle corresponding to the power factor; the direction of passing of the current goes from the electrical network 1 toward the load 2 (represented here by the current sources), 3—modeling the individual harmonic distortion rate of the currents and of the voltages by current sources; each corresponding to a harmonic order, the direction of passing of the harmonic currents goes from the load (2) (represented here by the current sources) toward the electrical network (1), 4—connecting all these current sources to one or more resistances with very high values (in the order of the MΩ), to force the passing of the currents in a single direction.

OVERVIEW OF THE FIGURES

Other features and advantages of the invention will become further apparent from the following description, which is purely illustrative and non-limiting, and must be read with reference to the appended figures wherein:

FIG. 1a is a diagram showing an electrical network supplying a load and a renewable-energy-generating power unit connected to an inverter, via one or more capacitive storing elements, including a filter according to the prior art;

FIG. 1b shows this same network with another filter structure of the prior art;

Figure 8:
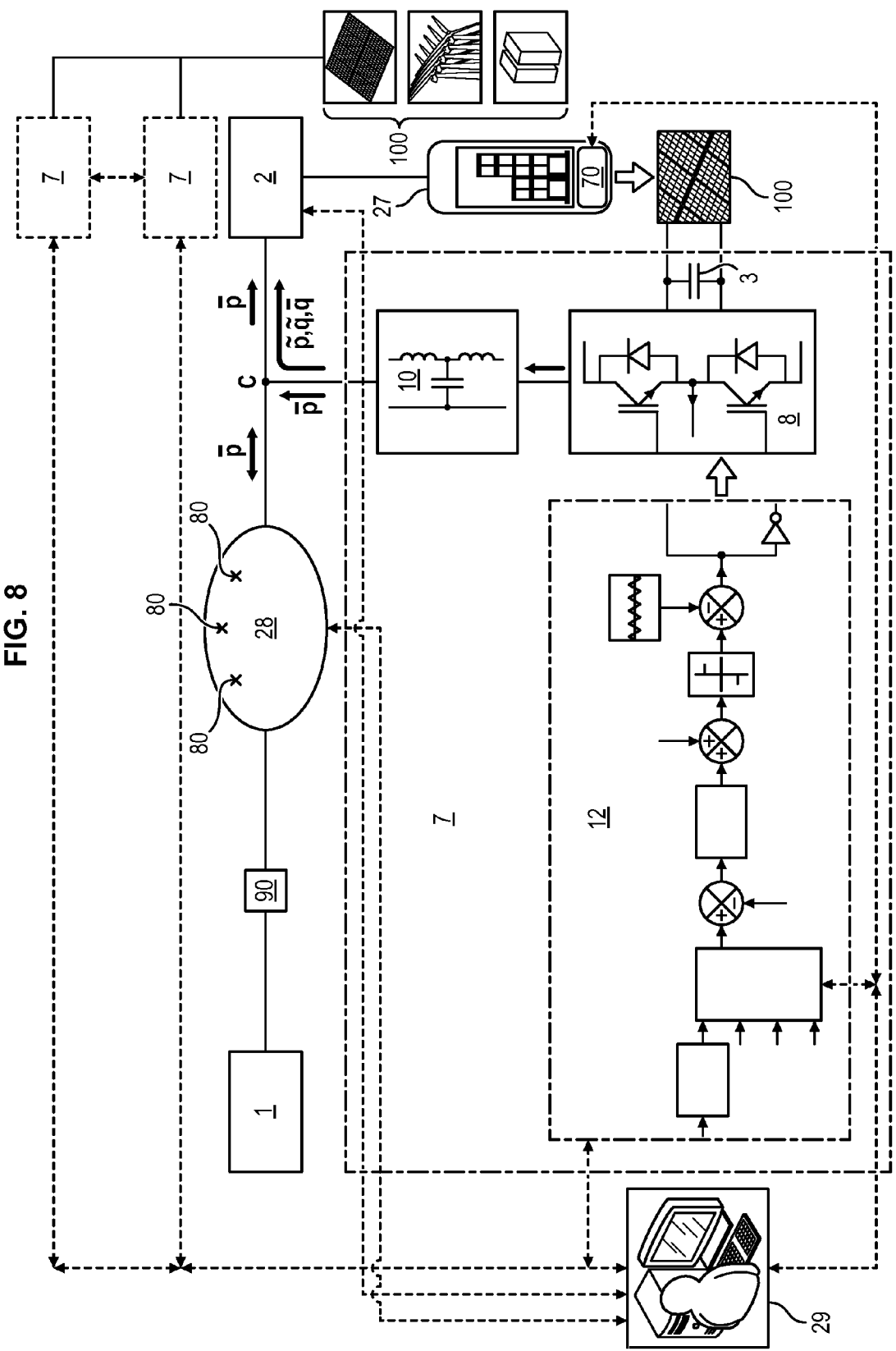
Figure 9:
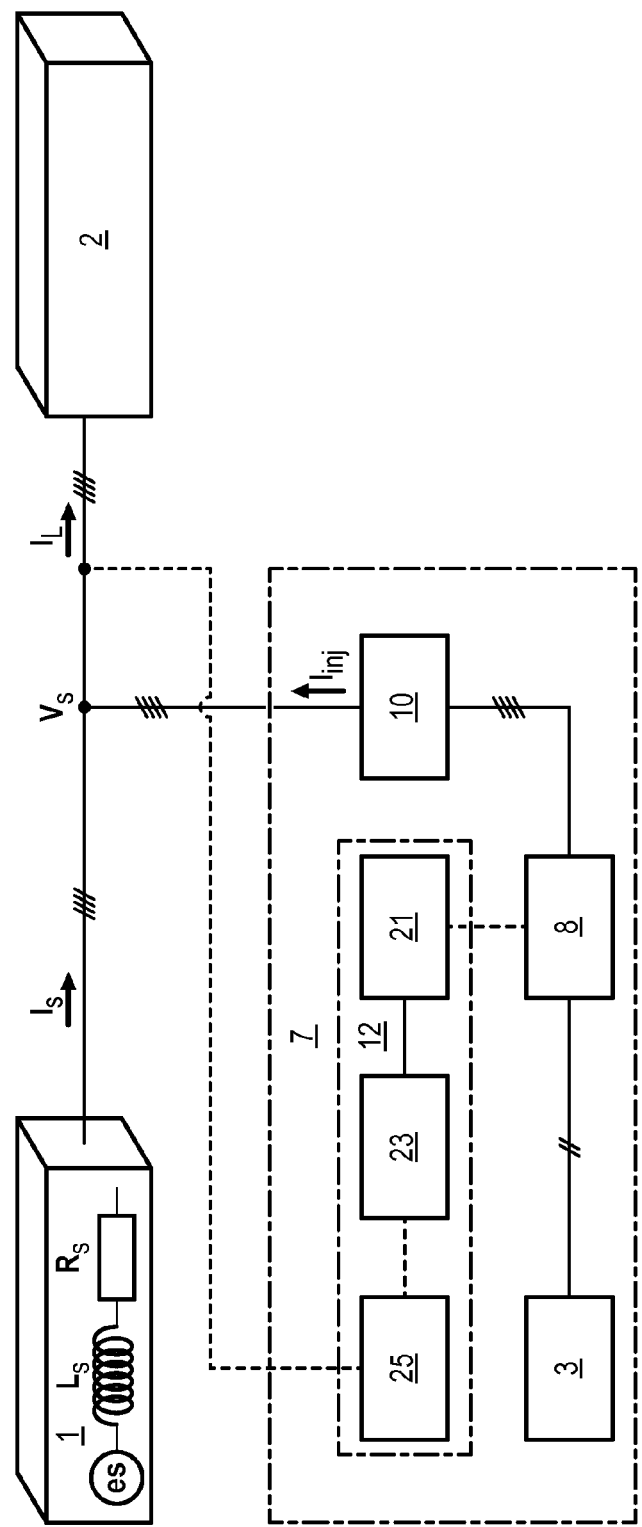
Figure 10:
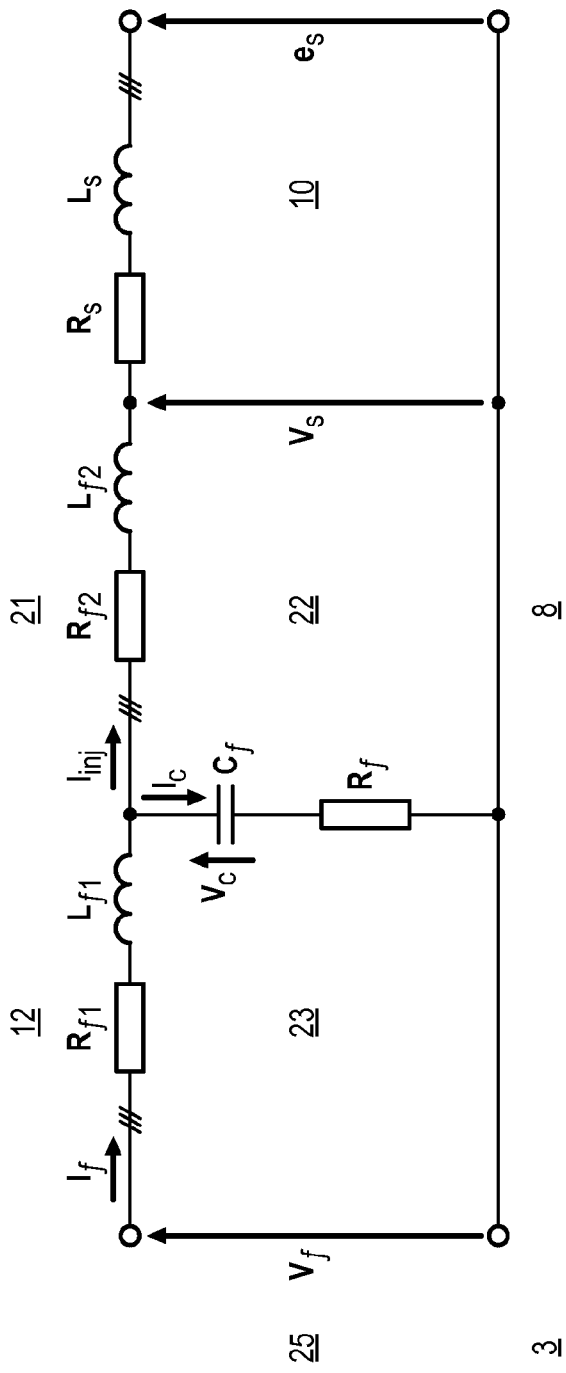
Figure 11:
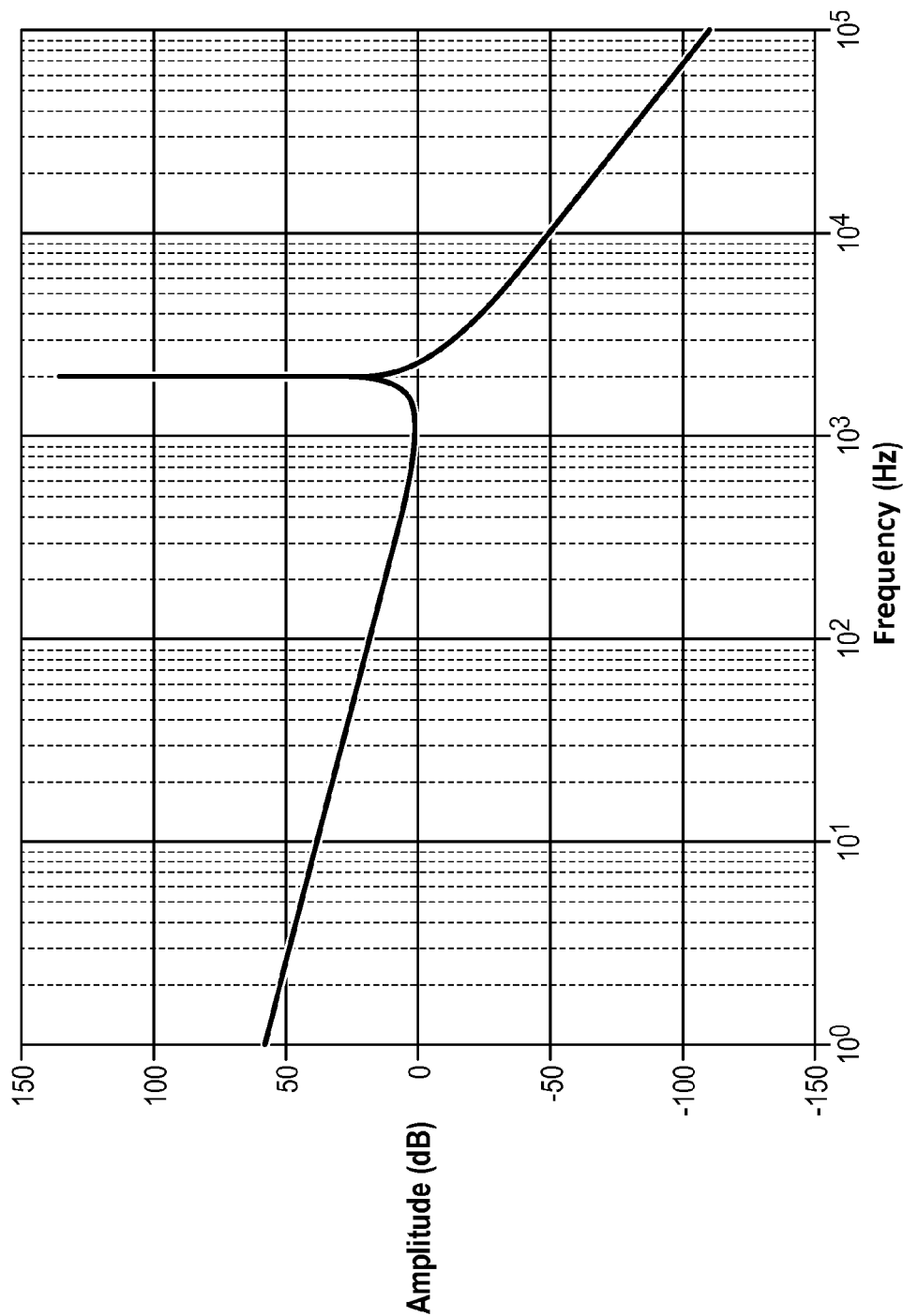
Figure 12:
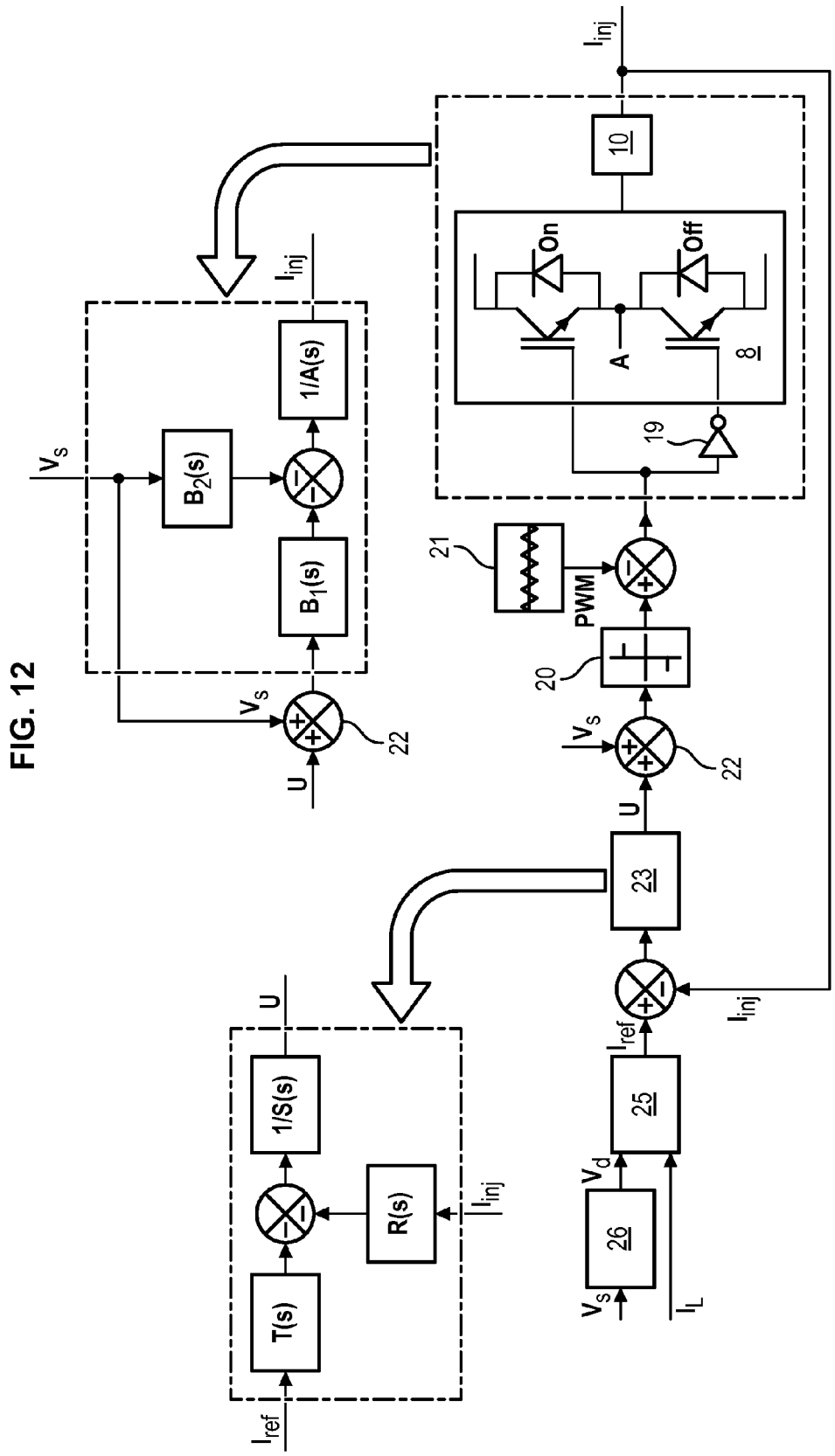
Figure 13A:
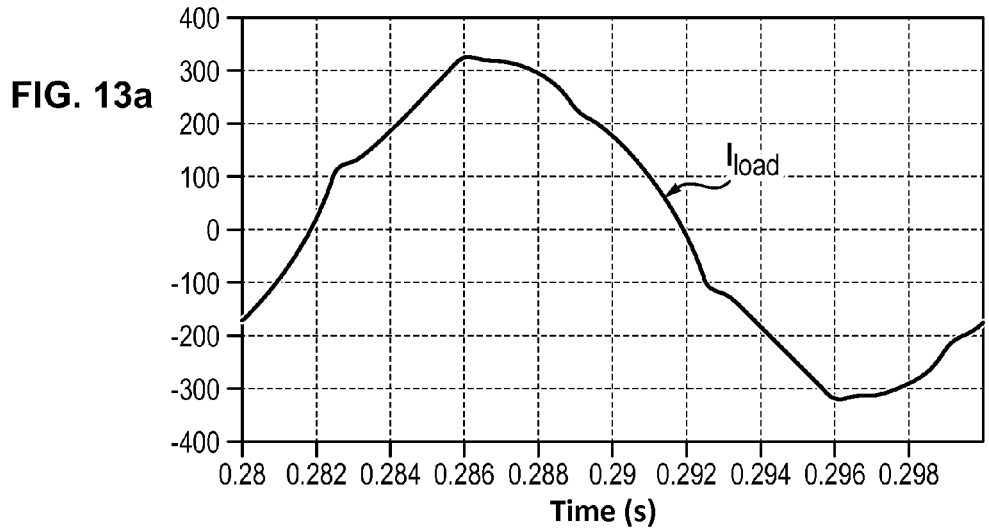
Figure 13B:
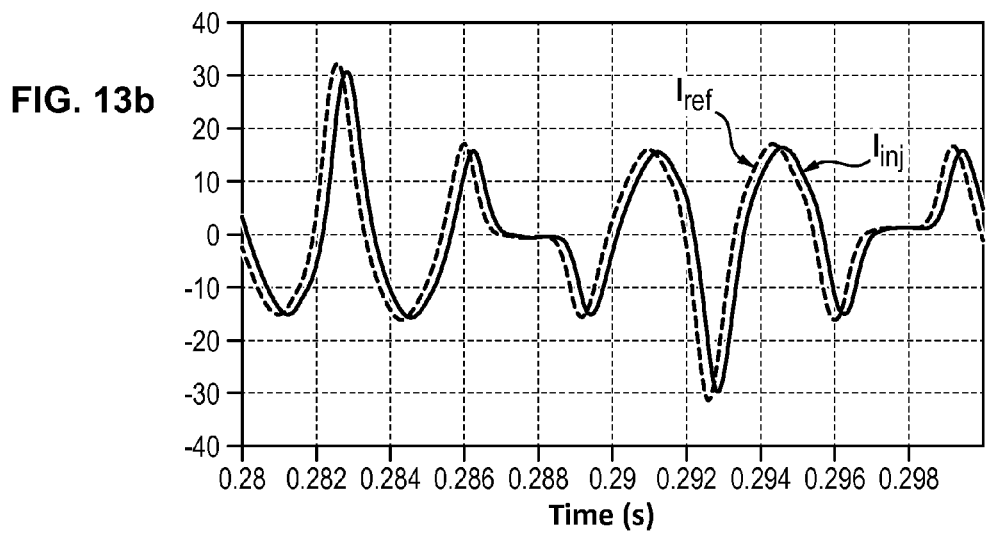
Figure 13C:
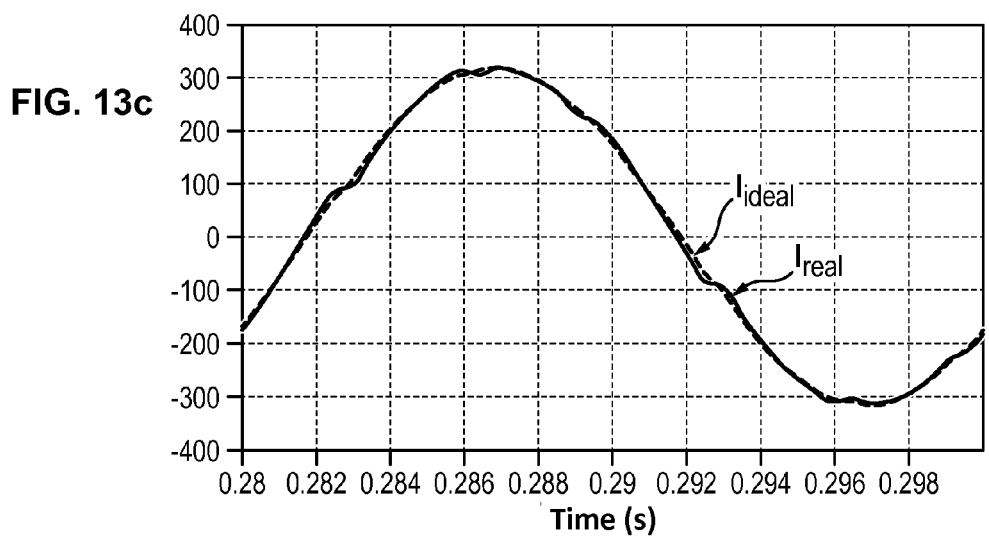
Figure 14:
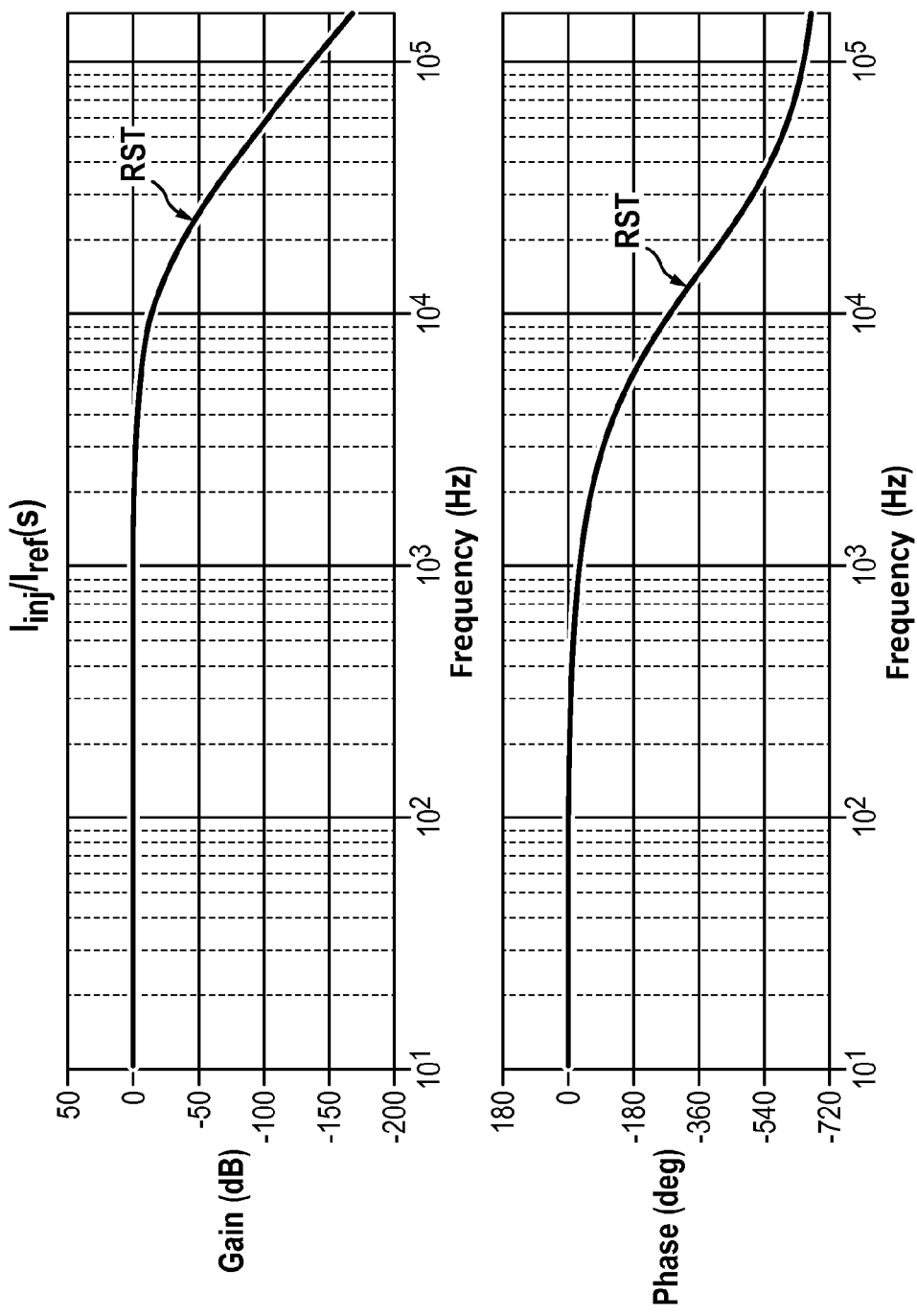
Figure 15:
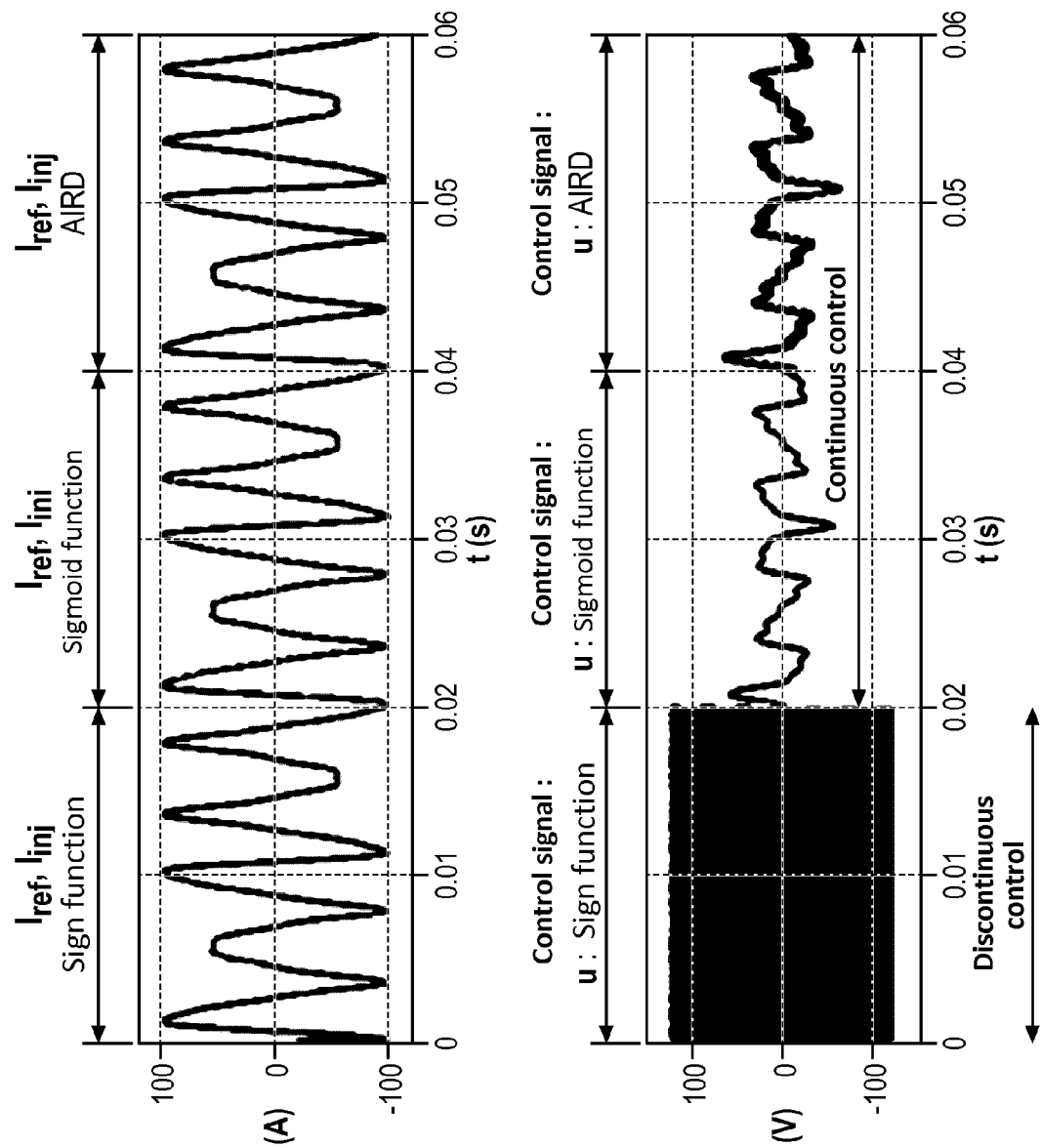
Figure 16:
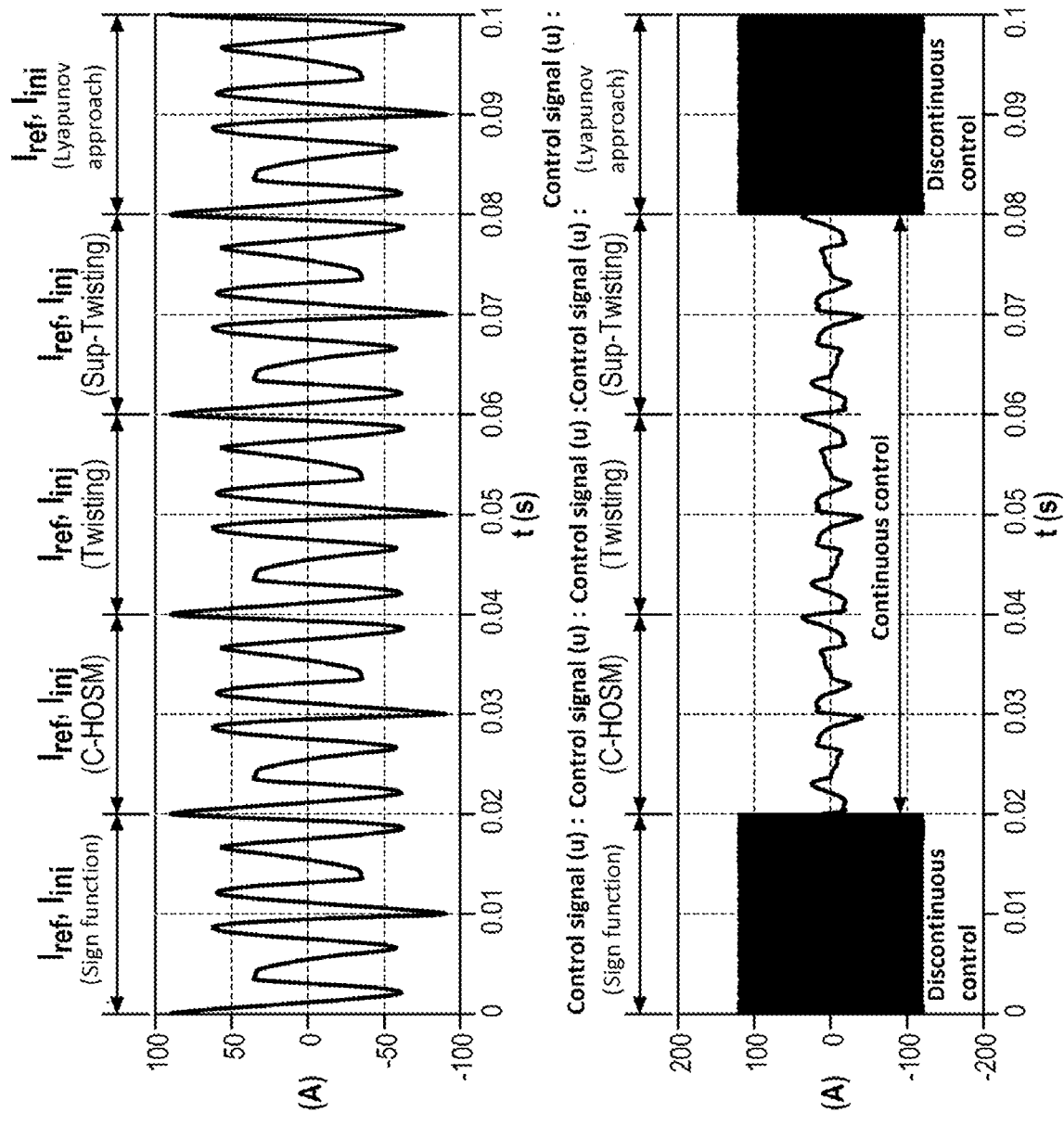
Figure 17:
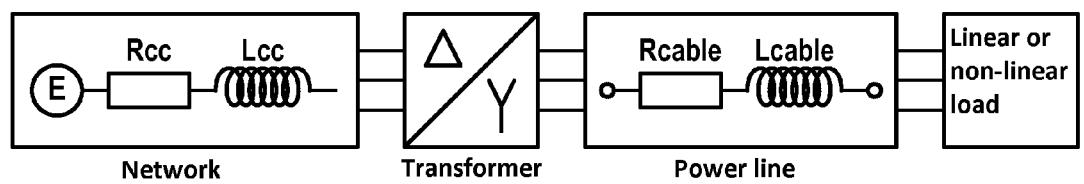
Figure 18:
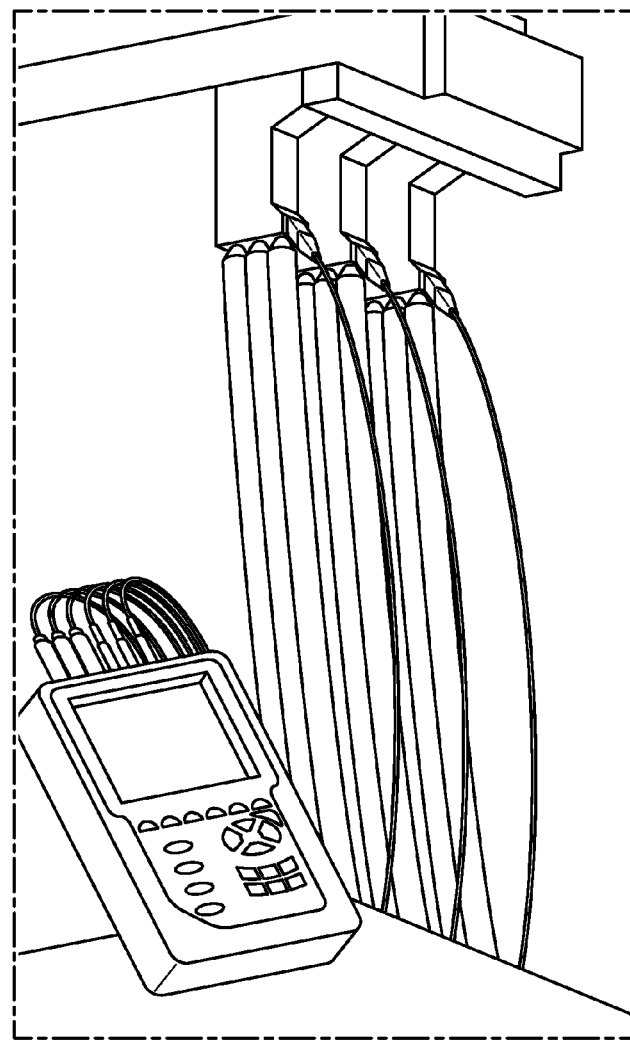
Figure 19:
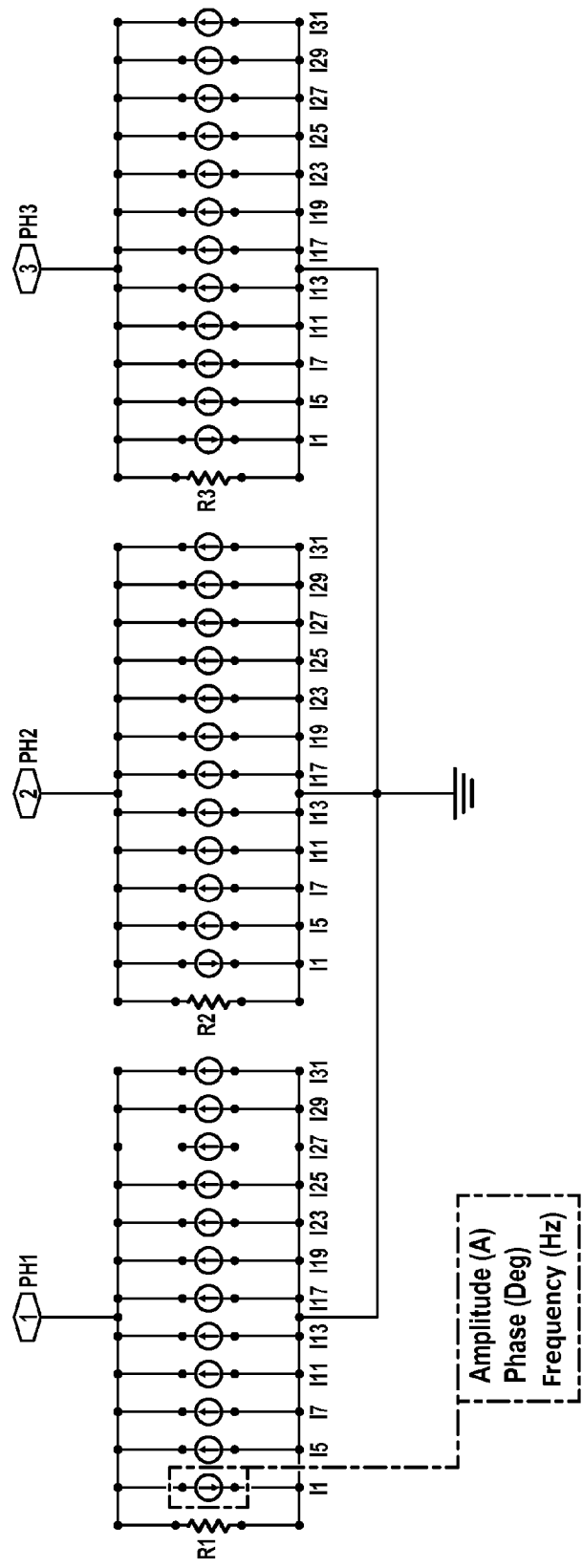
Figure 20A:
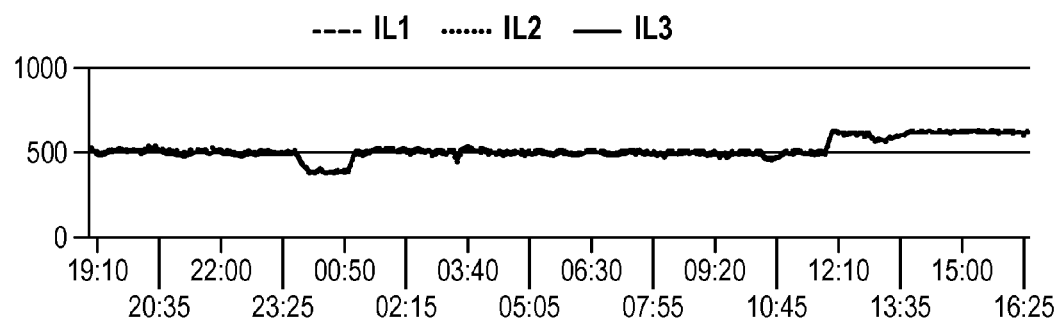
Figure 20B:
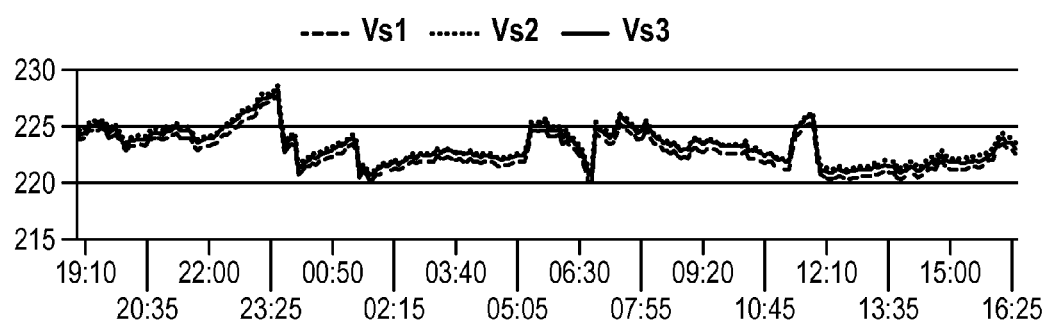
Figure 20C:
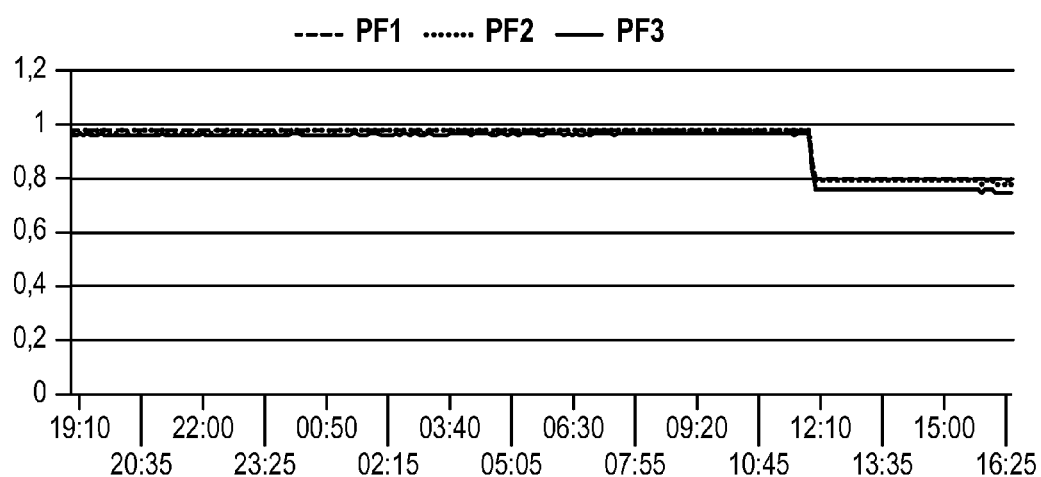
Figure 20D:
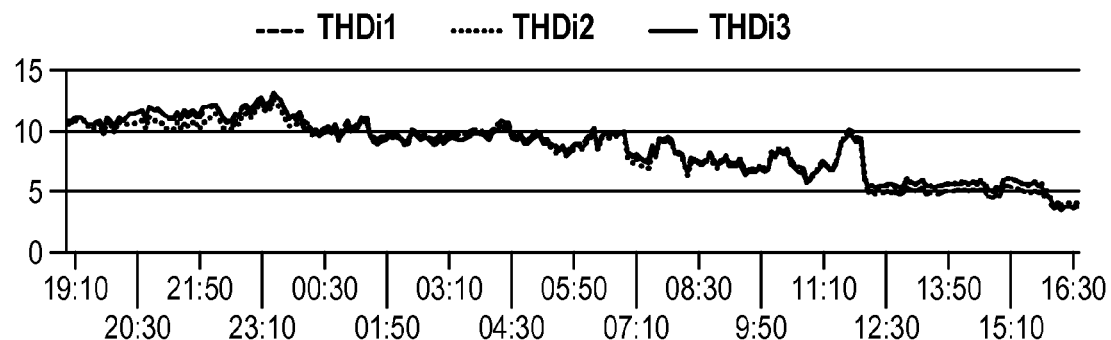
Figure 20E:
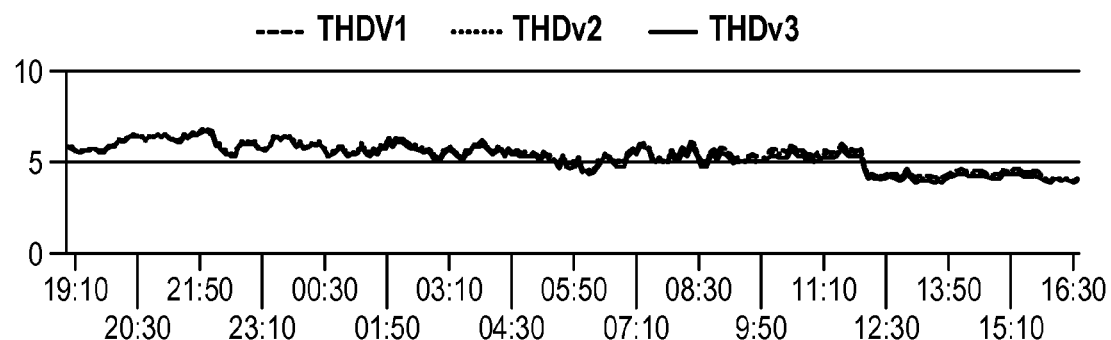
Figure 20F:
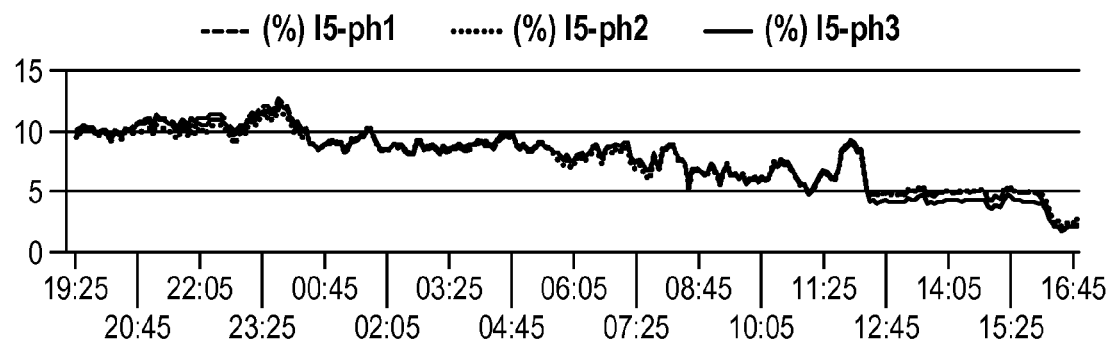
Figure 20G:
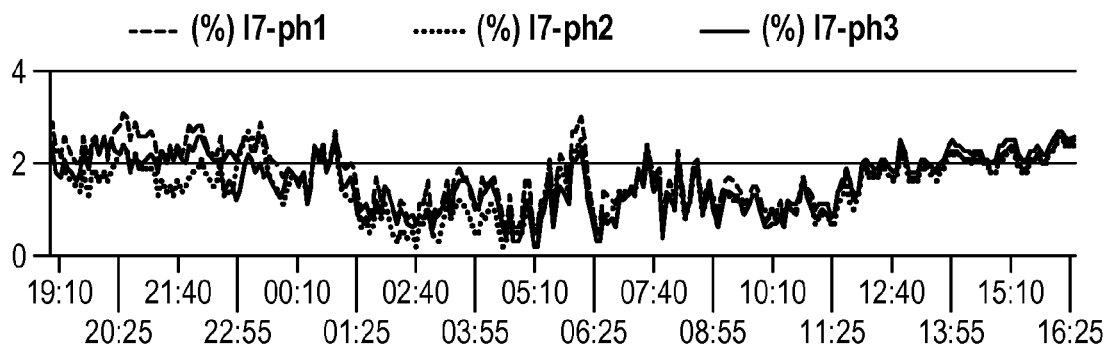
Figure 20H:
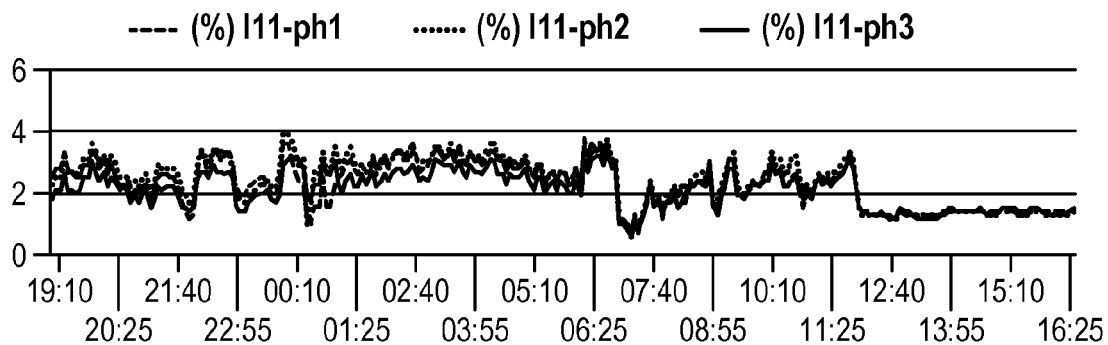
Figure 20I:
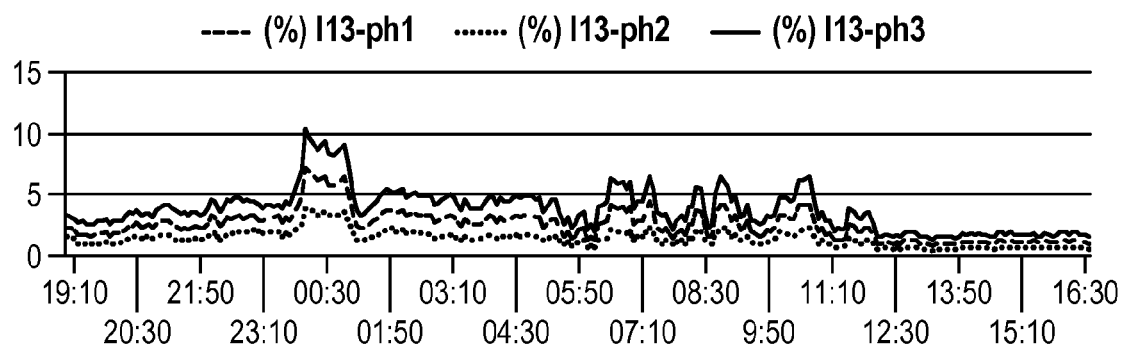
Figure 21A:
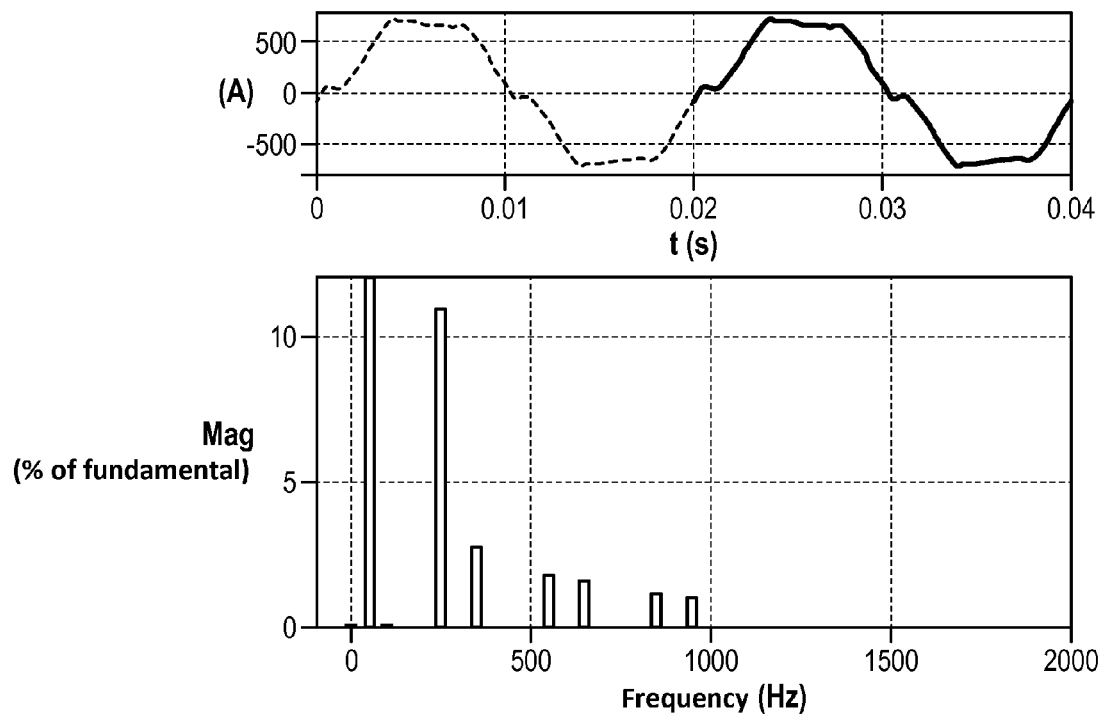
Figure 21B:
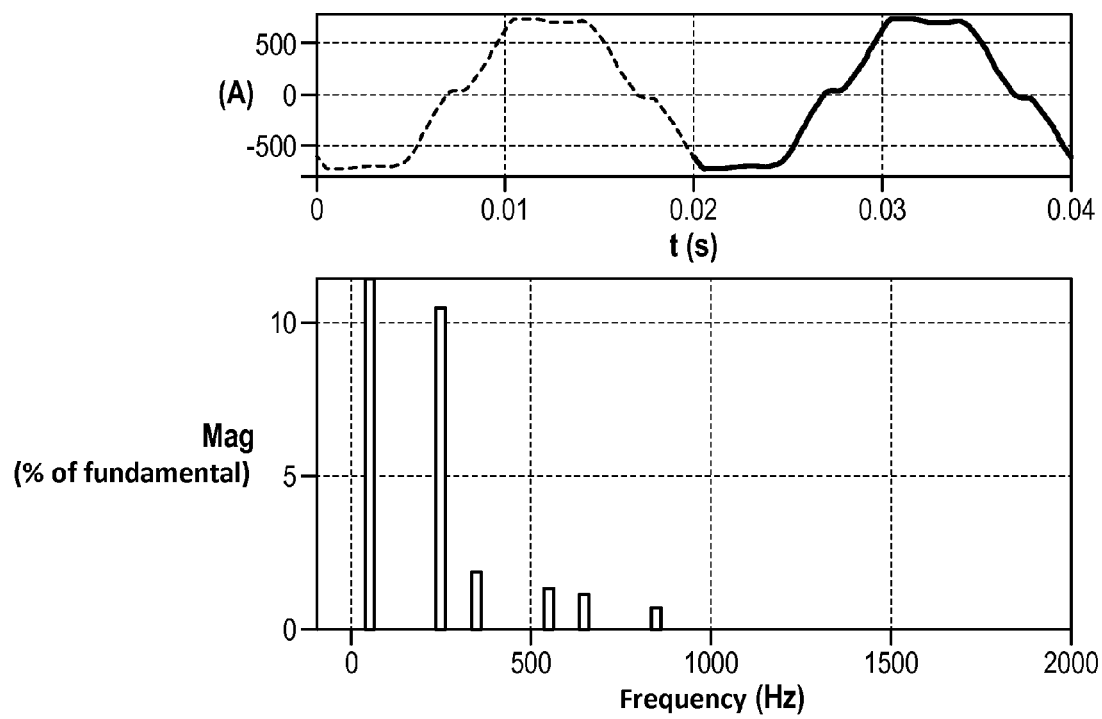
Figure 21C:
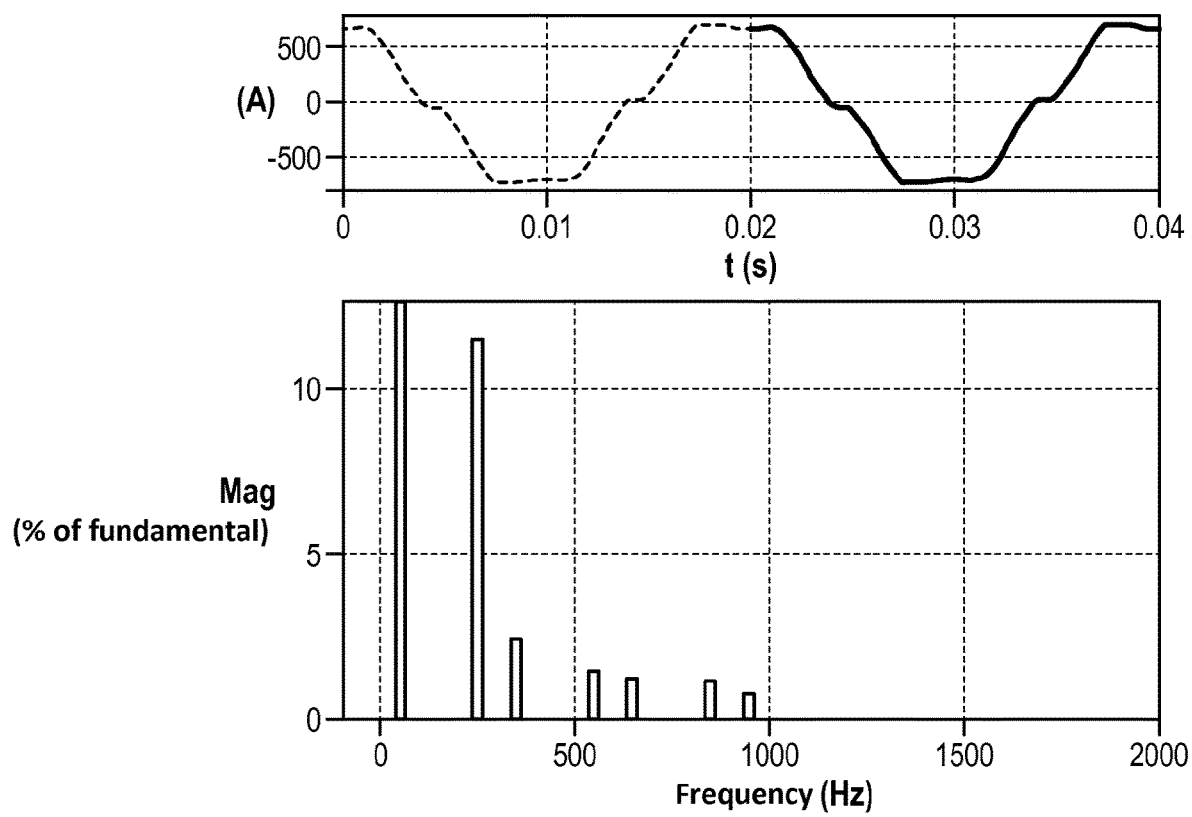
Figure 21D:
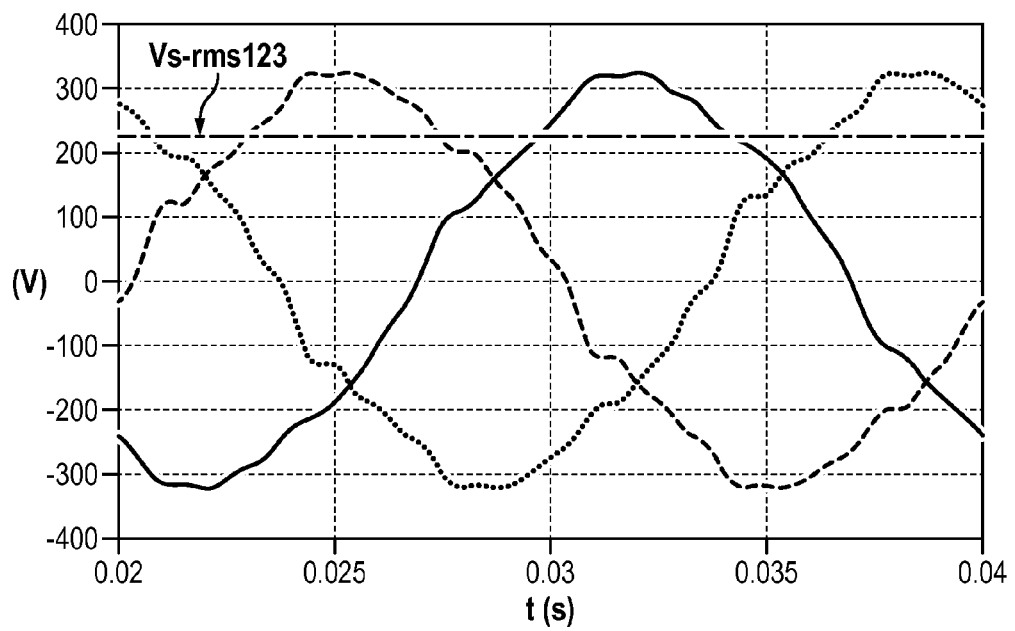
Figure 21E:
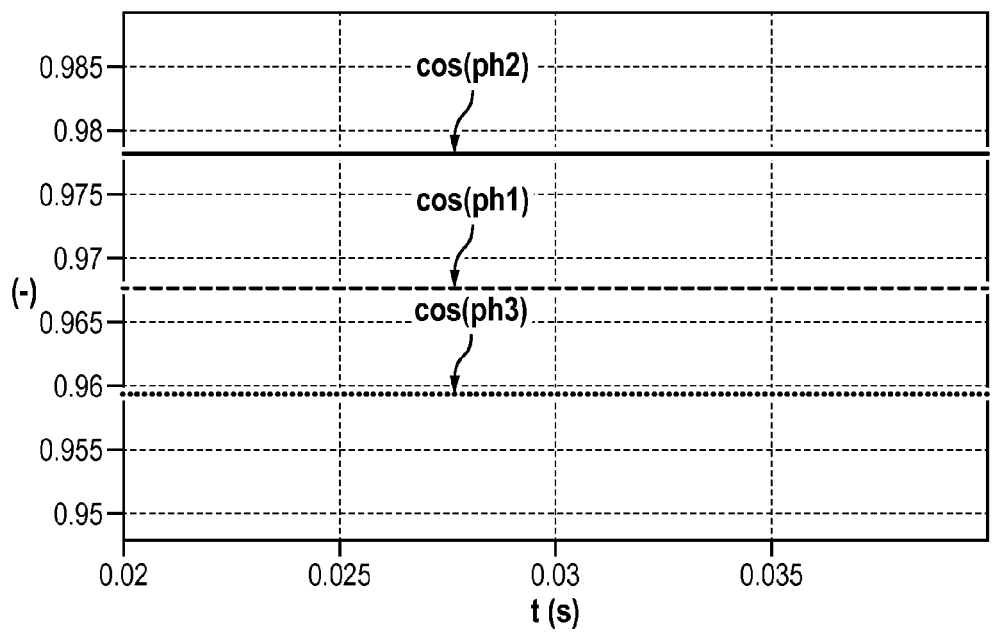
Figure 21F:
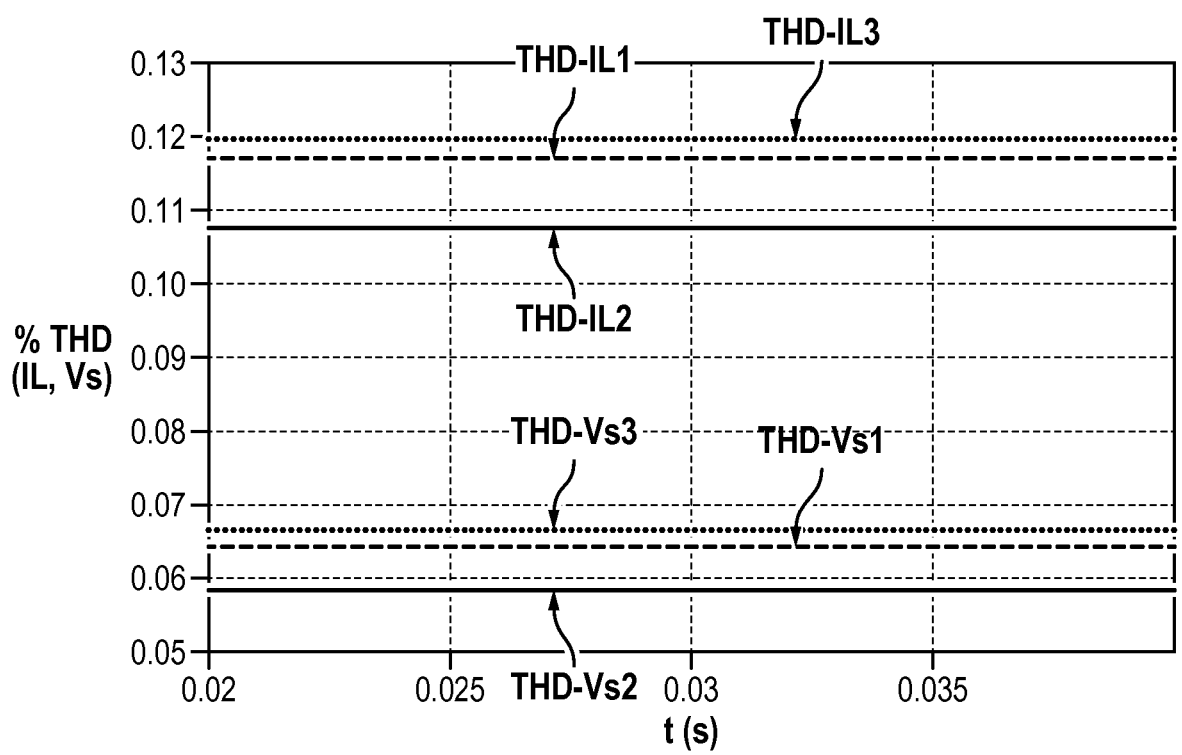
Figure 22:
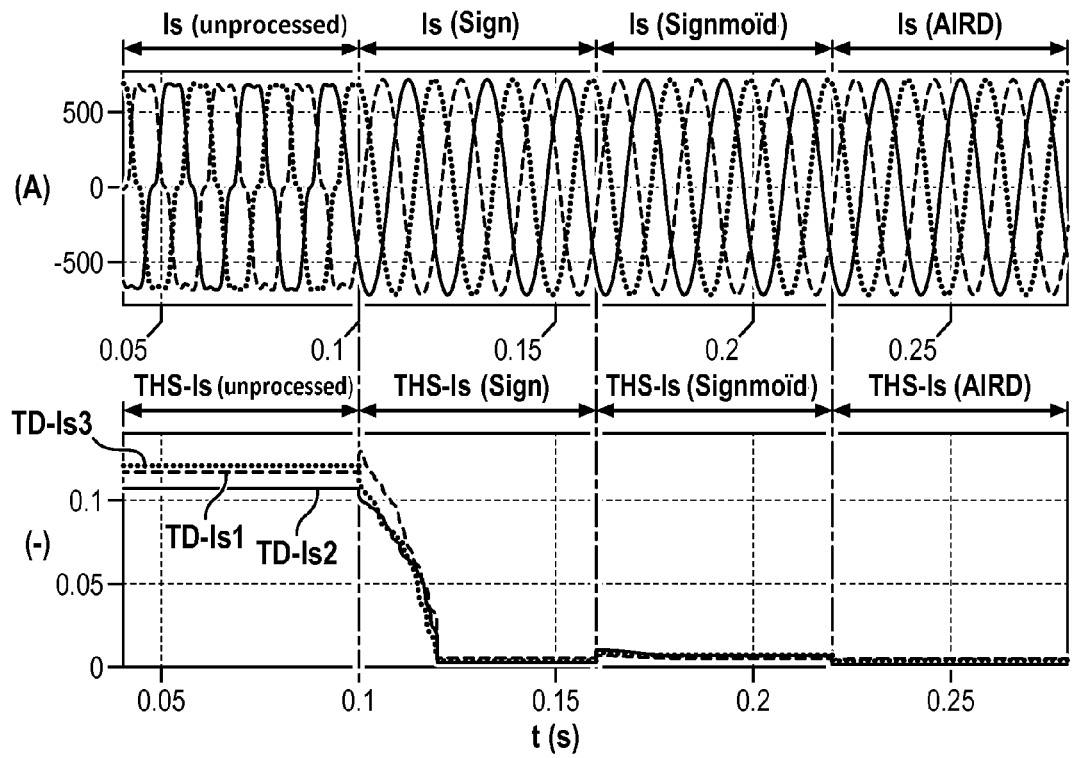
Figure 23:
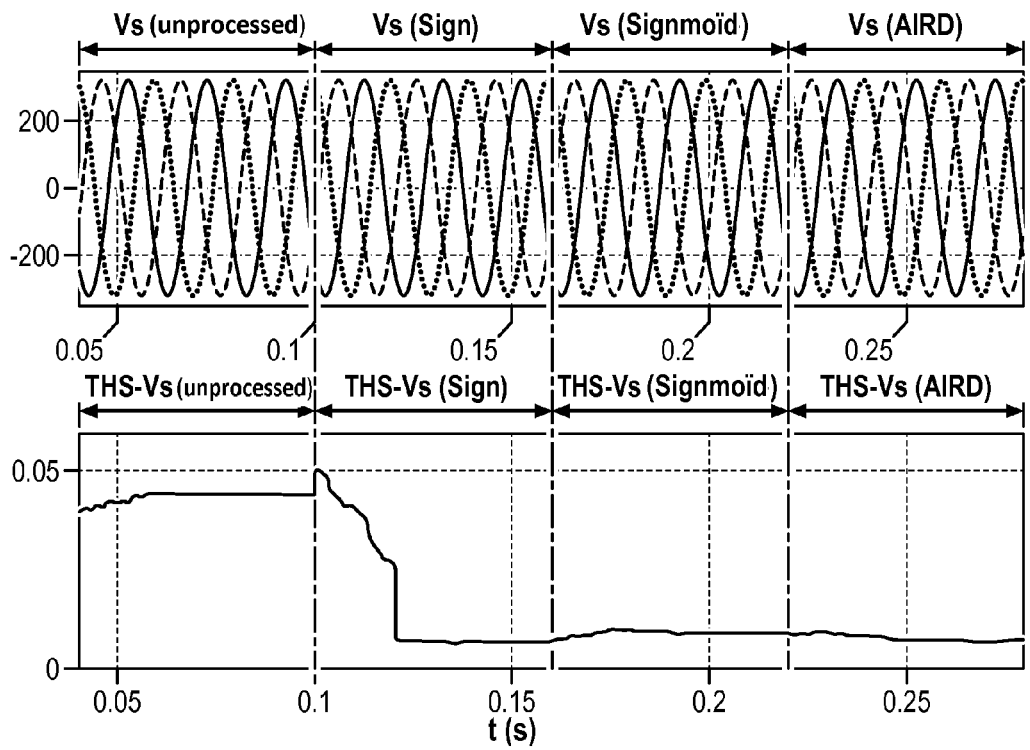
Figure 24:
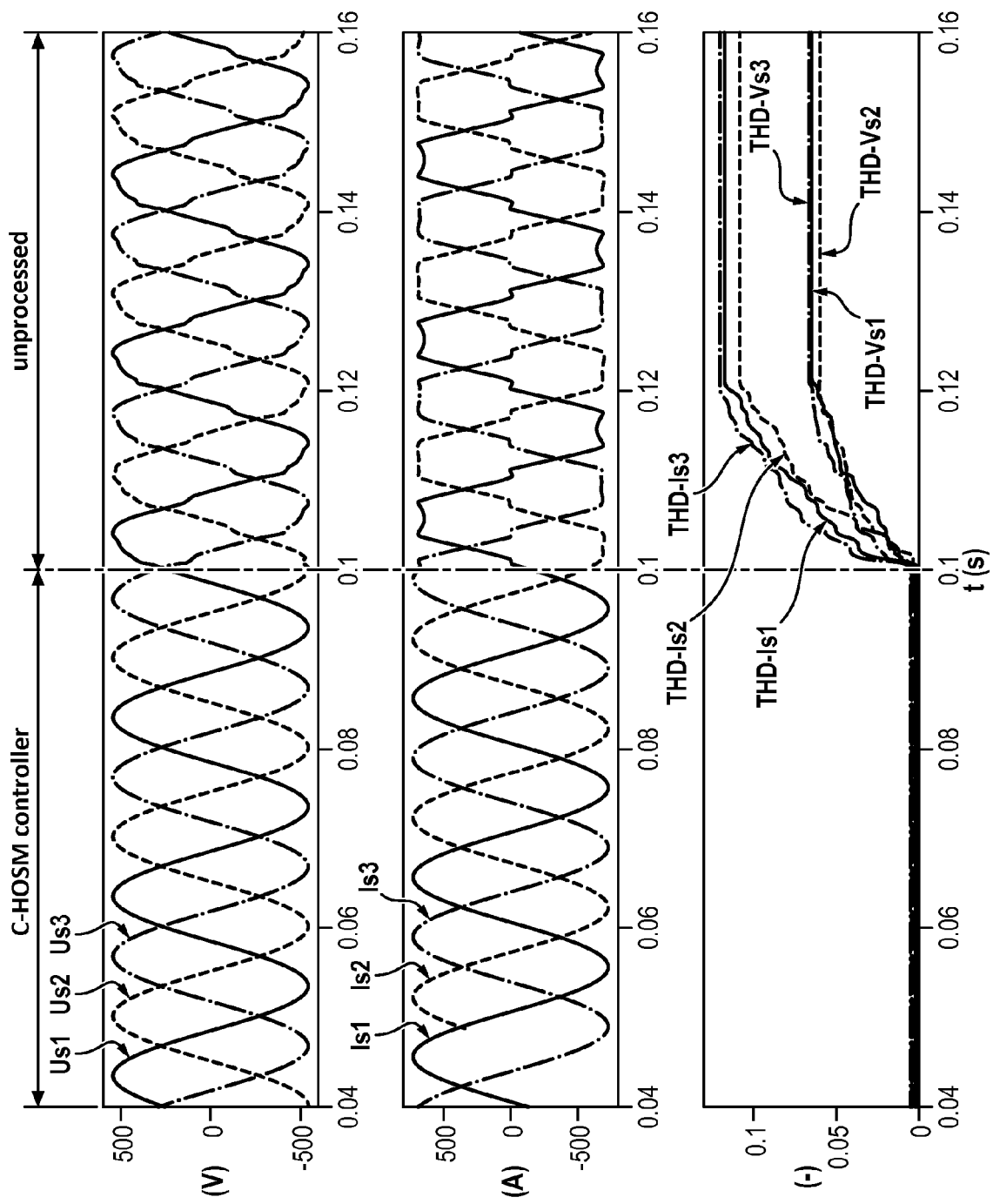
Figure 25:
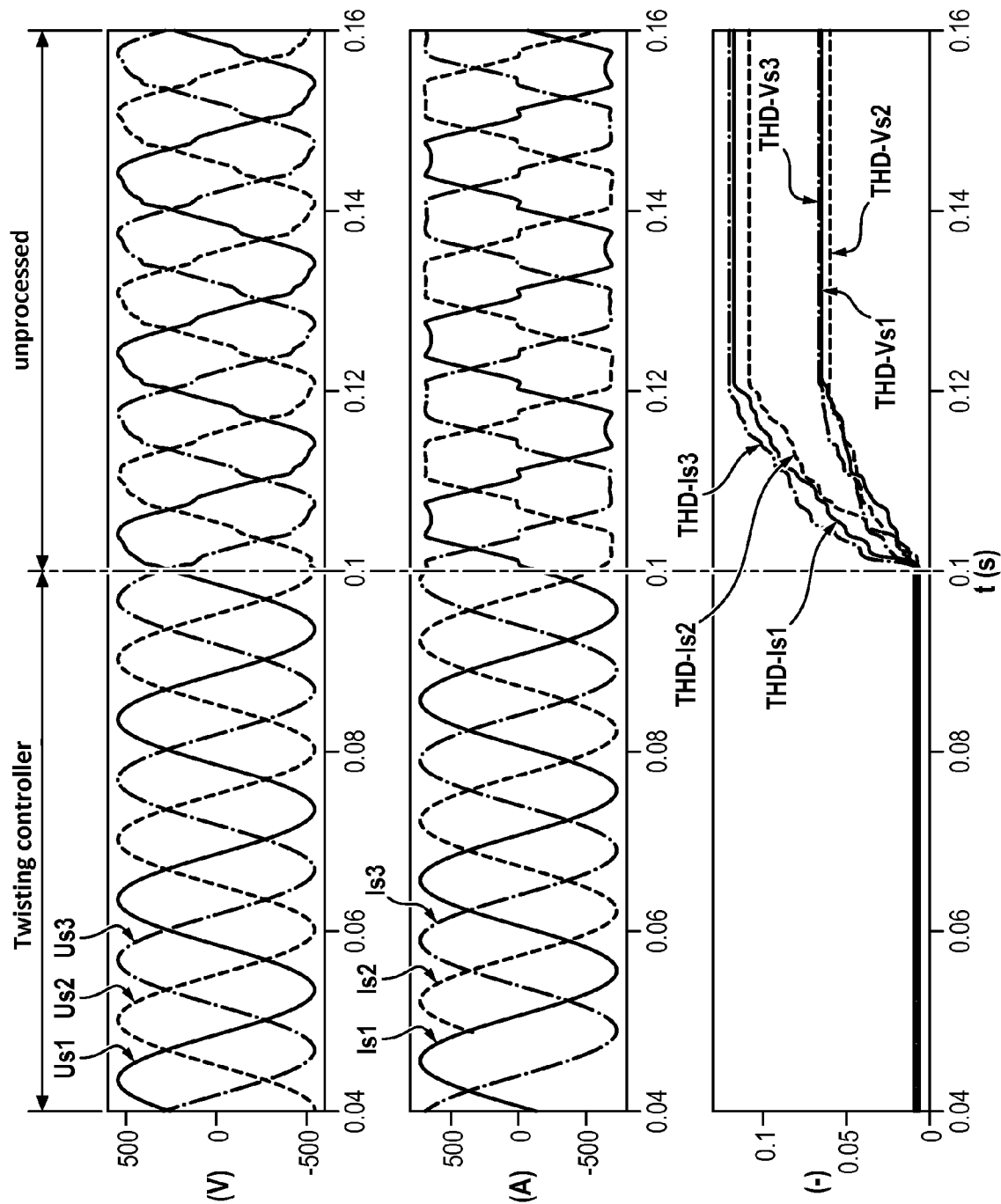
Figure 26:
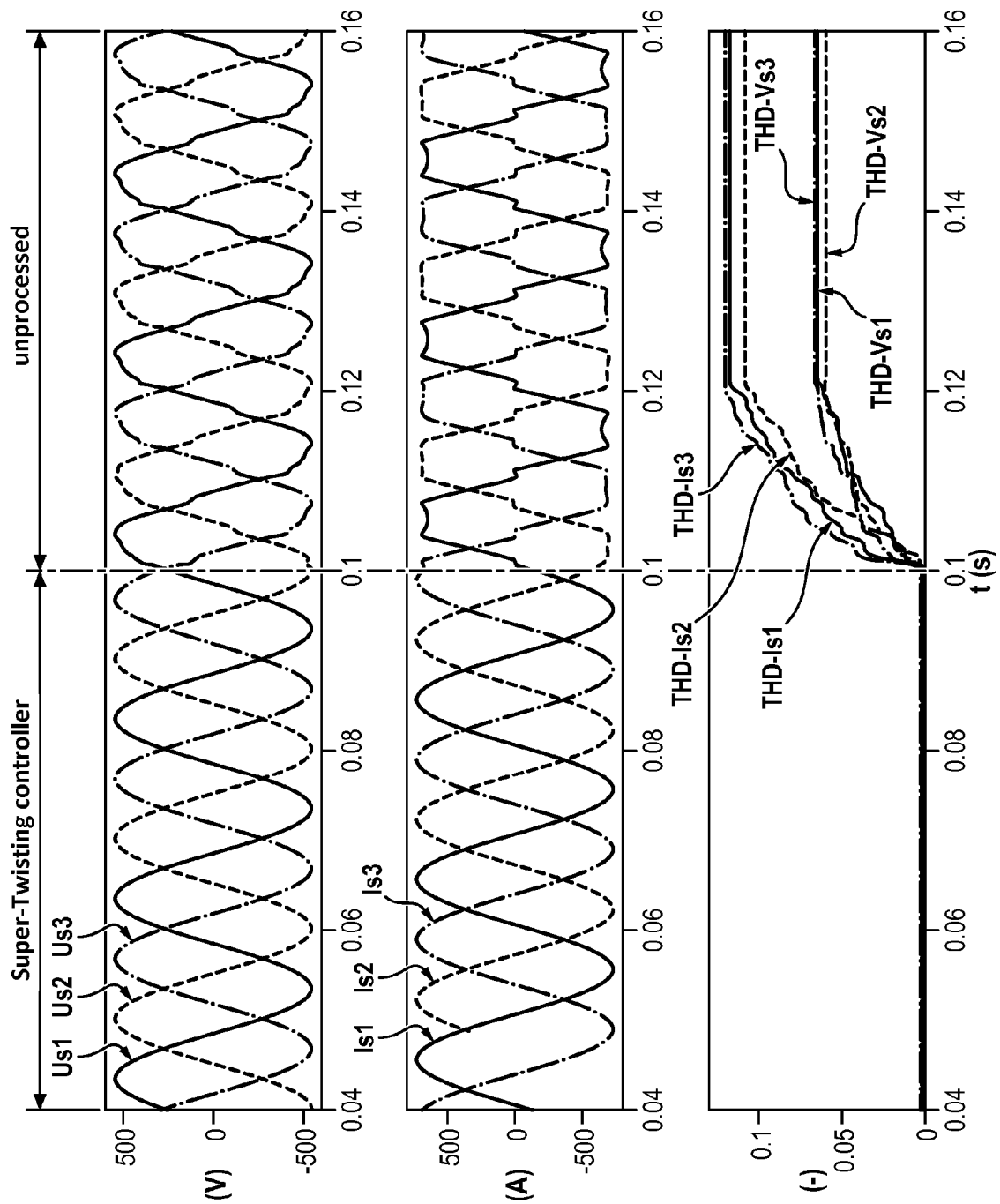
Figure 27:
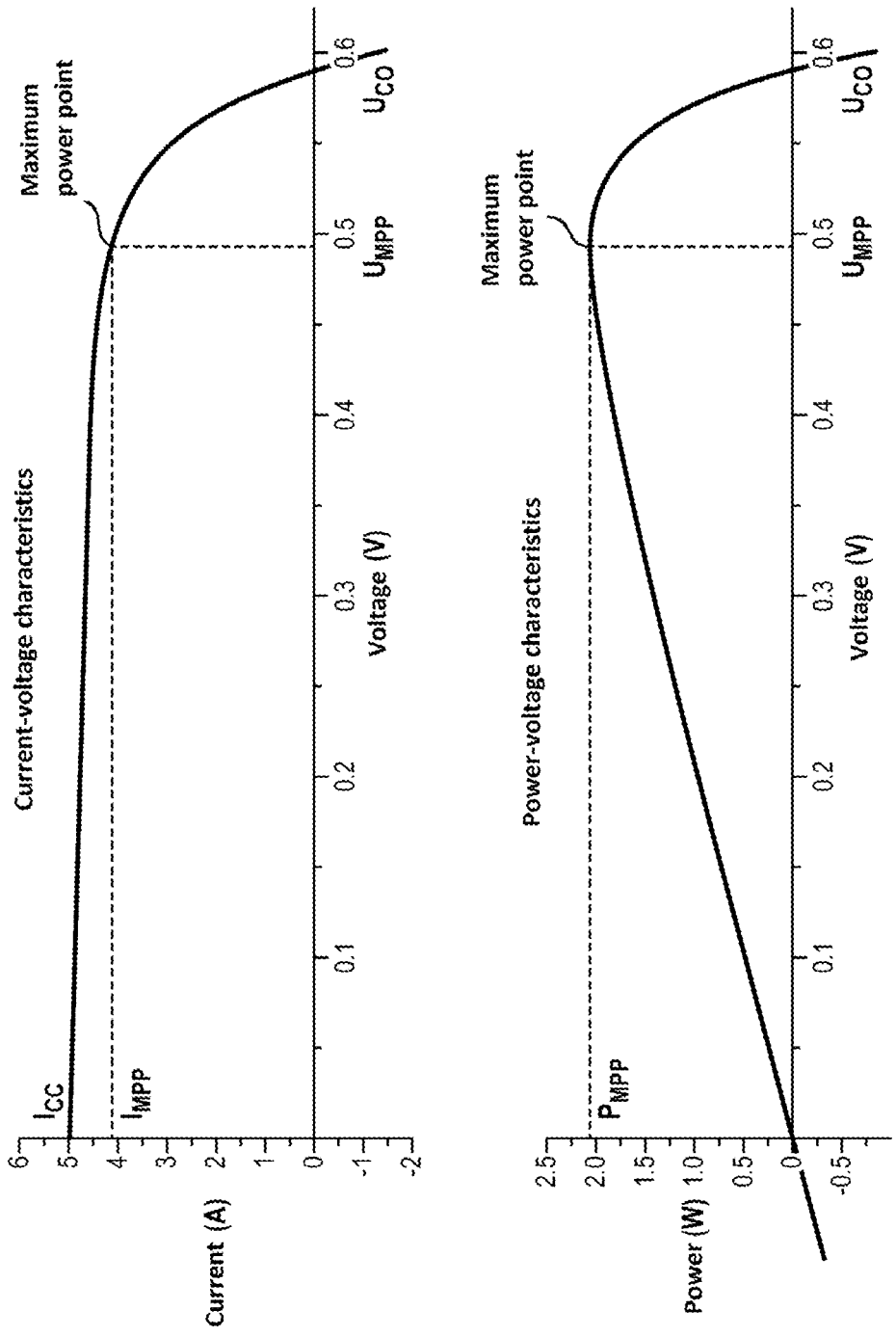
Figure 28:
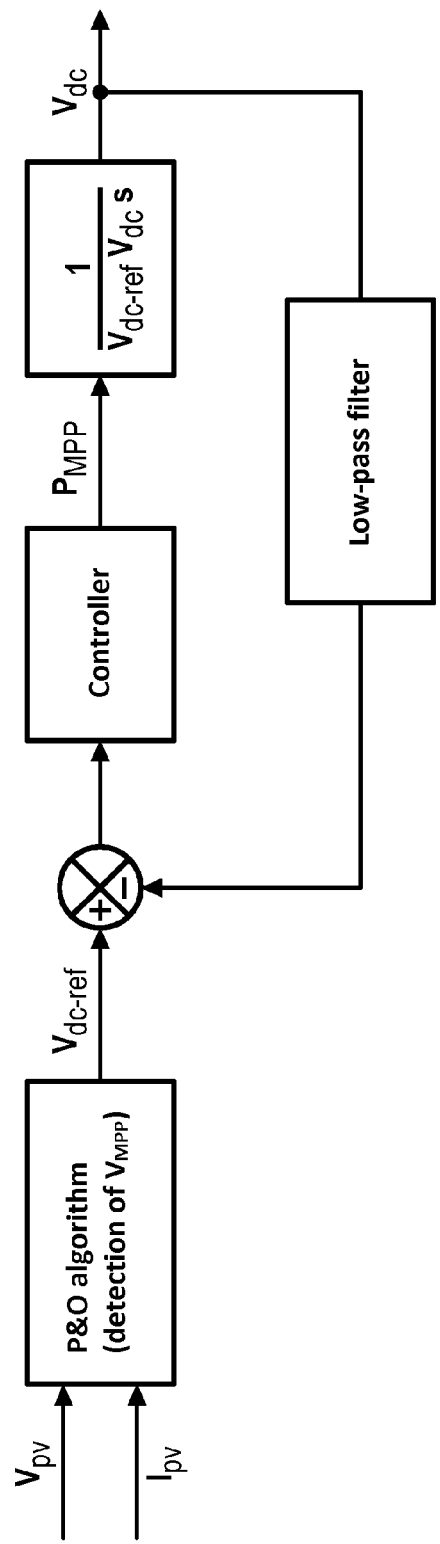
Figure 29:
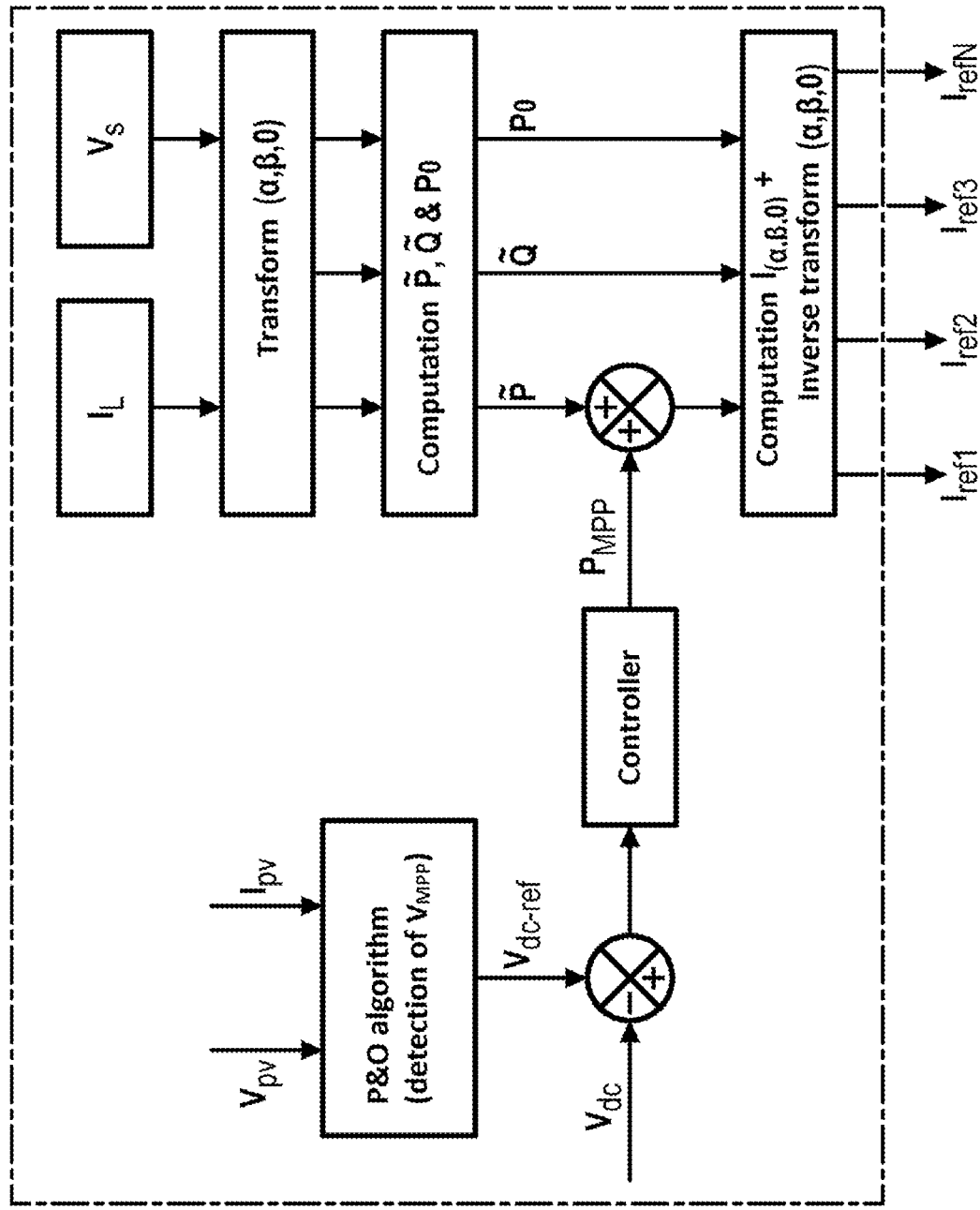

FIG. 8 is a diagram showing an electrical system according to a second embodiment of the invention, wherein the electrical system comprises a semi-decentralized management system that manages the conventional energy production of the network and also, in the event of an emergency, the operating mode of the centralized units via the active compensating devices, in turn connected to the renewable energy production units;

FIG. 9 shows a general structure of the shunt active filter according to the invention;

FIG. 10 shows an equivalent diagram by phase of the third-order LCL output filter according to the invention;

FIG. 11 shows the diagram of the gain of the third-order LCL output filter;

FIG. 12 shows a general block diagram of the algorithm for controlling the current of the active filter;

FIG. 13 shows an effect of the phase difference on the compensation quality of the active filter; more specifically FIG. 13a shows the amperage of the load, FIG. 13b represents the setpoint current and the injected current, and FIG. 13c shows the current of the network with the effect of the phase difference as well as the ideal estimated current without the phase difference effect;

FIG. 14 shows the diagrams of the gain and phase of the transfer function of the control loop of the active filter with RST which is a linear controller based, among other things, on a placement of the poles of the closed loop (control loop);

FIG. 15 shows the tracking and the single-phase control signal with a single-phase control signal with the sliding mode controllers using the Sign, Sigmoid and artificial increasing of relative degree control functions;

FIG. 16 shows the tracking and the single-phase control signal with the higher-order sliding mode controllers using the SMC, C-HOSM, 2-SMC Twisting, 2 SMC Super-Twisting control algorithms and the Lyapunov approach;

FIG. 17 shows a wiring diagram of the industrial site being studied;

FIG. 18 shows a photograph of the energy quality analyzer installed in the industrial site being studied;

FIG. 19 shows a model of the overall load of the production line of the factory being studied;

FIGS. 20a to 20i show the measurement curves delivered by the energy quality analyzer; more precisely FIG. 20a shows the three-phase plots (Ph1, Ph2 and Ph3) of the currents of the total load IL123 in A; FIG. 20b shows the voltages of the electrical network Vs123 in V; FIG. 20c shows the power factors PF123; FIG. 20d shows the total harmonic distortions THD of the currents of the total load THDi123 in %; FIG. 20e shows the total harmonic distortions of the voltages of the network THDv123 in %; FIGS. 20f to 20i respectively show the individual total harmonic distortion rates for the orders 5, 7, 11 and 13 of the currents of the loads for each of the phases, the distortion rates being expressed in %;

FIGS. 21a to 21f shows the simulation results for the validation of the proposed model; in particular FIG. 21a shows the currents of the total load on the phase ph1 including the harmonics; FIG. 21b shows the currents of the total load on the phase ph2 including the harmonics; FIG. 21c shows the currents of the total load on the phase ph3 including the harmonics; FIG. 21d shows the simple voltages of the network; FIG. 20e shows the power factors; FIG. 21f shows the harmonic distortion rates on the different phases, and in particular the THD-V, as well as the THD-I;

FIG. 22 shows the filtering of the current of the disturbed network being studied using the sliding mode controllers using the Sign, Sigmoid and artificial increase of relative degree control functions;

FIG. 23 shows the filtering of the voltage of the network being studied using the sliding mode controllers using the Sign, Sigmoid and artificial increase of relative degree control functions;

FIG. 24 shows the filtering of the current and voltage of the disturbed network being studied using the C-HOSM controller;

FIG. 25 shows the filtering of the current and voltage of the disturbed network being studied using the 2-SMC Twisting controller;

FIG. 26 shows the filtering of the current and voltage of the disturbed network being studied using the Super-Twisting controller;

FIG. 27 shows the current-voltage and power-voltage characteristics of a photovoltaic generator;

FIG. 28 shows a loop for regulating the DC voltage of the unit of the storing element of the inverter;

FIG. 29 shows an algorithm for identifying (non-active) disturbance currents incorporating tracking of the maximum power point.

DESCRIPTION OF ONE OR MORE MODES OF IMPLEMENTATION AND EMBODIMENTS

Figure 2:
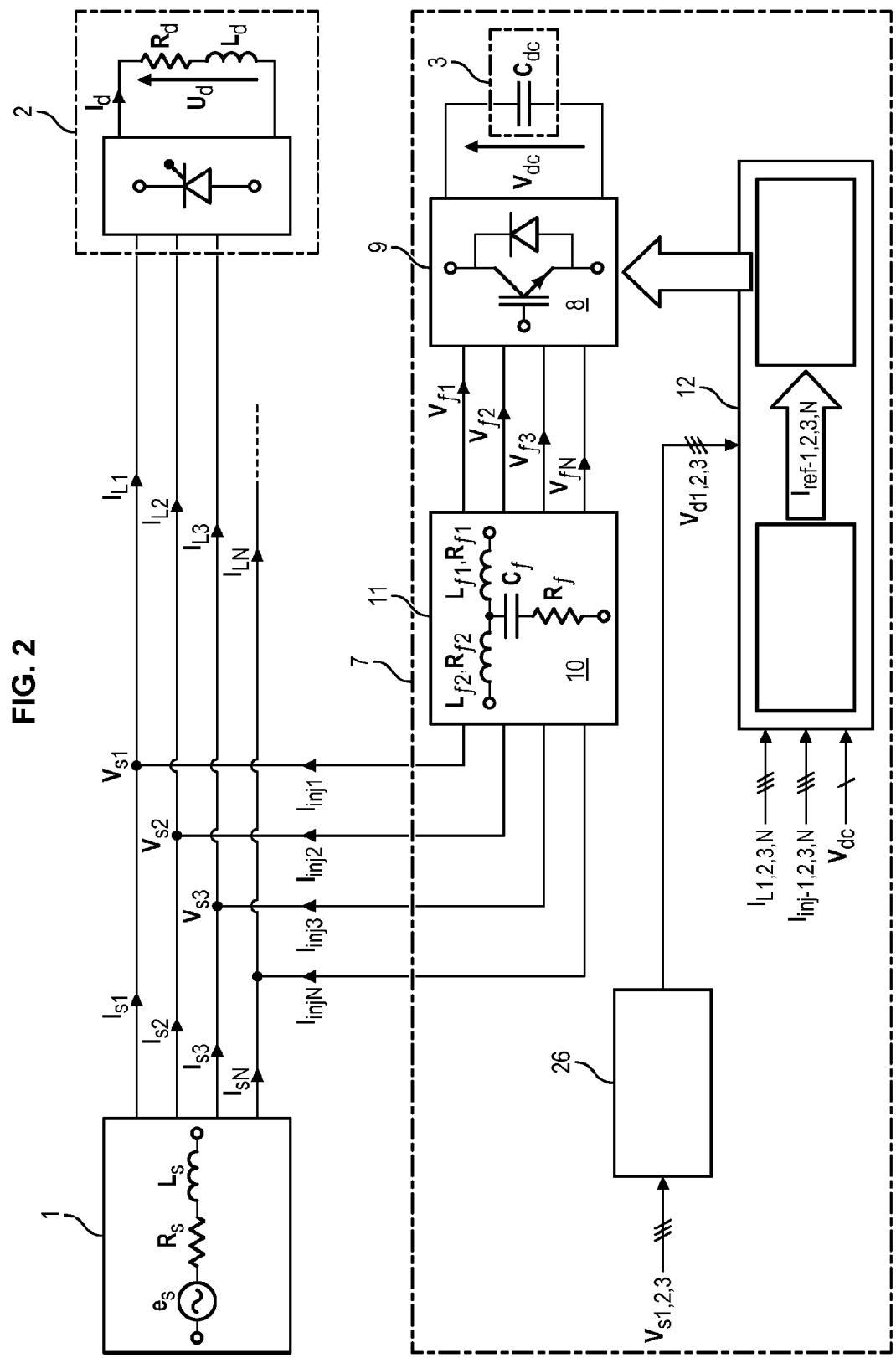
FIG. 2 is a diagram showing an electrical network supplying a load with an inverter, included in an active compensating device according to the invention.
Figure 3:
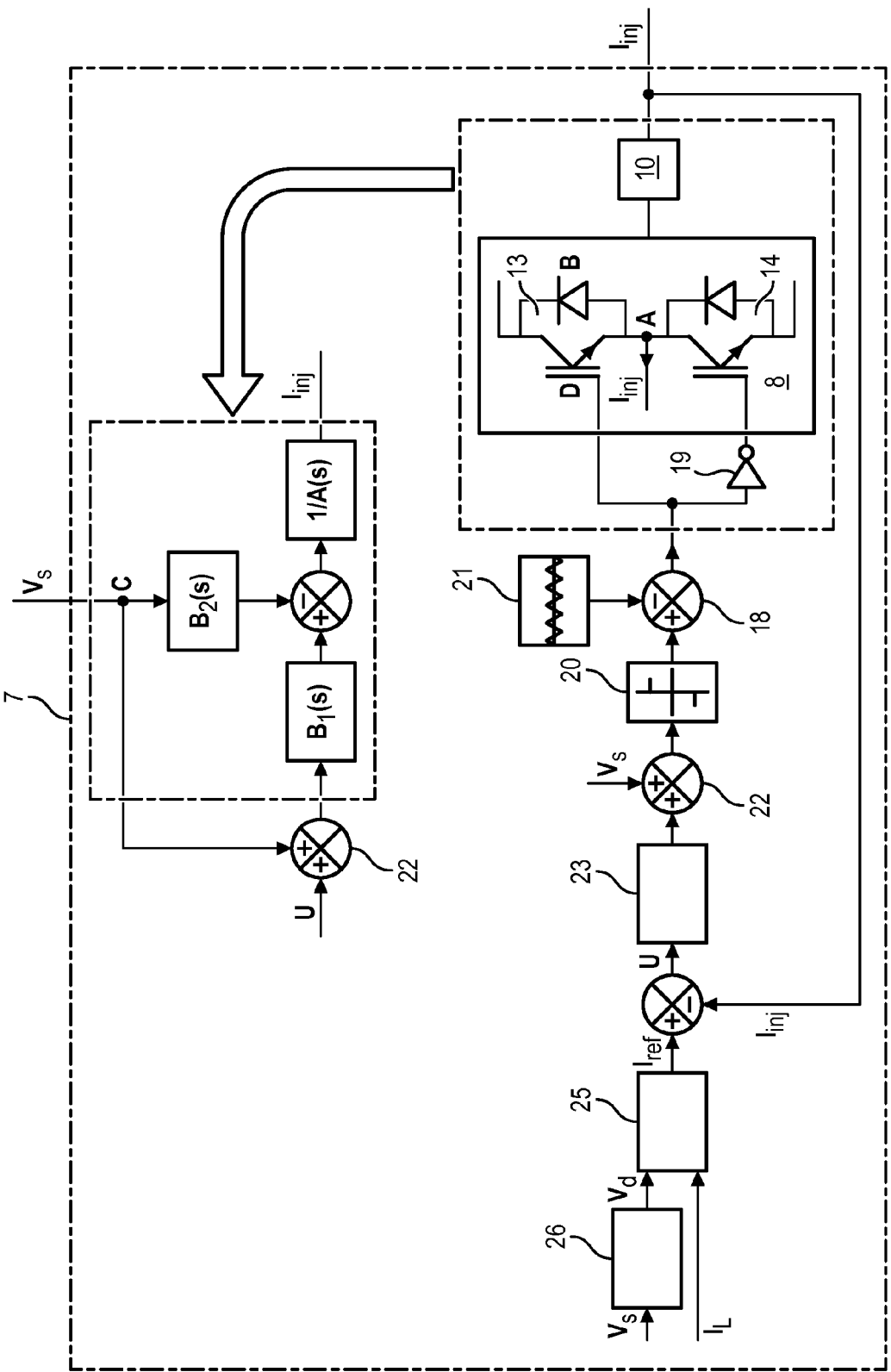
FIG. 3 is a diagram showing the structure of an active compensating device according to the invention, in particular the structure of the control unit.

The invention relates to an electrical system as shown in FIGS. 2-3, comprising a power supply network 1 with 3 phases and one neutral, a non-linear or linear load 2 or both connected to the network 1, a capacitive energy storing element 3, a renewable-energy-generating power unit 100 and a compensating assembly 7 connected on the one hand to its input, downstream, to the output of the renewable-energy-generating power unit 100 associated with the storing element 3 and on the other hand shunt-connected across its output, upstream, at a connection point (C) located between the network 1 and the load 2.

The compensating assembly 7 includes:
 a power converting unit 8, including an inverter 9, generating an AC current with a frequency band ranging from 50 to 2500 Hz, covering:
 a) the whole frequency band of the non-active disturbance current which has: all or part of the harmonics, and at the fundamental frequency all or part of the reactive power and/or unbalanced current etc.
 b) as well as the active current generated by the renewable-energy-generating power unit 100;
 a filtering unit 10, including at least one filter 11 of LCL type thus combining two inductances, and a capacitor, for each of the phases and one neutral, and connected: on the one hand downstream of the voltage inverter 9, and on the other hand shunt-connected across the connection point C between the given electrical network 1 and the non-linear and linear electrical loads 2, the LCL output filter 11 being dimensioned to block the harmonic components due to the switching of the inverter 9;
 a control unit 12 configured to identify and control the current injected into the network 1 and to control the inverter 9 to generate this current.

The control unit 12 is configured to control the inverter 9 in such a way that the inverter 9 generates a signal of amperage $I_{inj}$ configured in phase opposition to cancel, at the connection point C, the non-active disturbances of the signal generated by the load 2 and injected into the network.

The signal emitted at the output of the filtering unit 10, and therefore at the output of the compensating assembly 7, therefore has the harmonics of the signal caused by the non-linear part of the load 2.

For any harmonic present in the disturbance signal, caused by the load 2, the signal emitted by the filtering unit 10 has a voltage value (in phase opposition) that is the inverse of the voltage value of the signal of the non-linear load 2 at this harmonic n. Thus, by injecting the signal at the output of the compensating assembly 7 at the connection point C, the harmonics of the signal emitted by the non-linear load 2 are cancelled and the current traveling on the network 1 side is devoid of harmonics.

Similarly, the output signal of the compensating assembly 7 has, for the fundamental frequency and the harmonics, a phase difference configured to generate a reactive power (in phase opposition) that is the inverse of the reactive power of the disturbance signal of the load 2.

In this way, the reactive power consumed by the load 2 is completely compensated, within the limit of the dimensioning of the device 7, on the network side.

The control unit 12 is further configured to compensate for the unbalance of the signal traveling through the non-linear or linear load 2.

The term "unbalance" is understood to mean a different current consumption as a function of the different phases of several single-phase charges 2.

It should be noted that any disturbance current with a frequency included in the frequency band of the loop for controlling the injected current, ranging from 0 Hz to 2500

Hz, can be compensated/filtered by the device 7 (cf. FIG. 14). Unconventional harmonics can be included.

The compensating assembly 7 is configured to be installed in an electrical network already contaminated at the level of its upstream voltage while offering the possibility of operating at two fundamental frequencies (50 and 60 Hz), which can each vary by ±10%, while being capable of adapting to voltage variations of ±15%.

This allows the correct operation of the compensating assembly 7 even in the event of electrical generator units replacing the electrical network.

The control unit 12 is further configured to regulate (charge and keep constant) the voltage $V_{dc}$ across the terminals of the capacitive storing element 3.

The control unit 12 is further configured to detect the MPPT (Maximum Power Point Tracking) of a renewable-energy-generating power unit 100 and generating, via the inverter 9, the active current corresponding to this maximum power; the voltage $V_{dc}$ across the terminals of the capacitive storing element 3 is equal, in this case, to the voltage of the maximum power of the renewable energy production unit 100.

The Converting Unit 8

The converting unit 8 includes, as represented in FIGS. 2 and 3, the inverter 9 with 3 phases and one neutral which has a similar structure to a conventional inverter with two voltage levels, in such a way as to ensure reliability and minimize structural costs.

The inverter 9 is here driven by the control unit 12 in such a way as to occupy, with the units 3 and 11, a shunt active filter function.

The inverter 9, with 4 wires and 4 arms, includes for each of the 4 arms, two switching devices 13 and 14 each connected on the one hand to an output terminal of the capacitive storing element 3 and on the other hand to a common connection point A to which one of the 4 wires is also connected.

This connection point located, for each arm, between the first switching device 13 and the second switching device 14 forms a point of connection of one of the 4 wires of the inverter 9 connected to the other end of the filtering unit 10, the output of which is connected to the connection point C.

Each switching device is composed of an electronic power switch D, which can be controlled to open and close (IGBT, GTO or another) and an anti-parallel diode B (double-throw operation).

The inverter 9 emits, over each wire, a signal having an amperage $I_{inj}$.

The inverter 9 is configured to inject powers covering a wide frequency band, usually between the frequency of the fundamental, for example 50 Hz, and the harmonic order 50, having in the example of a 50 Hz fundamental a frequency of 2500 Hz.

The Filtering Unit 10

The filtering unit 10 in this embodiment comprises a filter 11 of LCL type, which has the advantage of being easy to implement with respect to a bulky, heavy and expensive first-order filter.

The filter 11 therefore includes, on each of the 4 wires (three phases with the neutral), a first inductance 15 connected on the one hand to an input wire of the filtering unit 10 (exiting from one of the 4 common connection points A), and on the other hand to a second inductance 16, the second inductance 16 being connected on either side to one of the 4 connection points C via an output wire of the filtering unit 10.

The filter 11 associated with each wire further includes a capacitor 17 connected on the one hand to a common point E and on the other hand to a connection point F between the first inductance 15 and the second inductance 16.

The filter 11 makes it possible to prevent the propagation of the components due to the switching frequency of the inverter 9 to the power supply network 1 without degrading the dynamic response of the compensating system 7. It therefore makes it possible to limit the risk of resonance, and thus dispense with an auxiliary passive filter intended to limit this propagation, if a first-order output filter (a simple inductance) is used in association with this auxiliary filter.

The Control Unit 12

The control unit 12 is configured to regulate the voltage across the terminals of the storing element 3 as well as to identify and control the injected current, via the filtering unit 10, at the connection points C for the 4 wires and for controlling the inverter 9 to generate this current. The identification of the currents to be injected at the connection points C is done by the unit 25 for computing the reference currents.

The current to be injected at the connection points C includes the active current of the renewable-energy-generating power unit 100 as well as non-active disturbance currents, which can have harmonics, unbalance, and reactive power, etc. configured in phase opposition to oppose the harmonics, unbalance and reactive power of the signal traveling through the load 2 in such a way as to reduce them, or even cancel them on the electrical network 1 side.

The controller 23 provides the tracking of the current between the injected current $I_{inj}$ and the reference current coming from the unit 25. On its side, the controller 62 provides the tracking of the voltage between the voltage $V_{dc}$ across the terminals of the storing element 3 and the voltage of the maximum power of the unit 100, delivered by the unit 25-B; the unit 3 shall consequently be charged.

Finally, the driving unit 21 provides the control of the switches of the inverter 9 in order to generate $I_{inj}$.

The operation and the structure of the control unit 12 shall be subsequently described for one phase. It is understood that each of the 4 wires (the three phases and the neutral) is driven similarly and independently by the control unit 12, which therefore includes a chain of control by wire.

For the control of the switching devices 13, 14 of a wire, the control unit 12 therefore includes two outputs, one connected to the pole for triggering the first switching device 13, the other being connected to the pole for triggering the second switching unit 14.

The two outputs are jointly connected to the output of a logic comparator 18, in such a way as to simultaneously control the switching of the two switching devices 13, 14.

One of the outputs of the control unit 12 includes a logic level inverter 19, in such a way that the activation of one of the switching devices 13, 14 causes the deactivation of the other, advantageously during a single control pulse owing to their common connection, upstream of the logic level inverter 19, to one and the same comparator 18.

The comparator 18 emits a logic output signal corresponding to the comparison between an output signal of a saturation element 20 and an output signal of a switch driving device 21.

The switch driving device 21 controls the switching of the inverter 9 via a non-linear controller 23 by continuous sliding mode, adapted to the filter 11 of LCL type that provides in a closed loop the control of the entire 50 to 2500 Hz frequency band for the injection of the non-active disturbance current and of the active current, as a function of the identification of the reference currents by the computing unit 25.

The switching control of the inverter 9 is done in such a way as to allow to pass through the output filtering unit 10 at the connection point C:
- a part or all of the non-active disturbance currents injected in phase opposition comprising: harmonic currents, as well as reactive and unbalanced currents at the fundamental frequency, in the non-linear and linear electrical loads 2, to satisfy the non-active energy consumption demand of the non-linear and linear electrical loads 2, while decontaminating the electrical network 1 of these non-active disturbance currents;
- an active current corresponding to a maximum power point available within the renewable-energy-generating power unit 100, to satisfy the active energy consumption demand of the non-linear and linear electrical loads 2.

The switch driving device 21 emits a signal (called a carrier wave) at a predetermined frequency, as a function of the dimensioning of the units 9, 10 and 3, in such a way as to cause the switching of the switching devices 13, 14.

In most cases, the control laws, designed to control the voltage inverters which are connected to the electrical network via an LCL filter, have been originally established for renewable energy systems (photovoltaic and wind-power.) In this case, provision can be made for linear controls as the inverter has only fundamental components (mainly an active power) to be injected into the network, the phase difference, at the fundamental frequency, between the signal $I_{ref\text{-}fondamental}$ identified via the unit 25-B for computing the reference currents and that injected $I_{in\text{-}fondamental}$ being negligible in this case. It should be noted that in this operating mode, the unit 25-A, because of a phase difference problem, is not included in the identifying block and the unit 25 is thus limited to the unit 25-B.

Specifically, in the case of a shunt active filter, the inverter 9 must inject into the electrical network fundamental components (reactive and unbalanced) and harmonic components at the same time, which implies having total control over a very large frequency passband. A considerable phase difference limits the applicability of the linear controllers in the case of harmonic filtering.

The non-linear control of the injected current $I_{inj}$ makes it possible to overcome this phase difference problem, encountered when using an LCL filter associated with a linear controller.

In this embodiment, the controller 23 carries out SMC (Sliding Mode Control), which makes it possible to ensure the desired dynamic response, a strong robustness/insensitivity to the bounded disturbances and also good control properties within a wide range of operating conditions.

It is well known that conventional sliding mode control with a so-called Sign function, generates a control of the inverter switches at very high frequency (discontinuous control), in order to ensure finite-time convergence on the sliding surface wherein the states of the system are subsequently maintained, even in the presence of bounded disturbances.

The Sign function of a signal is given by the relationship:

$$\operatorname{sign} u = \frac{u}{|u|}$$

In practice, the voltage inverter is controlled by a switching function with a limited, fixed or variable frequency. Very high frequency switching cause overheating that can result in the destruction of the inverter.

In order to avoid operation in discontinuous control mode, this invention makes use of two controllers per continuous-control sliding mode, one being associated with a Sign function approximated to a sigmoid function and the other being associated with a method of artificial increase of relative degree, followed by an integrator. The two controllers are associated with two appropriate sliding surfaces.

The first method consists in replacing the Sign function with a continuous approximation. This is a Sign function approximated to a Sigmoid function given by the formula:

$$\operatorname{sign} u = \frac{u}{|u| + \varepsilon}$$

with $\varepsilon$ the thickness of the neighborhood of the sliding surface.

The system, in this case, no longer converges on the desired value, but on the neighborhood of this value, which makes it possible to limit very high-frequency switching.

The artificial increase of relative degree method consists in increasing the order of the sliding surface by one degree (leading to an additional derivative), which makes it possible to insert an integrator at the output of the Sign function. The control in this case becomes continuous. Specifically, by once more deriving the tracking error between the signal $I_{ref}$ identified by the unit 25 and the injected current $I_{inj}$, the signal at the output of the Sign function represents the derivative of the control (discontinuous until now). An integral action at the output of the Sign function will generate a continuous control.

The two controllers used make it possible to avoid the discontinuity of the control signal, particularly caused by variable switching of the inverter at very high frequencies, caused by conventional sliding mode control.

In addition, three other non-linear controls based on the higher-order sliding mode method are also used. These are the 2-SMC Twisting and 2-SMC super-Twisting second-order sliding mode control algorithms as well as the C-HOSMC continuous higher-order sliding mode control algorithm.

These controllers ensure, within a wide range of operating conditions, as described below, the robustness of performance and stability provided by the conventional discontinuous control sliding mode control method, while offering continuous control that ensures the nominal operation of the inverter (9).

Optionally but advantageously, the switch driving device 21 includes a device for modulating pulse width, wherein the control signal is compared to a carrier wave with a predetermined switching frequency as a function of the dimensioning of the units 9, 10 and 3.

This makes it possible to make the inverter 9 operate at a fixed switching frequency.

A synergistic effect is obtained by hence improving the retention of the high-frequency components, due to the switching, by the filter 11 of LCL type.

A saturation element 20 is conventionally configured to impose upper and lower limits on the control signal. These limits are determined by the amplitude of the carrier wave which in turn linked to the voltage of the capacitive storing element 3.

The input signal of the saturation element 20 comes from the output of a summer 22, the output signal of which is the sum of a control voltage u emitted by a controller 23 and of the voltage $V_S$ of the connection point C. The addition of the voltage $V_s$ into the control loop of the injected current $I_{inj}$ prevents a strong draw of reactive current from the inductors of the LCL filter 11.

The unit 25 for computing the reference currents includes a plurality of measured inputs.

The quantities of the system that are measured include:
- the amperage $I_L$ of the current of each wire consumed by the load 2,
- the amperage $I_{inj}$ of the current of each wire exiting the filtering unit 10,
- the voltage $V_{dc}$ across the terminals of the capacitive storing element 3, which is also the voltage of the maximum output power of the renewable-energy-generating power unit 100,
- the voltage $V_S$ of each of the phases at the connection points C, by way of a phase-locked loop (PLL) 26. The phase-locked loop 26 is used to extract the three-phase positive component $V_{d123}$ of the voltage from the network 1 at the connection points C. It should be noted that the three-phase positive component $V_{d123}$ of the voltage of the network (1) is indispensable for the effective operation of the identifying unit 25.
- the amperage $I_{pv}$ of the current of the renewable-energy-generating power unit 100,
- the voltage $V_{pv}$ of the renewable-energy-generating power unit 100, The unit 25 for computing the reference currents includes one output for each phase, each output corresponding to the control chain of the associated phase (including the neutral), said control chain comprising a comparator 24, a controller 23, a summer 22, a saturation element 20 and a logic comparator 18 the output of which divides into two branches, one of which includes a logic level inverter 19.

The unit 25 for computing the reference currents therefore emits one setpoint signal per phase, including the neutral, having an amperage $I_{ref}$.

The amperage $I_{inj}$ of each phase, including the neutral, of the signal emitted by the inverter 9 is returned to the control unit 12 and compared, via the comparator 24 with the setpoint $I_{ref}$ of the control chain of the corresponding phase, delivered by the unit 25. The difference between $I_{ref}$ and $I_{inj}$ is corrected via the controller 23 which emits the control signal u.

The voltage $V_{dc}$ applied across the terminals of the capacitive storing unit 3 is regulated (kept constant) by comparing it, via a comparator 60, with a reference voltage $V_{dc-ref}$, which is equal to the voltage of the maximum power point $V_{MPP}$ of the renewable-energy-generating power unit 100, computed via the unit 25-B.

The measured signal of the voltage $V_{dc}$ has the 300 Hz or other fluctuations filtered out of it, via a second-order low-pass filter 61. The error signal ($V_{dc-ref}$-$V_{dc}$) is controlled by a PI (Proportional Integral) controller 62 or another, to obtain the maximum power $P_{MPP}$.

The voltage $V_S$ of the network 1 is added in the summer 22 to the control signal u, the output of the summer 22 being limited in the saturation element 20, the output of the saturation element 20 being compared via the logic comparator 18 with the signal delivered by the pulse width modulating device 21 (the carrier).

The output signal of the comparator 18 is at a level 1 if the output signal of the saturation element 20 is greater than the carrier. Otherwise it is at a level 0. Following this logic chain, the switching device 13 or 14, which does not include any logic level inverter 19, is respectively closed or open (the other device operating in a complementary way).

The control unit 12 includes at least one processor and at least one memory, the memory comprising a program executed by the processor in such a way as to implement the method for determining the setpoint signal $I_{ref}$, containing the non-active current as well as the current $I_{MPP}$ of the maximum power point MPPT, via the unit 25 for computing the reference currents, the controlling of the injected current $I_{inj}$ via the control unit 23, to regulate the voltage $V_{dc}$ across the terminals of the storing unit 3 via the controller 62 and generating this injected current by controlling the devices 13, 14 of each wire of the inverter 9 via the driving unit 21.

The method for determining the setpoint signal $I_{ref}$, delivered by the unit 25 for computing the reference currents, includes the following steps:
- processing the measurements (based on the algorithm for identifying the instantaneous or other powers 25-A) of the current $I_L$ of the load 2 and of the voltage at the connection point $V_s$ in such a way as to estimate the harmonic, reactive and unbalanced etc. non-active currents;
- generating a setpoint $I_{ref}$ computed to cancel (in part or in full according to the dimensioning of the unit 7) the non-active content of the current Is of the power supply network 1 side.

Optionally but advantageously, the unit 25 for computing the reference currents is configured to identify, via the unit 25-B, the maximum power point MPPT of operation of the renewable-energy-generating power unit 100, installed within a renewable energy production field, a building or a self-consumption factory 99, in the following way:
- processing the measurements of the current $I_{pv}$ and the voltage $V_{pv}$ (based, via the unit 25-B, on an algorithm of P&O (Perturb and Observe) type or another, which is part of the unit 25) of the renewable-energy-generating power unit 100.
- generating the maximum voltage $V_{MPP}$, via the unit 25-B, and consequently the maximum power $P_{MPP}$ and the maximum current $I_{MPP}$ that will be integrated into the setpoint current $I_{ref}$ via the power $P_{MPP}$ computed at the output of the controller 62.

Advantageously, only the algorithm for computing the maximum power point (unit 25-B) is to be integrated into the unit 25, via the algorithm for identifying the disturbance currents (unit 25-A). Specifically, the loop for regulating the voltage of the capacitor (unit (3)) of the inverter is already provided for in the unit 25-A to charge the capacitor of the inverter during operation as a pure active filter, in order to compensate for the losses caused by the components of the inverter as well as the LCL filter. In this invention and during operation as an active filter with injection of the maximum power of a renewable-energy source, the reference voltage Vdc-ref becomes the voltage of the maximum power, delivered by the unit 25-B, instead of being predefined according to a pure-filtering-oriented specifications book. This methodology simplifies, minimizes and improves accuracy, in a noteworthy manner, during the implementation of the control part, by comparison with the prior art which makes provision for an additional current loop that also requires the use of a chopper.

The control unit 12 is further configured to carry out the regulation of the voltage $V_{dc}$ across the terminals of the capacitive storing element 3, and consequently to provide the recharging of the capacitor 3. Specifically, the capacitor 3 has, inter alia, the role of covering the losses of the units 9 and 10 as well as supplying the maximum active current $I_{MPP}$ of the renewable-energy-generating power unit 100 at the connection points C, via the inverter 9 and the filtering unit 10.

The rest of the process within the unit 12:
processing the measurements of the voltage $V_{dc}$ across the terminals of the capacitive storing element 3;
filtering, via a second-order low-pass filter 61, the measured signal of the voltage $V_{dc}$ to filter out the 300 Hz or other fluctuations;
tracking, via the controller 62, between $V_{dc\text{-}ref}=V_{MPP}$ and the voltage $V_{dc}$, in order to provide a constant maximum voltage $V_{MPP}$ across the terminals of the capacitive storing element 3;
generating the non-active disturbance current in phase opposition with respect to that circulating in the load and the current of the maximum power of the unit 100.
For this tracking via the controller 62, the unit 25 for computing the reference currents is configured to integrate the computation of the current of the maximum power, via the unit 25-B, in the algorithm for computing the non-active currents, provided by the unit 25-A.

The process of this integration is done as follows:
the output of the controller 62 being the maximum power $P_{MPP}$ of the unit 100, this signal is added to the summer 63, which has at its second input the active disturbance power $\tilde{P}$ coming from the unit 25-A (Upstream) of computation of the instantaneous disturbance powers (active $\tilde{P}$, reactive $\tilde{Q}$ and zero-sequence $P_0$). The unit 25-A (Upstream) performs the computation, from the voltages $V_s$ at the connection points C and from the currents $I_L$ of the load 2, of a number of instantaneous disturbance powers (active $\tilde{P}$, reactive $\tilde{Q}$ and zero-sequence $P_0$ in the frame of reference α, β and 0) caused by the non-active disturbance currents present in the current $I_L$ of the load 2.

The computation of the reference/setpoint currents $I_{ref}$ is done via an inverse pass through the unit (25-A Downstream), with respect to the unit 25-A (Upstream). This reference current contains the non-active currents as well as the current of the maximum power, first computed in the same frame of reference α, β and 0 then in the 4-wire three-phase frame of reference.

The units 25-A(Upstream) and 25-A(Downstream) are configured to identify the disturbance currents; the units 25-A(Upstream), 25-A(Downstream) and 25-B show the unit 25 for computing the reference currents.

Next, since the unit 12 has the setpoint current $I_{ref}$ coming from the unit 25, as well as the injected current $I_{inj}$ controlled in turn via the controller 23, the inverter 9 is controlled via the driving unit 21 to generate the current $I_{inj}$.

This makes it possible to avoid the use of an additional device, a chopper, to generate the maximum power coming from the renewable-energy-generating power unit 100.

The inverter imposes in this case the voltage of the DC side. This entails greater reliability of the shunt active Filter device as well as considerable financial savings.

Optionally, the control unit 12 can include a chopper configured to maintain a predetermined DC voltage across the terminals of the energy-storing element (3) of the inverter. This voltage can correspond to the voltage of a battery bank to be charged. For example, the control unit 12 can include:
a chopper configured to maintain a predefined constant DC voltage across the terminals of the energy-storing element 3 of the inverter, independently of the voltage level of the renewable energy source 100 to provide an unchanged harmonic filtering. A predefined fixed voltage can provide the charging of a battery bank, or serve as a shared DC bus of a micro-grid, etc.
a dual chopper for the case of an island electrical network. The second chopper can supply, for the scenario of the island network and for other applications, an additional DC voltage level, including for the scenario of a battery bank being charged. The inverter, in the island network case, imposes the voltage and the frequency on the AC side, whereas it is the second chopper that imposes the voltage on the DC side.

In an embodiment, the compensating device 7 is installed within a so-called smart building 27, i.e. the electrical apparatuses that the smart building 27 contains can, inter alia, be controlled and activated selectively by a decentralized management unit 70, for example to operate during so-called off-peak periods of the day, during which the energy demand of the network is low and the cost of the energy, from the consumer point of view, decreases.

The control unit 12 is connected to the decentralized management unit 70 of the smart building 27. The decentralized management unit 70 communicates in real time to the control unit 12 the powers of the loads (electrical apparatuses) turned on or off in the building 27.

The control unit 12, having in real time the maximum power of the renewable-energy-generating power unit 100 delivered by the unit 25-B and the controller 62 as well as the powers of the loads, turned on or off, of the building 27 communicated by the decentralized management unit 70, is configured to regulate the consumption of the different apparatuses according to at least two modes of economical distribution of the loads.

In a first mode of economical load distribution, the smart building 27 includes a renewable-energy-generating power unit 100 and in the event of a high degree of availability of the renewable primary sources, the control unit 12 is configured to drive the decentralized management unit 70 in such a way as to activate the apparatuses of the smart building 27 as a function of the production of the unit 100; this consumption mode is known as the adaptive mode.

In a second mode wherein the renewable primary energy is not very available, the control unit 12 is configured to drive the decentralized management unit 70 in such a way as to selectively activate the apparatuses of the smart building 27, in such a way as to present a flat load curve or another, according to the producible power of the network; this consumption mode is called the modulated mode.

This makes it possible to avoid demand peaks on the network 1 and to benefit from a reduced cost of the energy consumed.

The majority, or even the entirety, of the consumed energy is, in this case, of renewable origin, which makes it possible to minimize the consumption of power coming from the network 1. In the event of there being a great need for power and as a supplement to the second distribution mode and if the electrical network 1 is smart, a third distribution mode adapted to the production of the smart electrical network 1 can be envisioned.

In an embodiment, the compensating device 7 is installed between the network 1 and an industrial site or a residential, administrative or commercial building, comparable from the point of view of the network 1 with a disturbing non-linear/linear load 2.

Before installing such a device on an existing industrial site, it is sometimes necessary to demonstrate the qualities of the device to the owner of the site, who will decide whether or not to equip his site with the device.

It is therefore necessary to model the site in order to simulate its performance with and without the device, in order to appraise the contribution of the compensating device.

Conventionally, the modelling of industrial sites is done by producing a complete model containing all the machines as well as their controllers (based on electronic power converters) present across the area being studied.

However, this type of modelling faces two problems: those related to hardware and to the computer systems, which limit its adoption as a credible model for validating solutions applied to this type of electrical network.

Specifically, it is necessary in this case to have as many measurement apparatuses as controlled machines. In addition, it proves difficult to carry out a simulation of an industrial network with several voltage levels, containing several power transformers, many power lines and cables, and a plurality of machines controlled with several decontamination filters.

In this embodiment, a single measuring device is installed at the intake of each production line.

The modelling of the site is done by replacing the machines controlled by their currents (active, reactive and harmonic) measured by one of the three-phase measuring devices.

The simulation module is thereby greatly simplified because current sources, the number of which is limited by a maximum harmonic order theoretically set to 50, replace the controlled machines model.

It should be noted that a current source is always associated with a very high resistance (in the order of the MΩ) shunt-connected to the current source.

The model is then validated by comparing the results of the simulation with measurements made at the intakes of the production lines.

The model is finally used to simulate, with credibility, the effect of the compensating device 7 on the signal traveling through the loads of the industrial site and on the disturbance current circulating in the network 1.

In an embodiment, the system includes a plurality of renewable-energy-generating power units 100, for example of windpower or photovoltaic type, each one connected, directly or via a device 7, to a local network 28, itself connected to the network 1.

The local network 28 corresponds to the producing, consuming and consuming-producing stakeholders (of the self-consumption or positive-energy buildings).

Most of the time, each production unit 100 is connected to the local network 28 means of a compensating device 7 configured to maximize the power production of the production unit 100 as well as to prevent the propagation of the electrical disturbances, if any are present, on the upstream side of the compensating device 7 toward the local network 28 and of the electrical network 1.

Each compensating device 7 is connected, by computer systems, to a semi-decentralized management system 29, to which it communicates, in real time, information about the actual and predicted energy consumption and production of the production units 100.

Furthermore, the semi-decentralized management system 29 receives information in real time on the producible energy of the conventional (fossil fuel) energy production units 80, installed within the local network 28.

The semi-decentralized management system 29 manages the economic distribution of the conventional (fossil) energy generators within the local network 28, as a function of the total production from renewable sources as well as the total consumption within the same local network 28.

The semi-decentralized management system 29 receives in real time the information about the renewable- and conventional-source powers at any time over the local network 28.

The system also includes a plurality of consumption sources, for example a smart building or a smart industrial site, each consumption source being comparable from the point of view of the network to a non-linear/linear load 2; each of the consumption sources being connected to the local network 28, is equipped with a compensating device 7 configured to decontaminate the current circulating on the local network side 28 of the disturbances caused by the load 2 and to drive the activation of the different apparatuses of the consumption source via the decentralized management unit 70.

Each compensating device 7 is connected to the semi-decentralized management system 29, to which it communicates information concerning the instantaneous consumption and the future consumption as a function of the scheduled operation of the consumption sources, in such a way as to estimate the energy requirement.

Since the semi-decentralized management system 29 receives at all times all the data (actual and predicted) of the producible energy as well as those to be consumed by the different stakeholders of the local network (producing, consuming, consuming-producing), it can intervene, only as needed when the total energy requirement within the local network 28 is greater than the total production, on the drivers of the decentralized control units of the smart buildings 27 to tip the consumption mode into modulated mode (flat load curve) for the benefit of the overall system.

The term "consuming-producing source/stakeholder" is understood to mean a self-consumption or positive-energy building. The semi-decentralized management system 29 is therefore configured to estimate, over a given period, the total energy requirement of the local network 28 that it supervises.

According to the power production and energy requirement estimates, the semi-decentralized management system 29 is configured to carry out, in real time, the economical distribution of production to the conventional energy production units 80, intervene, only as needed when the total energy requirement within the local network 28 is greatly above the total production, on the decentralized control units 70, via the control units 12 of the devices 7, to tip the consumption mode into modulated mode (flat load curve).

drive, as a last resort and if there is a risk of production deficit, the circuit breaker 90 to allow energy consumption by the network 1. This operating mode is not possible when the local network is run as an island, i.e. not connected to the network 1.

The management system 29 is therefore authorized to prioritize the operation of certain consumption sources over others, in order to distribute the energy requirement over the given period.

In addition, the semi-decentralized management system 29 can distribute the power demand over time in such a way that, when a power coming from the network 1 is necessary, it is consumed during low-demand periods in such a way as to minimize the loading of the network 1 during demand peaks.

It should be noted that the maximization of the power of the renewable energy production units 100 as well as the optimization of the consumption, within a smart building 27, are provided locally by the devices 7 via the control units 12. The semi-decentralized management system 29 is thus called as it is used only to ensure the economical distribution of the production of the conventional energy production units 80 and to rectify the consumption as needed.

Following a study concerning the invention conducted by the inventors, the inventors desire to make the following comments.

Invention/Prior Art Comparison

1. General Structure of the Shunt Active Filter of the Prior Art

General Topology

FIG. 9 shows the general structure of the shunt active filter, which takes the form of two blocks: the power circuit and the control circuit. The power circuit is composed of:
- a voltage inverter based on power switches, with controllable firing and blocking (GTO, IGBT, . . . etc.), with antiparallel diodes,
- a capacitive energy storing circuit,
- an output filter.

The control circuit, meanwhile, is composed of:
- the method for identifying the disturbance currents,
- the system based on a PLL (Phase-Locked Loop) which is incorporated into the method for identifying the disturbance currents,
- the regulation of the DC voltage applied to the energy-storing elements,
- the control of the current injected into the network from the voltage inverter,
- the controller of the voltage inverter.

Output Filter

The output filter is a passive filter used to connect the voltage inverter to the electrical network. The output filter is dimensioned to satisfy the two following criteria:
- providing the dynamic response of the current $$\frac{d}{dt}\vec{I}_{h-L} = \frac{d}{dt}\vec{I}_{inj}$$

with $I_{h\_L}$ the harmonic current contained in the current of the load $I_L$ and $I_{inj}$ the current of the active filter injected into the network,
- preventing the components due to switching from propagating over the electrical network.

Two types of output filter can be used: a first-order output filter and a third-order output filter.

First-Order Filter

This type of filter is the most used in literature; it is composed of a simple inductance $L_f$ of almost negligible internal resistance.

A filter of this type does not make it possible to simultaneously satisfy the two dimensioning criteria of the output filter. Specifically, only a relatively low value of $L_f$ can produce a good dynamic response in the active filter by satisfying the equality relationship above.

Unfortunately, a low value of $L_f$ allows most of the components due to switching to propagate on the network side and consequently to affect the installations and electrical equipment.

Conversely, a relatively high value of $L_f$ will prevent these components from propagating over the electrical network but will affect the dynamic response of the active filter and will then degrade the compensation quality.

The proper dimensioning of the first-order output filter will therefore depend on the trade-off to be found between the dynamic response and the efficiency of the shunt active filter.

This trade-off is very difficult to strike without using an auxiliary passive filter installed at the output of the inverter or upstream on the network side.

However, this auxiliary filter can cause undesirable side-effects such as resonance with other passive elements installed on the electrical network.

It also gives rise to an active power consumption by its damping resistance.

In addition, the filtering quality of these auxiliary filters degrades over time because of the aging of their passive elements.

Third-Order Filter (LCL): Modelling in the s-Plane

The third-order output filter is an alternative to a heavy, bulky and expensive first-order filter, making it possible to dispense with the problems described in the case of the first-order output filter.

This output filter is composed of two inductances ($L_{f1}$, $L_{f2}$) of respective internal resistances ($R_{f1}$, $R_{f2}$) and a capacitance $C_f$ with a small damping resistance $R_f$ (voir la FIG. 10) that we will ignore in the remainder of the text.

It should be noted that ($L_s$, $R_s$ and $e_s$) respectively represent the inductance and the resistance as well as the electromotive force of the electrical network upstream.

This type of filter, owing to the additional degree of freedom, provided by the capacitance $C_f$, can fulfil the two dimensioning criteria of the output filter that we have previously described.

The equations that model the output filter are:

$$I_{inj} = \frac{B_1(s)}{A(s)}V_f(s) + \frac{B_2(s)}{A(s)}V_s(s) \quad \text{(Maths. 1)}$$

with $V_f$ the output voltage of the inverter, $B_1(s)/A(s)$ the transfer function of the output filter with the network corresponding to the original system (to be controlled) and $B_2(s)/A(s)$ the transfer function corresponding to the disturbance model.

These disturbances are caused by the voltage of the electrical network e(s) will no be considered equal to the connection voltage Vs for electrical networks with a high short-circuit power.

$$\begin{cases} A(s) = a_1 s^3 + a_2 s^2 + a_3 s + a_4 \\ B_1(s) = b_{11} s + b_{12} \\ B_2(s) = -(b_{21} s^2 + b_{22} s + b_{23}) \end{cases}$$

with $$a_1 = (L_s + L_{f2})L_{f1}C_f$$

$$a_2 = \begin{bmatrix} (L_s + L_{f2})R_{f1}C_f + (R_s + R_{f2})L_{f1}C_f \\ +(L_{f1} + L_s + L_{f2})R_f C_f \end{bmatrix}$$

-continued $$a_3 = \begin{bmatrix} (L_s + L_{f2}) + L_{f1} + (R_s + R_{f2})R_{f1}C_f \\ +(R_{f1} + R_s + R_{f2})R_f C_f \end{bmatrix}$$

$$a_4 = R_{f1} + R_s + R_{f2}$$

$$b_{11} = R_f C_f$$

$$b_{12} = 1$$

$$b_{21} = L_{f1} C_f$$

$$b_{22} = (R_f + R_{f1})C_f$$

$$b_{23} = 1$$

From the preceding relationships, if we neglect all the resistances (except for $R_f$), the following relationship, valid at frequencies greater than 50 Hz, can be established:

$$\frac{B_1(s)}{A(s)} = \frac{(R_f C_f)s + 1}{(L_{f1}L_{f2}C_f)s^3 + R_f C_f(L_{f1} + L_{f2})s^2 + (L_{f1} + L_{f2})s}$$

The resonant frequency fcp of the filter LCL, if in this case the resistance $R_f$ is also neglected, is given by the relationship:

$$f_{cp} = \frac{1}{2\pi\sqrt{\left(\frac{L_{f1}L_{f2}C_f}{L_{f1} + L_{f2}}\right)}}$$

The LCL output filter is dimensioned to reject the components due to the switching frequency of the inverter, which has been set to 16 kHz, to correspond to an industrial application situation of the kind proposed here.

Thus, a rejection of over −50 dB is obtained for a cut-off frequency of 1900 Hz.

This choice has made it possible to properly attenuate the high-frequency components, as shown in the diagram of the gain of the output filter as a function of the frequency from FIG. 11.

Third-Order Filter (LCL): State Space Modelling

Based on the Laplace representation (Maths. 1), the representation of the LCL filter in the state space can be given by the following equations:

$$\frac{dv_c}{dt} = \frac{i_f - i_{inj}}{C_f} \quad \text{(Maths. 2)}$$

$$\frac{di_f}{dt} = \frac{1}{L_{f1}}(v_f - v_c - R_f(i_f - i_{inj}) - R_{f1}i_f)$$

$$\frac{di_{inj}}{dt} = \frac{1}{L_{f2}}(v_c + R_f(i_f - i_{inj}) - v_s - R_{f2}i_{inj})$$

The vector-matrix representation is given by:

$$\dot{x} = Ax + Bv_f + Pv_s \quad \text{(Maths. 3)}$$

with $$A = \begin{bmatrix} -\frac{R_{f1} + R_f}{L_{f1}} & \frac{R_f}{L_{f1}} & -\frac{1}{L_{f1}} \\ \frac{R_f}{L_{f2}} & -\frac{R_{f2} + R_f}{L_{f2}} & \frac{1}{L_{f2}} \\ \frac{1}{C_f} & -\frac{1}{C_f} & 0 \end{bmatrix},$$

$$B = \begin{bmatrix} \frac{1}{L_{f1}} \\ 0 \\ 0 \end{bmatrix}, P = \begin{bmatrix} 0 \\ -\frac{1}{L_{f2}} \\ 0 \end{bmatrix} x = \begin{bmatrix} i_f \\ i_{inj} \\ v_c \end{bmatrix}$$

2. Linear Control by RST of the Voltage Inverter of the Prior Art Connected to the Network Via the LCL Filter RST Controller The control strategy is based on the estimation of the current disturbances by means of an identifying algorithm. Next, the voltage inverter, controlled by the PWM (Pulse Width Modulation) controller, generates the currents injected into the network $I_{inj}$, which must track the identified reference currents $I_{ref}$ ($I_{inj} \rightarrow I_{ref}$). The control loop thus closed is designed to provide high-accuracy tracking.

The general diagram of the current-controlling system is shown in FIG. 12. In this diagram, the voltage inverter (controlled by the PWM) is connected to the electrical network via an LCL filter, with a controller of RST type, and the instantaneous or other power method for identifying the current disturbances. A phase-locked loop (PLL) is used to extract the positive component of the voltage from the network ($V_d$), in order to produce the desired performance of the identifying algorithm used.

The voltage of the network Vs here represents an external disturbance, the effects of which are compensated by adding the same network voltage to the control signal (u). This will prevent the reactive fundamental current from passing from the network to the active filter via the inductances of the LCL filter.

From the equation (1) and by using an RST controller, we obtain:

$$I_{inj}(s) = \frac{(TB_1)(s)}{(SA + RB_1)(s)} I_{ref}(s) + \frac{(SB_2)(s)}{(SA + RB_1)(s)} V_s(s)$$

With R(s), T(s) and S(s) the polynomials of the controller.

The order of R(s) and S(s) is the same as the order of the LCL system $$\left(\frac{B_1(s)}{A(s)}\right)$$

therefore the polynomials R(s) and S(s) are of third order. The polynomial T(s) is chosen such that $$\frac{I_{ref}(s)}{I_{inj}(s)} = 1$$

for the whole frequency band (50-2500 Hz) included in the reference signal $I_{ref}$; T(s) can be a simple gain in this case.

It should be noted that $$\frac{R(s)}{S(s)}$$

represents the transfer function of the RST controller; the common denominator D(s)=(S A+R B$_1$)(s), named arbitrary stability polynomial, contains the poles of the closed loop. These poles are placed in a sector of the (2×45°), to provide a damping of 0.7.

Finally, the poles of the control loop are placed in order to provide a quick and accurate response, with a good rejection of disturbances. It should be noted that the values of the poles are limited by the cut-off frequency in a closed loop.

Effect of the Phase Difference

RST controllers, and all linear controllers, can be used when the references to be tracked are composed of constant signals or signals at a single and relatively low frequency (the case of compensation of the reactive power or the unbalance at the fundamental frequency of 50 Hz). At this frequency, the phase difference between the identified references (I$_{ref}$) and the output of the closed loop injected (I$_{inj}$) is acceptable. On the other hand, if the reference to be tracked is composed of signals with several frequencies, the phase difference is no longer negligible. This is because the phase difference increases with the frequency. The effect of the phase difference of the structure shown in FIG. 12 is given in FIG. 13. From this figure, it can be seen that the disturbed current (I$_{Load}$) is not properly compensated (I$_{real}$: compensation with phase difference), with respect to the ideal shape (I$_{ideal}$: compensation without phase difference).

The transfer function of the control loop with the RST I$_{inj}$(s)/I$_{ref}$(s) is given in FIG. 14.

The gain and the phase of the closed-loop transfer function I$_{inj}$(s)/I$_{ref}$(s) are given via Table I, for multiples of the fundamental frequency ranging from 50 Hz to (23×50) Hz. It should be noted that the frequency was limited to 1150 Hz here since the electrical networks self-filter high-order harmonic currents via their inductance.

Table. I. Gain and phase of the closed-loop transfer function with RST

TABLE I

Gain and phase of the closed-loop transfer function with RST

| | | F (Hz) | | | | | | | |
|---|---|---|---|---|---|---|---|---|---|
| | | 50 | 250 | 350 | 550 | 650 | 850 | 950 | 1150 |
| RST | G | 1 | 1 | 1 | 1 | 0.99 | 0.98 | 0.98 | 0.97 |
| | PH° | −1 | −8 | −11 | −18 | −21 | −27 | −30 | −37 |

Figure 4:
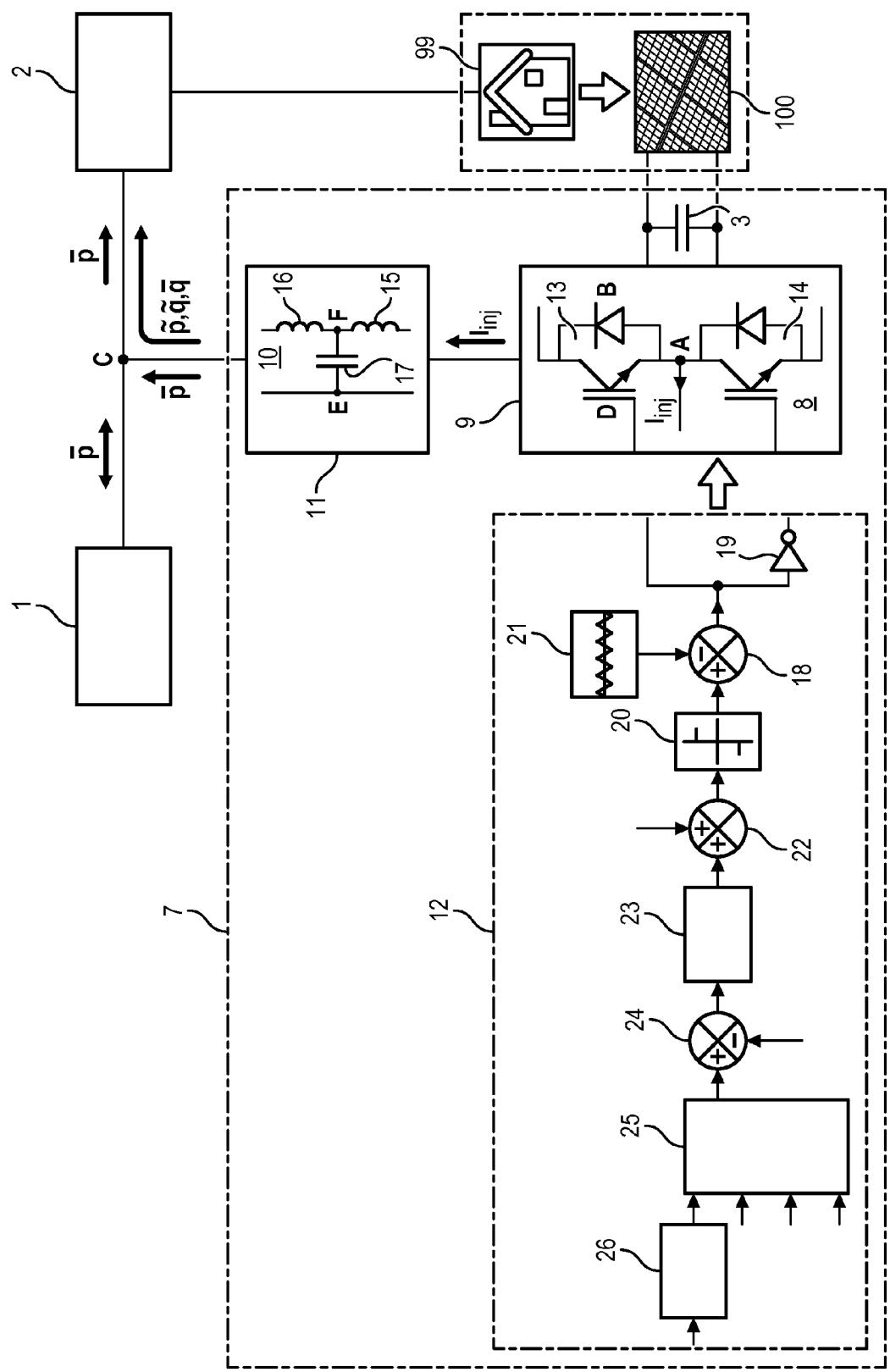
FIG. 4 is a diagram showing an electrical system according to the invention, wherein the compensating device is inserted, in shunt configuration, between a renewable energy production unit, within a self-consumption building, and the network/loads assembly.
Figure 5:
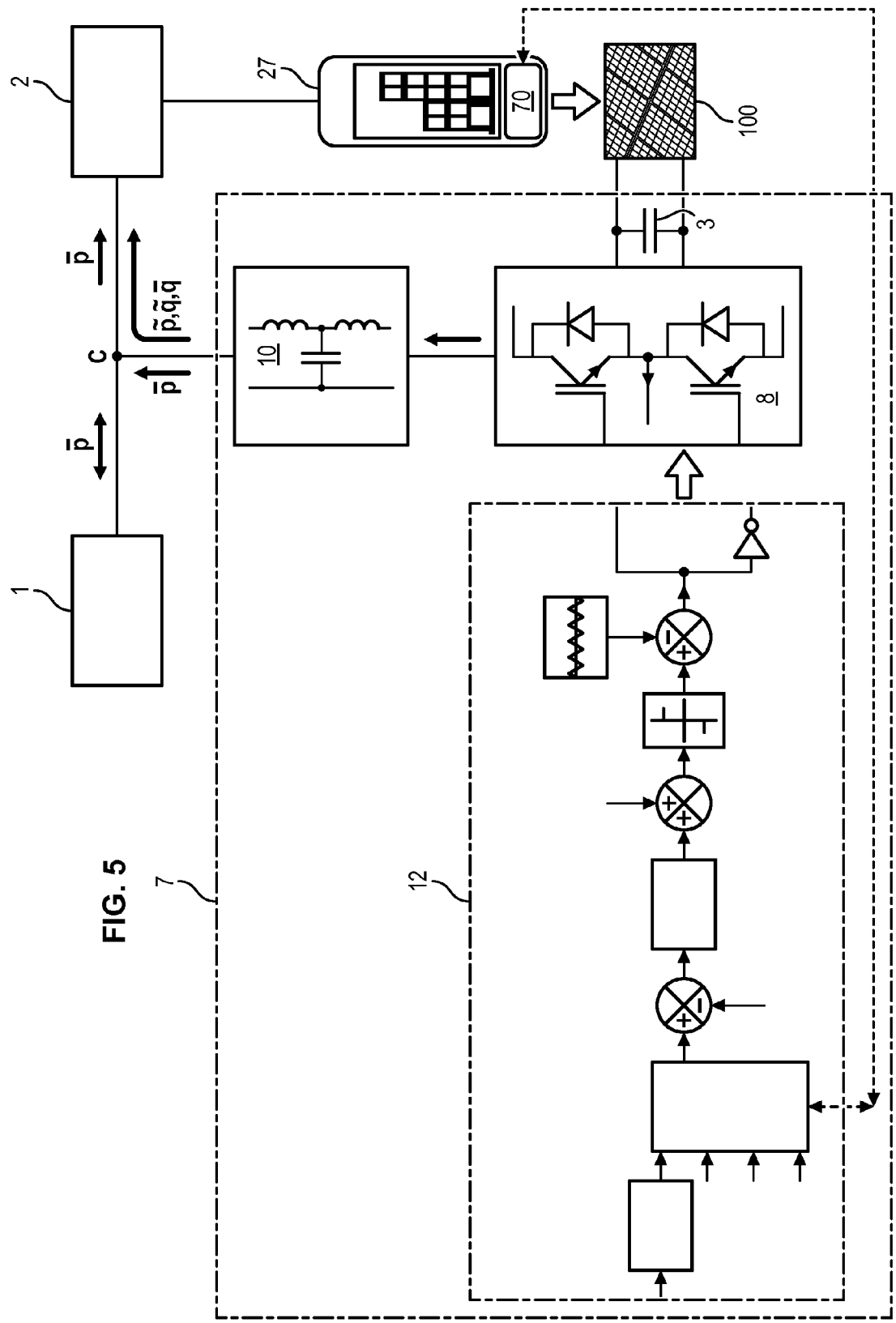
FIG. 5 is a diagram showing an electrical system according to an embodiment of the invention, wherein the system is connected to a smart building.
Figure 6:
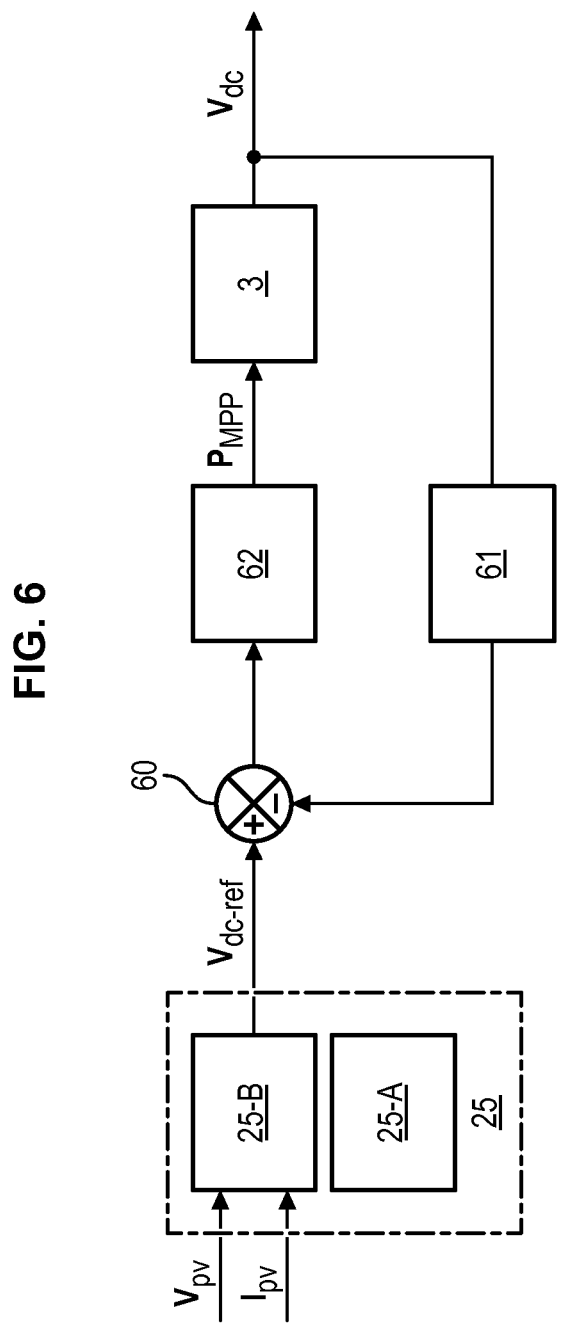
FIG. 6 shows the loop for regulating the capacitive storing element in the aim, among other things, of extracting the maximum active power from the renewable-energy-generating power unit.
Figure 7:
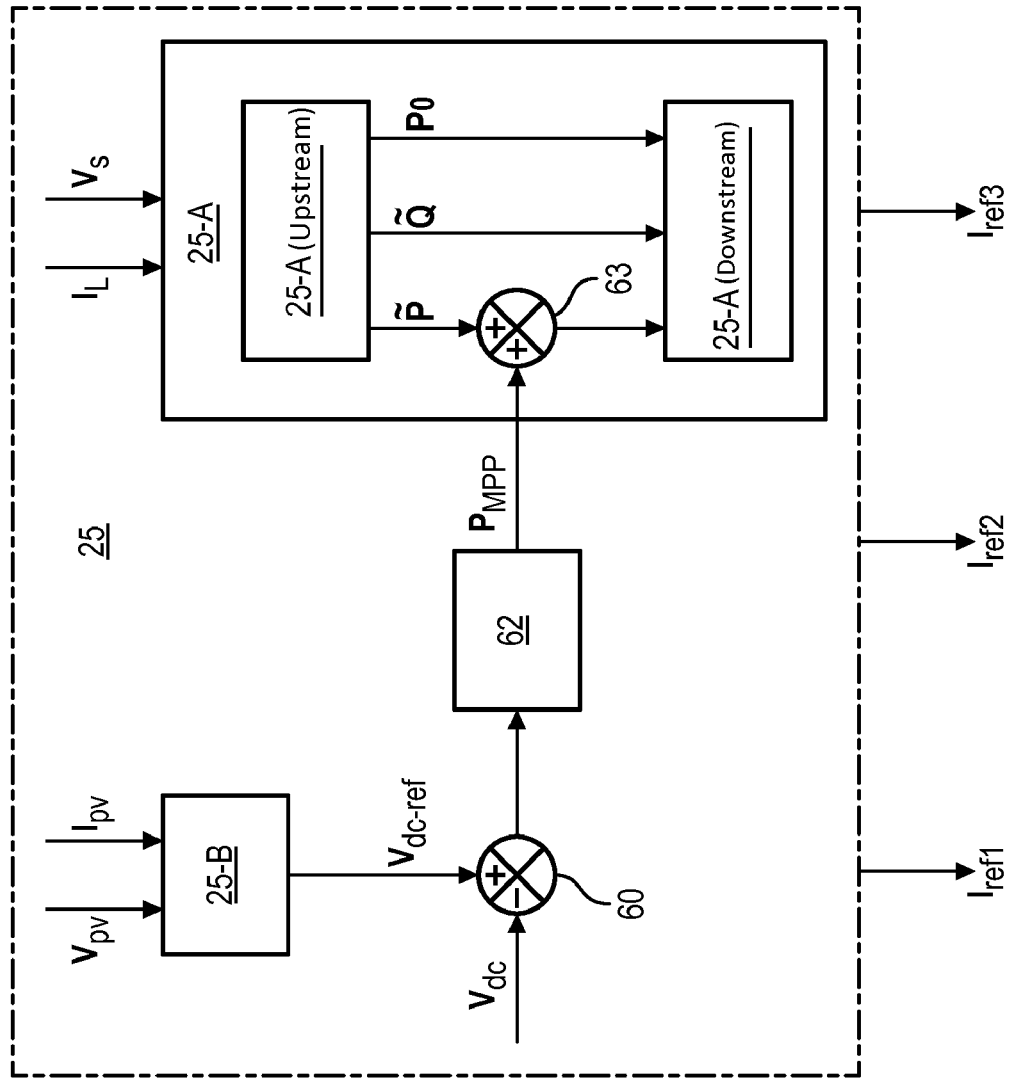
FIG. 7 shows the integration of the method for computing this maximum active power in the algorithm for identifying/computing the non-active currents (harmonic, reactive and unbalanced etc.)

It should be noted that the RST linear controller provides a unit gain (0 dB) for practically the whole frequency band (50-2500 Hz: see FIG. 4). In addition, the RST is used solely to compensate the unbalanced and/or reactive currents at the fundamental frequency.

Specifically, at this frequency, a phase difference of (−1°) is negligible. After this frequency, the phase difference is no longer negligible, and the shunt active filter cannot compensate the harmonic currents.

3. Non-Linear Control (by Sliding Mode-of First Order) of the Voltage Inverter According to the Invention Connected to the Network Via the LCL Filter In most cases, the control laws, designed to control the voltage inverters which are connected to the electrical network via an LCL filter, were originally established for renewable energy systems (photovoltaic and windpower). In this case, provision can be made for linear controllers since the inverter has only fundamental components (an active power) to inject into the network: the phase difference being negligible in this case.

However, in the case of a shunt active filter, the inverter must inject into the electrical network fundamental components (reactive and unbalanced) and harmonics at the same time, which means having total control over a very wide passband of frequencies. It should be noted that a considerable phase difference limits the applicability of linear controllers in the case of harmonic filtering.

The alternative for overcoming this phase difference problem, encountered when using an LCL filter associated with a linear controller, is non-linear control. In this invention, we are using the SMC (Sliding Mode Control) method to provide the desired dynamic response, a strong robustness/insensitivity to bounded disturbances as well as good control properties under a wide range of operating conditions.

However, it is well known that a conventional SMC controller generates a control signal, from the switches of the inverter, at very high frequency, in order to provide finite-time convergence on the sliding surface wherein the states of the system are maintained for the remaining time, even in the presence of bounded disturbances. In practice, the voltage inverter is controlled by a limited/fixed frequency switching function. Thus, variable switching at very high frequency, if it occurs, could cause overheating that can result in the destruction of the inverter.

Consequently, a conventional continuous-control SMC (with Sign function) is used. Specifically, in order to avoid discontinuous control (variable switching of the inverter at very high frequencies), caused by conventional SMC, the choice was made to use two controllers per sliding mode. One is associated with a sign function approximated to a sigmoid function and the other is with a method that will be called AIRD (an Artificial Increase Relative Degree, followed by an integrator). Finally, the control of the active filter generated by the continuous SMCs will be modulated by a PWM, in order to allow the active filter to operate at a fixed switching frequency, adapted, on one side, to the nominal operation of the electronic power components of the inverter and easy, on the other, to filter out by the LCL, which facilitates, inter alia, the blocking of the high-frequency components by the LCL filter.

Design of a Conventional Sliding Mode Controller

Let us consider the system (3) with: y:=i$_{inj}$ representing the input, u:=v$_f$ of the control signal and w:=v$_s$ disturbances, and for R$_f$=0, the equation (3) becomes:

$$\dot{x}=Ax+Bu+Pw, y=Cx, C=[0\ 1\ 0] \qquad \text{(Maths. 4)}$$

with $$A = \begin{bmatrix} -\frac{R_{f1}}{L_{f1}} & 0 & -\frac{1}{L_{f1}} \\ 0 & -\frac{R_{f2}}{L_{f2}} & \frac{1}{L_{f2}} \\ \frac{1}{C_f} & -\frac{1}{C_f} & 0 \end{bmatrix}, B = \begin{bmatrix} \frac{1}{L_{f1}} \\ 0 \\ 0 \end{bmatrix}, P = \begin{bmatrix} 0 \\ -\frac{1}{L_{f2}} \\ 0 \end{bmatrix}$$

It is clear that the relative degree of the system (4) is r=3, since CB=CAB=0 and $$CA^2B = \frac{1}{(L_{f1}L_{f2}C_f)},$$

so a sliding variable is chosen of the form:

$$\mathbb{S} = K_0 e + K_1 \dot{e} + K_2 \ddot{e} \quad \text{(Maths. 5)}$$

with $e = i_{inj} - i_{ref}$. It should be noted that $\dot{e}$, $\ddot{e}$ are obtained using a higher-order sliding mode differentiator.

The positive coefficients $K_0$, $K_1$ and $K_2$ of equation 5 are selected to make the system (Maths. 4) exponentially stable with the desired convergence rate, in the sliding mode defined by $\mathbb{S} = 0$.

To design an SMC controller that derives $\mathbb{S} \to 0$ in finite time and which keeps the states of the system (Maths. 4) inside a sliding surface $\mathbb{S} = 0$ for the entire remaining time, the dynamics of the sliding variable are derived:

$$\dot{\mathbb{S}} = F\left(\frac{di_{ref}}{dt}, \frac{d^2i_{ref}}{dt^2}, v_s, \frac{dv_s}{dt}, \frac{d^2v_s}{dt^2}, i_{inj}, i_f, v_c\right) + \left(\frac{K_2}{L_{f1}L_{f2}C_f}\right)u \quad \text{(Maths. 6)}$$

with $$F\left(\frac{di_{ref}}{dt}, \frac{d^2i_{ref}}{dt^2}, v_s, \frac{dv_s}{dt}, \frac{d^2v_s}{dt^2}, i_{inj}, i_f, v_c\right) = K_0\dot{e} + K_1\ddot{e} - \quad \text{(Maths. 7)}$$

$$K_2\left\{\frac{d^3i_{ref}}{dt^3} + \left(-\left[\left(\frac{R_{f2}}{L_{f2}}\right)^2 - \frac{1}{L_{f2}C_f}\right]\left(\frac{R_{f2}}{L_{f2}}\right) + \frac{R_{f2}}{L_{f2}^2C_f}\right)i_{inj} - \right.$$

$$\left(\frac{R_{f2}}{L_{f2}^2 C_f} + \frac{R_{f1}}{L_{f1}L_{f2}C_f}\right)i_f +$$

$$\left(\left[\left(\frac{R_{f2}}{L_{f2}}\right)^2 \frac{1}{L_{f2}} - \frac{1}{L_{f2}^2 C_f}\right] - \frac{1}{L_{f1}L_{f2}C_f}\right)v_c -$$

$$\left(\left[\left(\frac{R_{f2}}{L_{f2}}\right)^2 - \frac{1}{L_{f2}C_f}\right]\frac{1}{L_{f2}}\right)v_s +$$

$$\left.\left(\frac{R_{f2}}{L_{f2}}\right)\frac{dv_s}{dt} - \left(\frac{1}{L_{f2}}\right)\frac{d^2v_s}{dt^2}\right\}$$

It is supposed that:
the disturbance $V_s$ with its two first derivatives $$\frac{dv_s}{dt}, \frac{d^2v_s}{dt^2} \text{ and } \frac{d^3i_{ref}}{dt^3}$$

are bounded,
the two first derivatives of the tracking error $\dot{e}$, $\ddot{e}$ and the variables $i_{inj}$, $i_f$, $v_c$ are bounded in a reasonable state domain, which includes the operating point.
Then, there exists $\eta > 0$ such that $$\left|F\left(\frac{di_{ref}}{dt}, \frac{d^2i_{ref}}{dt^2}, \frac{d^3i_{ref}}{dt^3}, v_s, \frac{dv_s}{dt}, \frac{d^2v_s}{dt^2}, i_f, i_{inj}, v_c\right)\right| \leq \eta,$$

The condition of existence of a sliding mode $\mathbb{S} \cdot \dot{\mathbb{S}} < 0$ can be easily fulfilled by the SMC $$u := v_f - \lambda \, \text{sign}(\mathbb{S}) \quad \text{(Maths. 8)}$$

with u the control signal applied, via the PWM, to the inverter, $\lambda$ is set and defined by the saturation limiting block at 420V (see FIG. 12). Then, the action of the control on $\mathbb{S}$ is proportional to $$\frac{K_2}{L_{f1}L_{f2}C_f}u,$$

which explains the choice of $K_0$, $K_1$ and $K_2$ in (7):

$$K_0 = 306000000, K_1 = 35000 \text{ and } K_2 = 1$$

In this context, it is important to indicate that the Sign function in (Maths. 8) has been approximated to a Sigmoid function sign $$\mathbb{S} = \frac{\mathbb{S}}{|\mathbb{S}| + \varepsilon}$$

with $\varepsilon = 2 \times 10^8$

SMC with Artificial Increase of Relative Degree (AIRD)
The system (Maths. 4) is extended as follows:

$$x_4 = u, \dot{x}_4 = v$$

with v the new control, the system, in this case, becomes $$\dot{x} = A_e x + B_e v + P_e w, \, y = C_e x, \, C_e = [\,0\ 1\ 0\ 0\,] \quad \text{(Maths. 9)}$$

and $A_e = \begin{bmatrix} -\frac{R_{f1}}{L_{f1}} & 0 & -\frac{1}{L_{f1}} & \frac{1}{L_{f1}} \\ 0 & -\frac{R_{f2}}{L_{f2}} & \frac{1}{L_{f2}} & 0 \\ \frac{1}{C_f} & -\frac{1}{C_f} & 0 & 0 \\ 0 & 0 & 0 & 0 \end{bmatrix}$, $$B_e = \begin{bmatrix} 0 \\ 0 \\ 0 \\ 1 \end{bmatrix}, P_e = \begin{bmatrix} 0 \\ -\frac{1}{L_{f2}} \\ 0 \\ 0 \end{bmatrix}$$

Given that the relative degree r=4 of the system (9), the sliding variable is chosen of the form:

$$\mathbb{S}_e = K_0 e + K_1 \dot{e} + K_2 \ddot{e} + K_3 \mathbb{S} \quad \text{(Maths. 10)}$$

with $e = i_{inj} - i_{ref}$
The derivative with respect to time of the sliding surface (Maths. 10) gives:

$$\dot{\mathbb{S}}_e = K_0 \dot{e} + K_1 \ddot{e} + K_2 \dddot{e} + \quad \text{(Maths. 11)}$$

$$K_3 F\left(i_f, i_{inj}, v_c, \frac{d^4 i_{ref}}{dt^4}\right) + K_3\left(\frac{1}{L_{f1}L_{f2}C_f}\right)v$$

with $$F = \frac{-d^4 i_{ref}}{dt^4} - \left(\frac{R_{f1}}{L_{f1}L_{f2}C_f} + \frac{R_{f2}}{L_{f2}^2 C_f}\right)\frac{di_f}{dt} + \\ \left[-\left(\left(\frac{R_{f2}}{L_{f2}}\right)^2 - \frac{1}{L_{f2}C_f}\right)\frac{R_{f2}}{L_{f2}} + \frac{R_{f2}}{L_{f2}^2 C_f}\right]\frac{di_{inj}}{dt} - \\ \left[\left(\left(\frac{R_{f2}}{L_{f2}}\right)^2 - \frac{1}{L_{f2}C_f}\right)\frac{1}{L_{f2}} - \frac{1}{L_{f1}L_{f2}C_f}\right]\frac{dv_c}{dt} - \\ \left[\left(\left(\frac{R_{f2}}{L_{f2}}\right)^2 - \frac{1}{L_{f2}C_f}\right)\frac{1}{L_{f2}}\right]\frac{dv_s}{dt} + \\ \left(\frac{R_{f2}}{L_{f2}^2}\right)\frac{d^2 v_s}{dt^2} - \left(\frac{1}{L_{f2}}\right)\frac{d^3 v_s}{dt^3}$$ (Maths 12)

It should be noted that $\dot{e}$, $\ddot{e}$ and $\mathbb{S}$ (in Maths 11) are obtained using a higher-order sliding mode differentiator.

The positive coefficients $K_0$, $K_1$, $K_2$ and $K_3$ are selected, in this case also, to provide an exponential dynamic stability for the system (Maths. 9) with the desired convergence rate in the sliding mode defined by $\mathbb{S}_e = 0$.

It is supposed, in this case, that all the disturbances and their derivatives, all the derivatives of the tracking error and all the state variables of the system are bounded in a reasonable state domain, which includes the operating point.

Then, there exists $\eta_1 > 0$ such that $|\dot{\mathbb{S}}_e|_{v=0} \leq \eta_1$ and the condition of existence of a sliding mode $\mathbb{S} \cdot \dot{\mathbb{S}} < 0$ for $\mathbb{S}_e \neq 0$ can be easily fulfilled by the SMC $$v := \lambda \, \text{sign}(\mathbb{S}_e)$$ (Maths. 13)

where the value of $\lambda = 10^7$ is chosen to limit the effect of the disturbances caused by the additional derivative coming from the artificial increase of relative degree.

Finally, a continuous control signal $u = \int v \, dt$ is generated and limited by the saturation block to 420V (see FIG. 12). This is reflected in the diagram of FIG. 3 by an integrator at the output of the SMC controller. It should be noted that $\dot{\mathbb{S}}_e$ is proportional to $$\frac{K_3}{L_{f1}L_{f2}C_f} v,$$

which explains the choice of $K_0$, $K_1$, $K_2$ and $K_3$ in (Maths 11):

$$K_0 = 1.7576 \, e+13, \; K_1 = 2.0280 \, e+09 \text{ and } K_2 = 78000 \text{ and } K_3 = 1$$

4. Non-Linear Control (by Higher-Order Sliding Mode) of the Voltage Inverter According to the Invention Connected to the Network Via the LCL Filter In this invention, the use of modulated higher-order sliding mode control algorithms: followed by Pulse Width Modulation (PWM), guaranteeing a predefined switching frequency for the controlling of the components of the voltage inverter associated with the LCL filter, is proposed for the first time.

It should be noted that the document [D2: ALALI MHD A E ET AL: "A Lyapunov approach based higher order sliding mode controller for grid connected shunt active compensators with a LCL filter", 2017 19TH EUROPEAN CONFERENCE ON POWER ELECTRONICS AND APPLICATIONS (EPE'17 ECCE EUROPE)] proposes a higher-order Lyapunov control in which continuity of the controller is not provided: the control is discontinuous (see FIG. 16), as described on page 7 of this publication.

In addition, this control is impossible to implement, because of its discontinuity and also its dependence on disturbances caused, inter alia, by the habitually disturbed network voltage, especially in industrial areas.

It should be noted that the Lyapunov control approach is adapted to systems that process constant signals (with a frequency equal to zero) in a healthy environment (free of disturbances). Specifically, addressing the problem of harmonics (with a frequency band including 50-2500 Hz) in a disturbed environment (electrical networks in general and especially industrial areas) while providing stability of the active filter, renders the control delivered by this control approach discontinuous.

In this invention and for the first time, three continuous sliding mode control algorithms of second order and higher order are used. This involves the 2-SMC Twisting and 2-SMC super-Twisting second-order sliding mode control algorithm and also the C-HOSM continuous higher-order sliding mode control algorithm.

These controllers supply, within a wide range of operating conditions, a desired dynamic response of the system in sliding mode, a strong insensitivity to the corresponding bounded disturbances and an improved stabilization accuracy. It should be noted that these algorithms, C-HOSM and 2-SMC Twisting and Super-Twisting, supply finite-time convergence on the sliding surface.

Therefore, the control unit 12 can thus include at least one of the three following higher-order sliding mode controllers:
- the first is based on a C-HOSMC continuous higher-order sliding mode controller, with a first-order adaptive sliding surface, associated with three Sign functions, including two acting directly on the control signal as well as the third acting on the part of the control signal related to the disturbances,
- the second uses a 2-SMC Twisting controller with artificial increase of relative degree, with a second-order adaptive sliding surface, followed by an integrator, associated with two Sign functions, acting on the derivative of the control respectively via the sliding surface and its derivative,
- the third is a 2-SMC Super-Twisting controller with a second-order adaptive sliding surface, without artificial increase of relative degree, associated with a Sign function, acting directly and by its integral term on the control.

Design of the C-HOSM Controller

The C-HOSM control algorithm can control systems with an arbitrary relative degree. Here, the sliding variable is selected as follows:

$$\mathbb{S} = \dot{e} + ce$$ (Maths. 14)

The relative degree is r=2 in accordance with the equation. (Maths. 4).

The origin of the equation (Maths. 14) is as follows. In a noisy measurement environment, the sliding variable $\mathbb{s}$ will converge on a domain, the size of which is proportional to the amplitude of the noise w(t) of the measurement $\mathbb{s}$. Consequently, the real sliding mode $\mathbb{s} = \dot{e} + c \, e = w(t)$ and the effect of the noise on the tracking error e is attenuated owing to a low-pass filter of a cut-off frequency equal to c (in our case, $c=10^4$).

The dynamic response of the input-output sliding variable S is computed in accordance with the equations. (Maths. 4), (Maths. 14)

$$\ddot{\mathbb{S}} = v + f(x,t) \quad \text{(Maths. 15)}$$

The control law of the C-HOSM algorithm is designed as follows:

$$v = v_1 - v_2 \quad \text{(Maths. 16)}$$

where:

$$v_1 = -\gamma_1 \lceil \mathbb{S} \rceil^{\alpha_1} - \gamma_2 \lceil \dot{\mathbb{S}} \rceil^{\alpha_2}$$

where $\lceil \mathbb{S} \rceil^{\alpha_1} = |\mathbb{S}|^{\alpha_1} \text{sign}(\mathbb{S})$ (Maths. 17)

With:
$\gamma_1, \gamma_2 > 0$ selected so that the polynomial $p^2 + \gamma_2 p + \gamma_1$ is Hurwitz, with a desired pole placement,
$(\alpha_1, \alpha_2)$ computed such that $$\alpha_1 = \frac{\alpha}{2-\alpha}, \alpha_2 = \alpha, \alpha \in (0, 1)$$

if $\alpha = 1/2$ therefore, $$\alpha_1 = \frac{1}{3}, \alpha_2 = 1/2$$

$v_2$ is chosen for a disturbance rejection such that:

$$v_2 = -\omega \quad \text{(Maths. 18)}$$

where:

$$\dot{\omega} = -\beta \, \text{Sign}(\sigma) - d/dt(\lambda \lceil \sigma \rceil^{1/2}) \Rightarrow \omega = -\beta \int_0^t \text{Sign}(\sigma) dt - \lambda \lceil \sigma \rceil^{1/2}$$

and $\sigma = \dot{\mathbb{S}} - \int_0^t v_1 dt$ (Maths. 19)

It should be noted that the control law in (Maths. 16)-(Maths. 19):
makes $\mathbb{s}, \dot{\mathbb{S}}$ tend to zero in finite time,
is continuous and
consequently, is a second-order continuous sliding mode controller (C-HOSM), knowing that the continuity of this control is provided without artificial increase of relative degree.

Computation of $\gamma_1, \gamma_2$: They are computed as coefficients of a second-order polynomial; the eigenvalues of this polynomial are chosen to provide a given transient response while being limited by the switching frequency of the voltage inverter, imposed by the carrier of the PWM.

Computation of $\lambda, \beta$: They are computed as follows:

$$\lambda = 1.5\sqrt{L}, \beta = 1.1L \quad \text{(Maths. 20)}$$

In this case, L is equal to $3 \times 10^{18}$

Finally, the control signal u applied to the components of the inverter is given:

$$u = ((L_s + L_{f2}) L_{f1} C_f) v$$

with $(L_s + L_{f2}) L_{f1} C_f = a_1$ of the transfer function $B_1(s)/A(s)$ of (Maths. 1).

Design of the 2-SMC Twisting Controller
The sliding variable is chosen such that:

$$\mathbb{S} = \gamma_1 e + \gamma_2 \dot{e} + \ddot{e}, \gamma_1, \gamma_2 > 0 \quad \text{(Maths. 21)}$$

Then, $\dot{\mathbb{S}} = v + \varphi$ where $\varphi(x, t)$ represents the cumulative disturbances of the system shown by (Maths. 4). Deriving the derivative of the sliding variable $\dot{\mathbb{S}}$ gives:

$$\ddot{\mathbb{S}} = \dot{v} + \dot{\varphi} \quad \text{(Maths. 22)}$$

with $\dot{\varphi}$ supposed to be bounded in a reasonable state field of the system given by (Maths. 4).

The 2-SMC Twisting control, which makes $\mathbb{S}, \dot{\mathbb{S}}$ tend to zero in finite time, is designed as a function of the derivative of the control signal v:

$$\dot{v} = -\alpha(\beta \, \text{sign}(\mathbb{S}) + \text{sign}(\dot{\mathbb{S}})) \quad \text{(Maths. 23)}$$

Computation of $\gamma_1, \gamma_2$: They are selected as coefficients of a Hurwitz polynomial; the eigenvalues of this polynomial are chosen as a function of this criterion, while being limited by the switching frequency of the voltage inverter, imposed by the carrier of the PWM.

Computation of $\alpha, \beta$: with $\alpha, \beta > 0$; They are respectively equal to $10^8$, 0.6. They are chosen to provide a rapid response as well as an acceptable reduction of the very high switching frequency.

Finally, the control signal applied to the components of the voltage inverter is $$u = \int_0^t v dt \quad \text{(Maths. 24)}$$

It should be noted that the control signal u in (24) is continuous, whereas $\dot{v}$ has a very high-frequency (discontinuous) control.

Design of the 2-SMC Super-Twisting Controller
The sliding variable is chosen such that:

$$\mathbb{S} = \gamma_1 e + \gamma_2 \dot{e} + \ddot{e}, \gamma_1, \gamma_2 > 0 \quad \text{(Maths. 25)}$$

Then:

$$\dot{\mathbb{S}} = u + f(x,t) \quad \text{(Maths. 26)}$$

with f(x, t) representing the cumulative disturbances of the system, shown in (Maths. 4), the derivative of which is supposed to be bounded.

The 2-SMC Super-Twisting control, which makes $\mathbb{S}, \dot{\mathbb{S}}$ tend to zero in finite time is designed such that:

$$u = -\lambda \lceil \mathbb{S} \rceil^{1/2} - v \quad \text{(Maths. 27)}$$

with $$\dot{v} = -\beta \, \text{Sign}(\mathbb{S}) \text{ and } v = -\beta \int_0^t \text{sign}(\mathbb{S}) dt \quad \text{(Maths. 28)}$$

Computation of $\gamma_1, \gamma_2$: As in the two preceding cases, these parameters are computed as coefficients of a second-order Hurwitz polynomial, consequently the eigenvalues of this polynomial are chosen to provide a rapid response, while being limited by the switching frequency of the voltage inverter, imposed by the carrier of the PWM.

Computation of $\lambda, \beta$: They are chosen as follows:

$$\lambda = 1.5\sqrt{L}, \beta = 1.1L \quad \text{(Maths. 29)}$$

With a value of L high enough that $\dot{f}(x, t) \leq L$, L being in our case equal to $1 \times 10^7$. It should be noted that the Super-Twisting control law (Maths. 27)-(Maths. 29) generates continuous control.

Simulation Results of the Inverter Controlled According to the Invention
Results of the Simulation with Matlab-Simulink
First-Order Continuous SMC Controllers
The simulations were carried out, firstly, via a simple Simulink scheme. In this scheme, the identified reference harmonic currents $I_{ref}$ are modelled by current sources of order 5, 7, 11, 13, 17 and 19, which represent the same harmonic spectrum of the current that will be analyzed via a case study below. The simulations were carried out first using the conventional SMC then the SMC with sigmoid function and finally with the SMC combined with the AIRD algorithm.

FIG. 15 plots the single-phase currents $I_{ref}$, $I_{inj}$ (identified and injected respectively) along with the inverter control signal u. It can be seen that very accurate tracking is provided by the discontinuous control (with variable and very high frequency) of the conventional SMC as well as by a continuous control signal (with a switching frequency set by the PWM) of the AIRD algorithm. However, the SMC with sigmoid function method provides slightly degraded but largely acceptable tracking.

Higher-Order SMC Controllers

The simulations were carried out, for the same characteristics of the preceding case, this time using first the conventional SMC then, and in order C-HOSM, 2-SMC Twisting, 2-SMC Super-Twisting and finally the Lyapunov approach of the document D2.

FIG. 16 plots the single-phase currents $I_{ref}$, $I_{inj}$ (identified and injected respectively) as well as the inverter control signal u. It can be seen that very accurate tracking is provided by the five controllers, with a discontinuous control signal for the conventional SMC and for the Lyapunov approach, whereas the three higher-order SMC controllers provide continuous control.

Results of the Simulation with Matlab®-Simulink®-Simscape Power System® (Case Study)

This is at the Melaiece textile factory located in the industrial area of Sheikh Najjar, in Aleppo, in Syria; the electrical network of the factory is given in FIG. 17.

The production line of this factory contains 56 asynchronous motors including 40 controlled by power inverters and with a nominal power varying between 0.25 and 75 kW. The power factor of the factory is of 0.76 without compensation of the reactive power, then goes back up to 0.98 with compensation via banks of controlled capacitor batteries.

Modelling of Low-Voltage Networks

Given the large number of machines controlled in an industrial site (40 in this case), it becomes difficult, or even impossible, to model the electrical networks of these installations.

A first restriction is hardware-related. Specifically, there need to be as many measuring apparatuses as there are controlled machines (40 in this case: these are energy quality analysis devices, shown in FIG. 18).

In addition, it proves difficult to carry out a simulation of an industrial network at several voltage levels, containing several power transformers with long power cables and lines, as well as dozens of machines controlled and combined with several active decontamination filters.

The idea here is to replace the machines controlled by their currents (active, reactive and harmonics) delivered by the analysis devices.

In this case, an analyzing device will be installed at the intake of each production line, so only one measuring apparatus per production line instead of one measuring apparatus per machine.

From the point of view of the computer systems, the simulation scheme is no longer burdensome since current sources, the number of which is limited by a maximum harmonic order, theoretically set to 50, will replace the model of dozens of controlled machines.

It should be noted that a current source is always associated with a very high shunt-connected resistance (of a few MΩ).

FIG. 19 shows the three-phase current sources, which model the overall energy consumption of the production line of the factory being studied: the fundamental current of the phase Ph1 is 578 A, with a power factor of FP=0.76, lagging.

The direction of passing of the currents is chosen according to the convention of the direction of travel of the powers through an electrical network: the harmonic currents are disturbance currents, so they are injected by the so-called contaminating load, whereas the fundamental current is supplied by the network.

It should be noted that the fundamental current can be replaced by a three-phase R-L load; the sources of the fundamental currents I1 will, in this case, be removed from the preceding model.

Validation of the Proposed Model

In order to model the production line of the textile factory being studied, electrical measurements were taken at the intake of the production line, as shown in FIG. 18.

FIG. 20 show these measurements.

FIG. 20a shows the three-phase plots (Ph1, Ph2 and Ph3) of the currents of the total load IL123 in A.

FIG. 20b shows the voltages of the electrical network Vs123 in V.

FIG. 20c shows the power factors PF123.

FIG. 20d shows the total harmonic distortions THD of the currents of the total load THDi123 in %.

FIG. 20e shows the total harmonic distortions of the voltages of the network THDv123 in %.

FIGS. 20f to 20i respectively show the individual harmonic distortion rates for the orders 5, 7, 11 and 13 of the currents of the loads for each of the phases, the distortion rates being expressed in %.

It should be noted that these measurements were limited by the maximum harmonic order 50 (50×50 Hz).

Finally, the parameters of the electrical network, shown in FIG. 17, are quantified in Table II.

TABLE II

Technical data sheet of the electrical components forming the studied network

| Electrical Network | |
|---|---|
| es, Ssc, Rsc, Lsc | 20 kV, 500 MVA, 0.253 Ω, Ls = 0.002425 H |
| Power Transformer | |
| $S_n$, $\Delta P_{Cu}$, $\Delta Po$, $u_{cc}$, $I_o$ | 1 MVA, 10.5 kW, 1.7 kW, 6%, 1.3% |
| Electrical Cable | |
| 3 × 300 mm2, Len = 20 m | Xcable = 0.16 Ω/km, Rcable = 0.059 Ω/km |

Based on the measurements shown in FIGS. 20a to 20i, the time at which the harmonic distortion of voltage is the highest was chosen, i.e. the time (22 h: 05:00). The state of the electrical network, at this time, is contained in Table III.

TABLE III

| State of the electrical network at the chosen time | | | |
|---|---|---|---|
| | DATE Mar. 10, 2009 | Time 22:05:00 | Hz 49.98 |
| | Ph 1 | Ph 2 | Ph 3 |
| $V_s$ (V) | 224.5 | 223.8 | 224.2 |
| $I_L$ (A) | 522.19 | 518.3 | 507.1 |

TABLE III-continued

State of the electrical network at the chosen time

|  | DATE<br>Mar. 10, 2009<br>Ph 1 | Time<br>22:05:00<br>Ph 2 | Hz<br>49.98<br>Ph 3 |
|---|---|---|---|
| $P_{Load}$ (W) | 114379.2 | 114054.2 | 110071.88 |
| $Q_{Load}$ (VAR) | 18812.18 | 15860.68 | 24532.81 |
| $S_{Load}$ (VA) | 116769.1 | 115968.4 | 113611.6 |
| PF | 0.97 | 0.98 | 0.96 |
| THD-$V_s$ (%) | 6.7 | 6.2 | 6.8 |
| THD-$I_L$ (%) | 11.6 | 10.7 | 12 |
| Ih5 (%) | 11 | 10.4 | 11.5 |
| Ih7 (%) | 2.8 | 1.7 | 2.4 |
| Ih11 (%) | 1.7 | 1.2 | 1.4 |
| Ih13 (%) | 1.4 | 0.9 | 1.1 |
| Ih17 (%) | 1 | 0.5 | 1.1 |
| Ih19 (%) | 0.9 | 0 | 0.7 |

In Table III, the quantities $P_{Load}$, $Q_{Load}$, $S_{Load}$, respectively are the active, reactive and apparent powers of the overall load of the production line.

Based on the actual measurements as well as the technical data sheets shown via FIG. 20 and Table II respectively, simulations in the time and frequency domains were carried out.

FIGS. 21a to 21g show the following three-phase values:

FIG. 21a shows the currents and the harmonics of the total load on the phase ph1 (IL1=520.7841 A), FIG. 21b shows the currents and the harmonics of the total load on the phase ph2 (IL2=518.38 A), FIG. 21c shows the currents and the harmonics of the total load on the phase ph3 (IL3=507.13 A), FIG. 21d shows the simple voltages of the network (Vs1=223.9 V, Vs2=223.07 V, Vs3=223.68 V), FIG. 21e shows the power factors (PF1=0.967, PF2=0.978, PF3=0.959), FIG. 21f shows the harmonic distortion rates on the different phases, and in particular the THD-V (THD-Vs1=6.46%, THD-Vs2=5.9%, THD-Vs3=6.65%), along with the THD-I (THD-I1=11.65%, THD-I2=10.76%, THD-I3=11.95%).

FIGS. 21a to 21c make it possible to estimate the individual distortion rates of the currents of the harmonics of the total load: I5-ph1,2,3=(11.02%, 10.42, 11.51%), I7-ph1,2,3=(2.72%, 1.78%, 2.36%), I11-ph1,2,3=(1.71%, 1.27%, 1.36%), I13-ph1,2,3=(1.5%, 1.08%, 1.17%), I17-ph1,2,3=(1.13%, 0.61%, 1.17%), I19-ph1,2,3=(0.94%, 0%, 0.72%).

By comparing the simulation results with the measurements given in FIG. 20 and the Table. III, it was found that all the quantities (actual and measured) are nearly identical, with a maximum error of 3%.

These results validate the proposed models and especially the non-linear loads model (of machines controlled by power converters; such as inverters, rectifiers etc.) Based on these results, it may be considered that the results that will now follow are also valid.

Result of the Simulations of the Active Filter Installed in the Network of the Factory being Studied First-Order SMC Controllers This part will validate the use of the active filter associated with the LCL filter with the control algorithms, conventional SMC, SMC with a sigmoid function and SMC with the AIRD method.

The technical data sheet of the components forming the active filter is given in Table IV.

TABLE IV

TECHNICAL DATA SHEET OF THE SHUNT ACTIVE FILTER
Shunt active filter

| LCL output filter | $L_{f1}$ = 90 μH, $R_{f1}$ = 5 mΩ<br>$L_{f2}$ = 100 μH, $R_{f2}$ = 5 mΩ |
|---|---|
| Storage capacitor | $C_f$ = 130 μF,<br>C = 0.6 mF, $V_{dc}$ = 840 V |
| Cut-off frequency of the LCL | 2000 Hz |
| Switching frequency of the PMW | 16 kHz |

FIG. 22 shows the simulation (before and after filtering) of the three-phased currents of the network side $I_{s123}$, as well as the THD of the current of phase 1 (THD-$I_s$).

The active filter is triggered after 5 periods of the mains power supply (up to 0.1 s); it will operate, first during 3 periods (up to 0.16 s) with the conventional SMC (with discontinuous control).

Afterwards, during 3 periods (up to 0.22 s), it will continue with the continuous control SMC (associated with a sigmoid function).

Finally after 0.22 s and until the end of the simulation, (0.28 s), the active filter will be controlled by a continuous control coming from the SMC with the AIRD algorithm.

It can be deduced from FIG. 22 that in spite of the unbalanced currents and voltages of the network, the significant voltage harmonic distortion of the site being studied and also the presence of the LCL filter, all the control methods provide quasi-perfect tracking, reflected, after filtering, by a sinusoidal shape of the current on the electrical network side.

This can be observed by negligible THDs of the three-phase currents after filtering. Specifically, the (THD-$I_s$) after filtering is of: 0.4%, 0.8%, 0.5%, these values being the highest of the control methods discontinuous control (conventional) SMC, continuous-control SMC (with a sigmoid function) and continuous-control SMC (with the AIRD method) respectively. It should be noted that the THDs of the currents before the activation of the active filter were respectively for the three phases (11.6%, 10.7% and 12%).

The significant reduction of the THD of the current leads, as shown in FIG. 23, to a very pronounced reduction in the THD of the voltage at the connection point; the (THD-$V_s$) changes from (6.7%,6.2% and 6.8%) before filtering to (0.28%,0.5% and 0.3%) after filtering, for the control methods discontinuous control (conventional) SMC, continuous control SMC (with a sigmoid function) and continuous-control SMC (with the AIRD method) respectively.

It should be noted that the international standards (e.g. IEEE STD 519-2014) impose a maximum voltage THD between 5%-8% in industrial areas, whereas the EDF recommendations require a total rate of voltage harmonic distortion of less than 1.6% for each receiver.

Higher-Order SMC Controllers

This part will validate the use of the active filter associated with the LCL filter with the C-HOSM then 2-SMC Twisting and finally 2-SMC Super-Twisting control algorithms.

The technical data sheets of the components forming the active filter is given in the previous Table IV.

FIGS. 24, 25, 26 show the simulation (before and after filtering) of the three-phase voltages composed at the connection points Us123 of the three-phased currents on the network side $I_{s123}$, the three-phase THD of the current (THD-$I_s$) and also that of the voltage (THD-$V_s$) superimposed, using the control algorithms C-HOSM then 2-SMC Twisting and finally 2-SMC Super-Twisting respectively, bearing in mind that in all three cases, the active filter is fired after five periods of the mains power supply (up to 0.1 s).

It can be deduced from these figures that, despite a deteriorated and unbalanced voltage of the network and also the presence of the LCL filter, the three control methods provide quasi-perfect tracking, after filtering, by a sinusoidal shape of the current on the electrical network side.

Specifically, the (THD-$I_s$) after filtering for the three phases are: (0.92%, 0.65%, 0.75%), (0.55%, 0.35%,0.42%) and (0.31%, 0.15%, 0.23%) for the control algorithms C-HOSM, 2-SMC Twisting and 2-SMC Super-Twisting respectively. It should be noted that the THDs of the currents before the activation of the active filter are for the three phases (11.6%, 10.7% and 12%) respectively.

These very good current filtering results are expressed as a significant drop in the voltage three-phase THD (THD-$V_s$) of (6.7%,6.2% and 6.8%) for the three phases before and after filtering of (0.59%,0.55%,0.66%), (0.23%,0.16%, 0.25%), (0.2%,0.15%,0.22%) respectively, using the control algorithms C-HOSM, 2-SMC Twisting and 2-SMC Super-Twisting respectively.

It should be noted that the three control algorithms proposed preserve the robustness and very good filtering quality provided by discontinuous conventional SMC, while guaranteeing, via continuous control, a voltage THD well below the 1.6% required by the most stringent recommendation (EDF standard). This very important result is achieved in spite of the unbalanced currents and voltages of the network, the significant harmonic distortion in the voltage of the site being studied, and also the presence of the LCL filter.

It should be noted that the international standards (for example, IEEE STD 519-2014) impose a maximum voltage THD between 5%-8% in industrial areas, whereas the EDF recommendations require a total harmonic distortion rate of less than 1.6% for each receiver.

Computation and Integration of the Maximum Power Point in the Control Scheme of the Active Filter:

The aim here is to track the maximum power point of a photovoltaic generator, in order to increase the efficiency of this generation system. FIG. 27 shows the four parameters characterizing the operation of a PV panel/generator; these are the short-circuit current $I_{cc}$, the voltage in vacuum $V_{co}$, the maximum power current $I_{mpp}$ and the maximum power voltage $V_{mpp}$ (consequently the maximum available power within the PV generator: $P_{mpp}=V_{mpp} \times I_{mpp}$).

In this invention, the algorithm used for the extraction of the maximum power point is the P&O (Perturb and Observe) algorithm, which is based on the perturbation and observation of the voltage of the PV generator, until the obtainment of the maximum voltage which will correspond to the MPPT point.

DC Voltage Regulation Loop (Maximum Power Tracking):

The loop for regulating the voltage of the capacitor, on the DC side of the inverter, will now be made use of to provide the tracking of the maximum power of the PV generator. Specifically, in the case of a shunt active filter which is not connected to a PV generator, the energy storing capacitor regulates itself (charges while maintaining a constant voltage) via the electrical network, through the inverter, to compensate for the Joule-effect losses of the electronic power components of the inverter and of the LCL output filter. The voltage of the capacitor $V_{dc}$ must track a reference voltage $V_{dc-ref}$ the amplitude of which is chosen to reinforce the dynamic response of the system, while complying with the dimensioning of the electrical components of the shunt active filter.

In this invention, the same loop for regulating the voltage of the capacitor is used to provide the tracking of the maximum power point, based on the tracking of the power $P_{MPP}$ and not of the current $I_{MPP}$. Specifically, unlike the methods for regulating the capacitor of the inverter, which use the tracking of the current $I_{MPP}$ if a renewable energy generation system is present, this method will directly extract the maximum power of the PV generator.

Modelling of the Capacitor Voltage Regulating Loop:

The relationship between the active power produced by the PV generator and the voltage across the terminals of the capacitor can be written in the form:

$$P_{pv} = \frac{d}{dt}\left(\frac{1}{2}C_{dc}V_{dc}\right) \quad \text{(Maths 30)}$$

The relationship (Maths 30) being non-linear, and for small variations in the voltage $V_{dc}$ around its reference $V_{dc-ref}$, it can be linearized via the following relationship:

$$P_{pv} = C_{dc}V_{dc-ref}\frac{d}{dt}(V_{dc}) \quad \text{(Maths 31)}$$

It should be noted that for: $V_{dc-ref}=V_{MPP}$ (delivered by the P&O algorithm of the unit 25-B), this gives $P_{pv}=P_{MPP}$. Consequently, the voltage of the capacitor computed in the Laplace domain becomes:

$$V_{dc}(s)|_{V_{dc}=V_{MPP}} = \frac{P_{MPP}(s)}{V_{dc-ref}C_{dc}s} \quad \text{(Maths 32)}$$

Based on the relationships (Maths 31) and (Maths 32) and using a linear regulator (Proportional-Integral) or another, the loop for regulating the DC voltage $V_{dc}$ and consequently the power $P_{MPP}$ can be shown via FIG. 28. The choice of the parameters of this controller provides rapid and accurate tracking of the maximum power of the PV generator. It should be noted that the measured signal of the voltage $V_{dc}$ will have fluctuations at 300 Hz or otherwise filtered out, via a second-order low-pass filter (see FIG. 28).

Integration of the Loop for Tracking the Maximum Power within an Active Filter:

The advantage of tracking $P_{MPP}$ (compared to $I_{MPP}$) is being able to incorporate (with as few computation operations as possible) the $P_{MPP}$ tracking loop into the algorithm for identifying the disturbance currents of the control part of the shunt active filter. In this case, the reference voltage $V_{dc-ref}$ of the algorithm for identifying/regulating the voltage of the capacitor of the active filter, is replaced by the voltage of the maximum power $V_{MPP}$ ($V_{dc-ref}=V_{MPP}$) coming from the algorithm (P & O) as shown in FIG. 29. In this FIG. 29, the output of the PI controller being the maximum power $P_{MPP}$ of the generator PV, this signal is added to the active disturbance power $\tilde{P}$ delivered by the disturbance current identification algorithm 25-A; the instantaneous disturbance powers (reactive $\tilde{Q}$ and zero-sequence $P_0$) are also computed. Specifically, this algorithm provides, first of all, the computation of the instantaneous disturbance powers, caused by the non-active disturbance currents (harmonics, reactive and unbalanced or another) present in the current of the load $I_L$, in the frame of reference α, β and 0. The computation of the reference currents $I_{ref123}$ is done via an inverse transform, first computed in the same frame of reference α, β and 0 then in the three-phase frame of reference. These reference currents of the active filter ($I_{ref123}$) then contain the disturbance currents as well as the maximum current of the PV generator: $I_{MPP}$. It should be noted that based on a regulation of the voltage $V_{dc}$ of which the output of the regulator (PI for example) is the maximum power, it is ensured that the instantaneous powers method, used in this invention to identify the disturbance currents, remains unchanged while guaranteeing the identification of the maximum current of the PV generator: $I_{MPP}$ in terms of amplitude, with an angle equal to that of the direct voltage component already extracted via the PLL 26 (see FIG. 2). The current $I_{MPP}$ will, in this case, systematically have a phase equal to this angle without passing through the loop of the PLL, as the voltage employed in the method 25-A for identifying the non-active disturbance currents is that of the direct component. So there is no special identification method, in terms of either amplitude or phase/angle, dedicated to the extraction of the current $I_{MPP}$, as usually used in the prior art. Specifically, in addition to the whole part dedicated to the identification of disturbance currents, which remains to be added, the algorithms that use tracking of the current $I_{MPP}$, instead of $P_{MPP}$, would involve the multiplication of $I_{MPP}$ by three sine functions (out of phase by one third of a period) of unit amplitude and phase/angle coming from the PLL (angle of the direct voltage component of the electrical network $V_s$). This requires further computation and more accuracy on the part of the PLL.

The invention claimed is:

1. A current-compensating device of renewable-energy-generating shunt active filter type, able to be connected:
   at its input, downstream of at least one renewable-energy-generating power unit coupled to an energy-storing element, and
   in shunt configuration, at its output, upstream, to a connection point between on the one hand a given electrical network, and on the other hand a number of non-linear and linear electrical loads,
   the current-compensating device having:
   a power converting unit, including at least one voltage inverter generating an AC current, with a frequency band ranging from 50 to 2500 Hz, covering:
   a) the whole frequency band of the non-active disturbance current which has: all or part of the harmonics, and at the fundamental frequency all or part of the reactive power and/or an unbalance,
   b) as well as the maximum active current generated by the renewable-energy-generating power unit;
   an output filtering unit, including one filter of LCL type for each of the phases and one neutral, and connected: on the one hand downstream of the voltage inverter, and on the other hand in shunt configuration to the connection point between the given electrical network and the non-linear and linear electrical loads, the LCL output filter being dimensioned to block the harmonic components due to the switching of the inverter;
   a control unit comprising a unit for computing reference currents, the reference currents comprising:
   i. at least one non-active disturbance current intended to be injected at the connection point in phase opposition to cancel, on the electrical network side, the disturbances of the signal generated by the non-linear and linear loads,
   having all or part of the harmonics, and at the fundamental frequency all or part of the reactive current and/or an unbalance,
   ii. at least one active current for recharging the storing element,
   iii. at least one active current corresponding to a point of maximum power of the renewable-energy-generating power unit,
   the control unit also comprising:
   a switch driving device that controls the switching of the inverter via a non-linear controller by continuous sliding mode, adapted to the filter of LCL type that provides in a closed loop the control of the whole 50 to 2500 Hz frequency band for the injection of the non-active disturbance current and of the active current as a function of the identification of the reference currents by the computing unit;
   the inverter switching control being done in such a way as to allow to pass through the output filtering unit at the connection point:
   a part or all of the non-active disturbance currents injected in phase opposition comprising harmonic currents, as well as reactive and unbalanced currents at the fundamental frequency, into the non-linear and linear electrical loads,
   to satisfy the non-active energy consumption demand of the non-linear and linear electrical loads, while decontaminating the electrical network of these non-active disturbance currents;
   an active current corresponding to a point of maximum power available within the renewable-energy-generating power unit, to satisfy the active energy consumption demand of the non-linear and linear electrical loads, while providing the recharging of the storing element.

2. The compensating device as claimed in claim 1, wherein the inverter switching control is done in such a way as to also allow to pass through the output filtering unit:
   a part of the active current, into the given electrical network then devoid of the non-active disturbance current when the production of the renewable-energy-generating power unit is greater than the power consumed by the non-linear and linear electrical loads.

3. The compensating device as claimed in claim 1, wherein the renewable-energy-generating power unit is coupled without a chopper or any other electronic power devices to the energy-storing element.

4. The compensating device as claimed in claim 1, wherein the control unit includes:
   a chopper configured to maintain a predefined constant DC voltage predefined across the terminals of the energy-storing element of the inverter, independently of the voltage level of the renewable energy source to provide an unchanged harmonic filtering,
   a dual chopper for the case of an island electrical network.

5. The compensating device as claimed in claim 1, wherein the control unit includes a continuous sliding mode controller of first order or a higher order, having an adaptive sliding surface of first order, second order, third order or another.

6. The compensating device as claimed in claim 1, wherein the control unit includes at least one of the following two sliding mode controllers:

one including a Sign function approximated as a Sigmoid function with a second-order adaptive sliding surface; and the other is based on a method of artificial increasing of the relative degree including a Sign function with a third-order adaptive sliding surface, followed by an integrator.

7. The compensating device as claimed in claim 1, wherein the control unit includes at least one of the following three higher-order sliding mode controllers:

the first is based on a C-HOSM continuous higher-order sliding mode controller including three Sign functions, with a first-order adaptive sliding surface, the second uses a 2-SMC Twisting controller with artificial increase of relative degree, including two Sign functions, with a second-order adaptive sliding surface, followed by an integrator, the third is a 2-SMC Super-Twisting controller including a Sign function, with a second-order adaptive sliding surface, without artificial increase of relative degree.

8. The compensating device as claimed in claim 1, wherein the switch driving device includes a device for modulating the pulse width, wherein the control is modulated, in order to make the inverter operate at a fixed switching frequency.

9. The compensating device as claimed in claim 1, wherein the control unit includes a regulating controller of PI type, or another, with an output that represents the maximum power of the renewable-energy-generating power unit, to regulate the DC voltage of the storing element while providing tracking of the point of maximum active power of the renewable-energy-generating power unit, the compensating device including a loop for regulating the DC voltage across the terminals of the capacitive storing element that supplies the maximum power at the controller output, the voltage across the terminals of the capacitive storing element being equal to the voltage of the maximum power of the renewable-energy-generating power unit.

10. The compensating device as claimed in claim 2, including a unit for computing reference currents configured to determine the non-active disturbance current circulating in the load, and a unit (25-B) for computing reference currents configured to compute, based only on the power, the voltage of the point of maximum active power of the renewable-energy-generating power unit.

11. An electrical system comprising an electrical power supply network, a number of non-linear/linear loads, at least one renewable-energy-generating power unit, and a compensating device as claimed in claim 1.

12. The system as claimed in claim 11, wherein the renewable-energy-generating power unit is:

chosen from the following list: one or more photovoltaic panels, a wind turbine or turbines, a fuel cell or cells, or others, coupled, directly to a capacitive storing element in the case of DC production, or via an AC/DC power rectifier in the case of AC production.

13. The system as claimed in claim 11, wherein the network is chosen from the following list: the mains electrical network, a local electrical micro-grid run as an island or connected to the mains electrical network, or an on-board electrical network.

14. The system as claimed in claim 11, further comprising a smart building, and wherein the control unit is connected to a decentralized management unit of the smart building, the control unit compares the maximum available power of the renewable-energy-generating power unit with the total load of the smart building.

15. The system as claimed in claim 14, wherein the control unit is configured to optimize the consumption of the different apparatuses operating within this smart building by distributing the loads corresponding to the non-linear/linear electrical loads in at least two operating modes:

a first so-called adaptive consumption mode wherein the control unit drives the decentralized management unit of the smart building in such a way as to adapt the consumption of the smart building with the production of the renewable-energy-generating power unit, so that the total load curve of the smart building has a maximum simultaneity factor corresponding to the operation of all the loads of the building at the same time, within the limit of the renewable energy producible, if the production of renewable energy is insufficient, a second so-called modulated consumption mode wherein the control unit drives the decentralized management unit of the smart building in such a way as to modulate the consumption of the apparatuses of the smart building to tend to a total load curve of the smart building that is substantially constant as a function of time, in the same scenario and if the electrical network is smart, a third distribution mode adapted to the production of the smart electrical network can be envisioned.

16. The system as claimed in claim 11, further comprising:

a local network connected to the network, and units for producing power from a conventional (fossil fuel) source, and a semi-decentralized management system, and a plurality of renewable-energy-generating power units connected to the local network, by a compensating device, each compensating device being connected to the semi-decentralized management system to which it communicates information about the production of energy, present and future, of each of the renewable-energy-generating power units, and a plurality of consumption sources corresponding to the non-linear and linear electrical loads, each of the consumption sources being connected to the local network and equipped with a compensating device, connected to the semi-decentralized management system to which it communicates information about the instantaneous consumption and the future consumption as a function of the scheduled operation of the consumption sources;

a plurality of renewable-energy-generating power units and linear and non-linear loads of the positive-energy smart buildings, which provide self-consumption and wherein any surplus of energy is stored or exchanged with the other smart buildings or delivered to the local network via the control unit of the compensating device, in coordination with the semi-decentralized management system in the event of an exchange with the local network.

17. The system as claimed in claim 16, wherein the semi-decentralized management system is further configured to provide the economical distribution of the conventional energy production units.

18. The system as claimed in claim 17, wherein the semi-decentralized management system is further configured to intervene, only as needed, when the total energy demand within the local network is greatly above the total production, on the decentralized control units of the smart buildings, via the control units of the compensating devices, to tip them into modulated consumption.

19. The system as claimed in claim 18, wherein the semi-decentralized management system is further configured to drive the distribution over the local network of the power coming from the network if the total estimated production does not cover demand.

20. A method for modelling the electrical operation of an industrial site including a plurality of controlled machines distributed over one or more production lines, by current sources, representing the total consumption (active, reactive and hormonics) of the controlled machines, measured by the energy quantity analyzer installed at the intake of each production line, the steps of the method being as follows:

1—installing a measuring device that is a spectrum analyzer/energy quality analyzer, at the intake of each production line of the site being studied, and which supplies all the electrical quantities of the network, namely: the active, reactive and apparent powers, the power factor, the fundamental components of the current and of the voltage, the total harmonic distortion rate of the current and of the voltage, the individual harmonic distortion rate of the current and of the voltages, etc., 2—modeling the active and reactive powers by a shunt R-L branch or by a single current source that represents the fundamental current, with an angle/phase corresponding to the power factor; the direction of passing of the current goes from the electrical network toward the load, 3—modeling the individual harmonic distortion rate of the currents and of the voltages by current sources; each corresponding to a harmonic order, the direction of passing of the harmonic currents going from the load toward the electrical network, 4—connecting all these current sources to one or more resistances with values chosen to force the passing of the currents in a single direction.

* * * * *